(12) United States Patent
Perrott et al.

(10) Patent No.: US 7,134,752 B2
(45) Date of Patent: Nov. 14, 2006

(54) SHAPED NON-CORRECTIVE EYEWEAR LENSES AND METHODS FOR PROVIDING SAME

(75) Inventors: Colin Perrott, Port Ludlow, WA (US); Kym Ansley Stockman, Happy Valley (AU); Anthony Dennis Miller, Bellevue Heights (AU)

(73) Assignee: Sola International Holdings Ltd., Lonsdale (AU)

(*) Notice: Subject to any disclaimer, the term of this patent is extended or adjusted under 35 U.S.C. 154(b) by 0 days.

(21) Appl. No.: 10/873,214

(22) Filed: Jun. 23, 2004

(65) Prior Publication Data

US 2005/0122470 A1 Jun. 9, 2005

Related U.S. Application Data

(60) Provisional application No. 60/526,289, filed on Dec. 3, 2003.

(51) Int. Cl.
*G02C 7/02* (2006.01)

(52) U.S. Cl. ..................... 351/159; 351/177

(58) Field of Classification Search ........... 351/177, 351/159, 41, 44, 160 R, 160 H, 176; 359/708, 359/717–718
See application file for complete search history.

(56) References Cited

U.S. PATENT DOCUMENTS

| | | | |
|---|---|---|---|
| 1,741,536 A | 12/1929 | Rayton | |
| 1,918,999 A | 7/1933 | Wells | |
| 1,942,400 A | 1/1934 | Glancy | |
| 3,526,449 A | 9/1970 | Bolle et al. | |
| 3,785,724 A | 1/1974 | Cretin-Maitenaz | |
| 4,271,538 A | 6/1981 | Montesi et al. | |
| 4,577,942 A | 3/1986 | Frieder et al. | |
| 4,606,622 A | 8/1986 | Fueter et al. | |
| 4,674,851 A | 6/1987 | Jannard | |
| 4,741,611 A | 5/1988 | Burns | |
| 4,778,266 A | 10/1988 | Maitenaz | |
| 4,779,972 A | 10/1988 | Gottlieb | |
| 4,859,048 A | 8/1989 | Jannard | |
| 4,867,550 A | 9/1989 | Jannard | |
| 4,912,155 A | 3/1990 | Burton | |
| 4,954,591 A | 9/1990 | Belmares | |
| 5,094,520 A | 3/1992 | Reshef et al. | |
| 5,123,725 A | 6/1992 | Winthrop | |
| 5,187,505 A | 2/1993 | Spector | |
| 5,444,503 A | 8/1995 | Kelch et al. | |
| 5,517,260 A | 5/1996 | Glady et al. | |
| 5,555,038 A | 9/1996 | Conway | |
| 5,604,547 A | 2/1997 | Davis et al. | |
| 5,644,374 A | 7/1997 | Mukaiyama et al. | |
| 5,648,832 A | 7/1997 | Houston et al. | |
| 5,689,323 A | 11/1997 | Houston et al. | |
| 5,691,798 A | 11/1997 | Smith | |

(Continued)

FOREIGN PATENT DOCUMENTS

AU     A-15095/83     12/1983

(Continued)

*Primary Examiner*—Jordan M. Schwartz
(74) *Attorney, Agent, or Firm*—Buchanan Ingersoll PC

(57) ABSTRACT

The disclosure relates to shaped ophthalmic lenses and methods for providing such lenses, including non-powered lenses having non-quadratic surfaces of complementary curvature. Such lenses may have a curvature maximum away from an axis of symmetry and a substantially constant wall thickness. Equations describing and methods of designing such lenses are disclosed including embodiments where two spheres of substantially different curvature are merged in accordance with a weighting function, and adjusted using merit functions.

62 Claims, 18 Drawing Sheets

U.S. PATENT DOCUMENTS

| | | |
|---|---|---|
| 5,704,692 A | 1/1998 | Purdy et al. |
| 5,774,201 A | 6/1998 | Tackles |
| 5,825,455 A | 10/1998 | Fecteau et al. |
| 5,861,935 A | 1/1999 | Morris et al. |
| 6,010,218 A | 1/2000 | Houston et al. |
| 6,019,469 A | 2/2000 | Fecteau et al. |
| 6,036,315 A | 3/2000 | Copeland |
| 6,106,118 A * | 8/2000 | Menezes et al. ............ 351/169 |
| 6,129,435 A | 10/2000 | Reichow et al. |
| 6,142,624 A | 11/2000 | Morris et al. |
| 6,254,236 B1 | 7/2001 | Fecteau et al. |
| 6,334,681 B1 | 1/2002 | Perrott et al. |
| 6,361,166 B1 | 3/2002 | Perrott et al. |
| 6,364,481 B1 | 4/2002 | O'Connor et al. |
| 6,454,408 B1 | 9/2002 | Morris et al. |
| 6,883,916 B1 * | 4/2005 | Menezes .................... 351/177 |
| 2003/0086055 A1 | 5/2003 | Morris et al. |
| 2003/0169398 A1 | 9/2003 | Perrott et al. |

FOREIGN PATENT DOCUMENTS

| | | |
|---|---|---|
| EP | 225 034 A1 | 6/1987 |
| EP | 547 762 A1 | 6/1993 |
| EP | 640 523 A1 | 3/1995 |
| FR | 2 542 462 | 9/1984 |
| FR | 2 688 322 | 9/1993 |
| GB | 680 400 | 10/1952 |
| GB | 2 281 635 A | 3/1995 |
| JP | 5 273502 | 10/1993 |
| WO | 96/13236 | 5/1996 |
| WO | 97/22894 | 6/1997 |
| WO | 97/35224 | 9/1997 |
| WO | 97/38343 | 10/1997 |
| WO | 97/41483 | 11/1997 |

* cited by examiner

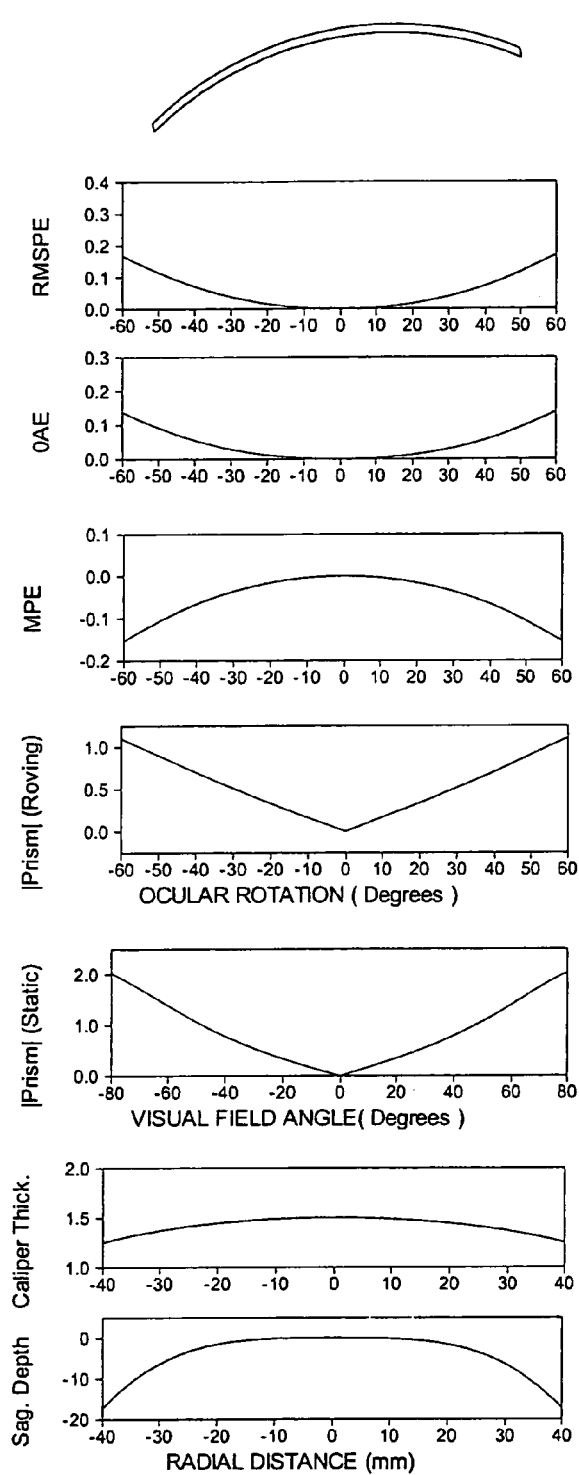
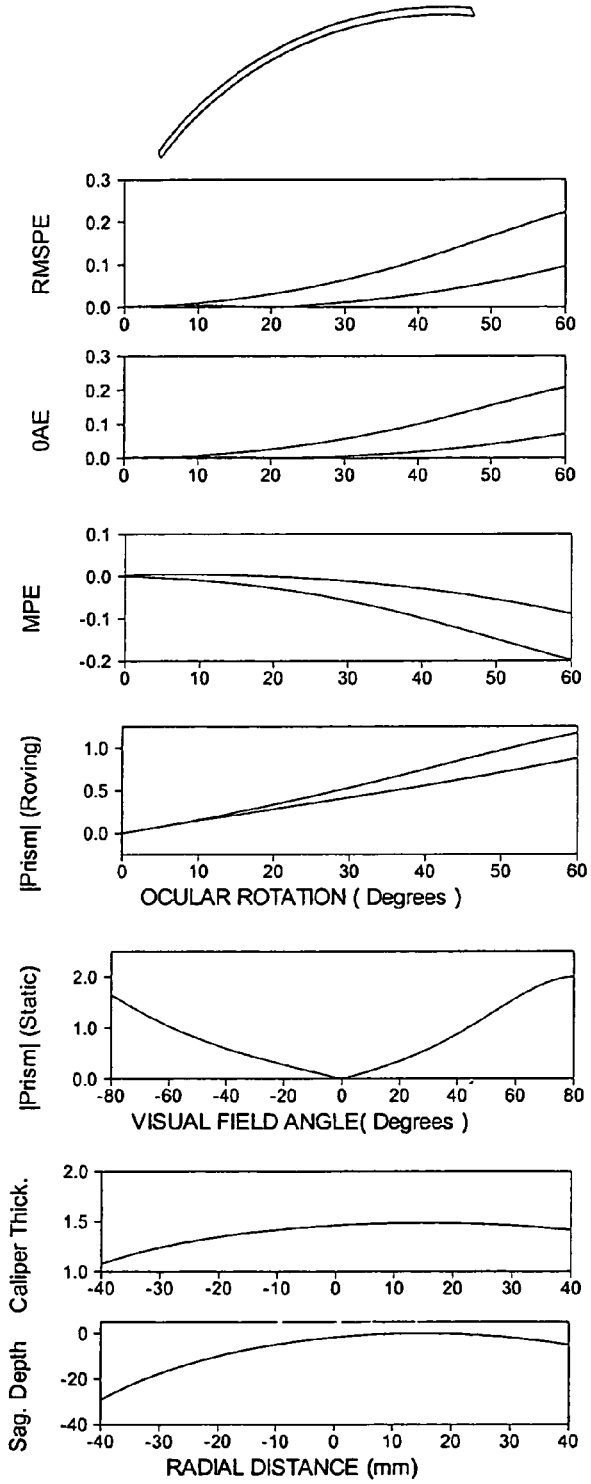
Figure 4A | Figure 4B
(Prior Art)

SHAPED NON-CORRECTIVE EYEWEAR LENSES AND METHODS FOR PROVIDING SAME

RELATED APPLICATIONS

This application claims priority to U.S. Provisional Application Ser. No. 60/526,289, filed Dec. 3, 2003, which is hereby incorporated by reference herein.

FIELD OF THE INVENTION

The present invention relates to optical lenses and lens blanks for use in non-corrective eyewear including sunglasses, sports eyewear, safety spectacles, goggles and visors.

BACKGROUND OF THE INVENTION

It is known in the prior art to manufacture non-corrective eyeglasses such as sunglasses or protective eyeglasses having wrap-around segments designed to shield the eye from incident light, wind, and foreign objects in the temporal vision field of the wearer. Such plano eyewear may curve horizontally around the eye sockets to "wrap" around and enclose the eyes as far as 100° from the line of sight. Vertical contouring of inferior regions of the lens inward toward the cheeks is variously called "pantoscopic tilt" or "rake", depending how the effect is achieved. The lenses may be designed to fit into dual lens frames or they may be of the unitary shield type. Wrap and/or rake create aesthetically pleasing eyewear that provides wearer comfort, but introduce also optical distortions that present difficulties to wearers involved in precise visual tasks. Various surface forms and arrangements have been employed in order to improve the closeness of wrap and rake provided. Whilst some of these arrangements have allowed faithful imaging at a wearer's direct line of sight for distant vision, inherent oblique refractive errors are introduced by lack of spatial correspondence between the lens optical axis and the direct line of sight as worn. Some prior art of the early 20$^{th}$ century employed spherical and elliptical dual lens designs of approximately constant thickness, thus not having an optical axis, but these have negative power and exhibit substantial refractive and prismatic distortion whenever the curvature center does not fall on the direct line of sight. To achieve functionality for dual lens eyewear, this type of lens needs to have exceptionally high base curve (~16 to 21D) so that it may be positioned approximately concentric with movement of the wearer's eyes. Alternatively, a unitary lens should be of such low base curve that the offset distance between the direct line of sight of one eye and the optical axis located within the wearer's medial plane is very much less than the vertex radius of curvature, being say in the range 1 to 2D. The vast majority of eyewear utilizes base curves intermediate between these conditions.

Prior art cited by Rayton 75 years ago (U.S. Pat. No. 1,741,536) attempted to achieve the effect of wrap and/or rake by tilting nominally zero power lenses outward and/or downward and aligning the optical center of the lens with the wearer's direct line of sight. The method was rejected owing to the existence of prismatic distortion in the as worn position. More recent art teaches a method of overcoming such prismatic error for pairs of low minus lenses. Reichow and Citek disclose in their U.S. Pat. No. 6,129,435 the achievement of the appearance of wrap and/or rake by inward and/or upward displacement of the geometric center of the lens, the induced-prismatic-error as worn being corrected without change in the physical appearance of the lens by rotating it about the center of curvature of its front surface to dispose the optical axis inward and/or upward. There remains, however, a negative mean power at the direct line of sight. It can be demonstrated that an opposed set of rotations would correct the prismatic error as worn for pairs of low plus lenses. However, the vast majority of non-corrective eyewear setup is based on Prentice's Rule (1888), an approximate analysis that predicts a linear relationship between the optical prism at a line of sight decentered with respect to a lens and the back vertex power of that lens. Most commonly, lenses are designed to provide zero back vertex power. Their optical axes and the wearer's direct lines of sight, as worn, are displaced laterally from each other as desired, while maintaining parallelism between them. This arrangement is shown in FIG. 1A; the line 2–2' is the direct line of sight and 1–1' is the displaced optical axis.

Rayton in U.S. Pat. No. 1,741,536 and Jannard in U.S. Pat. Nos. 4,674,851 and 4,859,048 disclose cylindrical lenses. Jannard (U.S. Pat. No. 4,867,550) and Burns (U.S. Pat. No. 4,741,611) describe toroidal lenses. Montesi and King (U.S. Pat. No. 4,271,538) and Conway (U.S. Pat. No. 5,555,038) describe unitary eyewear with left and right spherical lens portions whose optical axes are displaced nasally from the direct lines of sight as worn. Houston et al. (U.S. Pat. Nos. 5,648,832 5,689,323 and 6,010,218) describe spherical lenses that are decentered with respect to the direct line of sight in both a horizontal and a vertical plane. Fecteau et al. (U.S. Pat. Nos. 5,825,455, 6,019,469 and 6,254,236) describe unitary lenses having surfaces formed by rotation of an ellipse, parabola or hyperbola around a horizontal axis located rearward of the wearer's eyes. Davis and Waido (U.S. Pat. No. 5,604,547) describe unitary lenses whose surfaces are paraboloids that are bent in the lateral regions to form a side wrap beyond the wearer's visual fixation. They describe also unitary style sunglasses or eye protectors having a lens with inner and outer surfaces that are oblate ellipsoids. The surfaces they discuss also have a region of maximum surface astigmatism on the lens surface. Tackles (U.S. Pat. No. 5,774,201) describes both unitary and dual lens styles wherein the horizontal arc of a lens cross-section has a medial portion and lateral ends, the lateral ends having gradually tightening curvature relative to the curvature of the medial portion in substantial conformation to a portion of an ellipse with eccentricity in the range 0.1 to 0.85. The vertical curvature may take any desired form.

In order that a spherical lens can have zero back vertex power, its front and back radii $R_1$ and $R_2$ are related by $R_1 - R_2 = t(n-1)/n$ where t is the lens center thickness and n is the material refractive index. This stipulates that the caliper thickness of the lens (measured normal to either surface) will have a maximum value at the lens center and taper everywhere away from the optical axis of the lens, a matter long known in ophthalmic optics. For example, Rayton describes lenses with wall thickness tapering away from the optical axis. Conway notes that a lens which tapers continuously outwardly from its point of maximum thickness (optical center) has constantly zero power and low prismatic imbalance at an eye sweep angle of 20° whereas a similar lens of constant wall thickness has negative power and relatively higher prism imbalance. Others, including Montesi, Jannard, Tackles and Houston et al., make claims directed specifically to non-corrective lenses characterized by tapering thickness.

In an apparently contrary viewpoint, Davis and Waido claim non-corrective unitary lenses having "substantially uniform thickness throughout". Their stated development objective was to "provide improved sunglasses and safety eyewear with relatively uniform thickness throughout without sacrificing optical performance". Specifically, the design task was to correct unwanted thinning of the lens in the region of the lateral bend and avoid any requirement to manufacture unnecessarily heavy lenses. Each of those designs disclosed in U.S. Pat. No. 5,604,547 have been analyzed and have found the corresponding lenses to have thickness that tapers from the optical center across the field of view to the lateral bend, in which region there is localized thickening of the lens wall. In the same region, there are consequent negative refractive errors. Accordingly, this disclosure does not contradict prior wisdom.

The design of non-corrective lenses has been simplified greatly by concentration of the industry on the quality of distant vision in forward gaze. Optical testing is typically undertaken using a telescope aligned with the geometric axes to evaluate the optics at the direct lines of sight as worn. Oblique refractive errors, very important to ophthalmic lens design, are frequently ignored in the analysis of non-corrective lenses. Industry standards typically quote tolerances for refractive and prismatic errors at the "as worn" position only. See Table 1 below.

TABLE 1

Some specifications for refractive and prismatic errors of non-corrective lenses at the direct lines of sight, as worn.

| Standard | At Line of Sight | | Left/Right Imbalances at Lines of Sight | | | |
|---|---|---|---|---|---|---|
| | Power | Astig. | Power | Astig. | Prism$\updownarrow$ | Prism$\leftrightarrow$ |
| ANSI Z80.3-1979 | +0.12/−0.25 | 0.18 | 0.18 | 0.18 | 0.475 | 0.475 out |
| ANSI Z87.1-1979 | ±0.06 | 0.12 | 0.06 | 0.12 | 0.125 | 0.125 out, 0.52 in |
| ISO TC94/SC6 Gr. 1 | ±0.06 | 0.12 | 0.06 | 0.12 | 0.12 | 1.00 out, 0.25 in |
| ISO TC94/SC6 Gr. 2 | ±0.12 | 0.25 | 0.12 | 0.25 | 0.25 | 1.00 out, 0.25 in |
| CEN 1836 | ±0.09 | 0.09 | 0.18 | 0.18 | 0.24 | 0.24 |

Depending on the base curve, material and lens center thickness, these tolerances allow significantly different lens characteristics in the oblique visual field. The arrangements and devices of the prior art described above all result in the optical axis of a lens being placed somewhere in space other than coincident with the direct line of sight. The two vectors may intersect in some plane, they may be strictly parallel, or they may be skew. All such arrangements result in image aberrations for a simple object field that are asymmetric with respect to monocular rotation, which effect increases the magnitude of oblique errors experienced. It also causes a wearer's left and right eyes to experience mirrored image aberration fields, introducing binocular disparity for version movements. These being the primary optical demand in distance vision, the disparity is a distinct disadvantage of current designs. Ophthalmic lenses, on the other hand, are presented by convention in front of the eyes so that the optical axes and direct lines of sight are closely identical. The oblique fields are designed to be substantially symmetric with respect to monocular rotation and substantially free of binocular disparity in version and vergence movement, unless required by prescription.

Accordingly, it would be highly desirable to devise methods and means by which to place non-corrective lenses of aesthetically pleasing and useful shape before a wearer in a face-fitting configuration so that: the optical axes of the lenses and the wearer's direct lines of sight are substantially aligned, or; the visual fields are symmetric with respect to monocular rotation, preferably; both. Given the extent of prior art in this field, it should be expected that lenses meeting our objective could exhibit unusual physical characteristics, particularly in the conformation of their surfaces. Perspective views of a pair of lenses of an embodiment of the present invention are shown in FIGS. 2A–2D.

Reshef et al. have described very highly curved non-corrective goggle lenses with a spherical surface (radii below 35 mm) and having tapering thickness (U.S. Pat. No. 5,094,520). Applicant has developed also novel prescription lenses, sunlenses and eyewear characterized by steeply curved surfaces (~16 to 18D) that are approximately spherical and are placed concentric with the centroid of rotation of the eye. These objects are described in detail in Sola International's U.S. Pat. No. 6,142,624, the entire disclosure of which is hereby incorporated by reference. Lenses of this type deviate substantially from conventional, relatively flat lens shapes. However, the overall shape of such lenses is based on generally spherical reference surfaces employed and their optical properties in the oblique field can be sensitive to lens placement errors.

Sola International has developed improved aspheric prescription lenses for use in wrap-around frames, as described in their U.S. Pat. No. 6,361,166 the entire disclosure of which is hereby incorporated by reference. Sola International has developed other novel optical lenses suitable for use in wrap-around or protective eyewear. These lenses are described in U.S. Pat. Nos. 6,334,681 and 6,454,408 to Sola International, the entire disclosures of which are hereby incorporated by reference. These applications describe close fitting prescription shields, visors or dual lens prescription sunglasses whose physical form is achieved by forcing local change in curvature of the Rx lenses, particularly in the forward visual field of the wearer, in order to depart significantly from conventional (quadratic) conicoidal forms and by employing significant shape asymmetry between horizontal and vertical meridians of the lenses. However, these surface forms lack overall global definition, introducing difficulty in optimizing lens appearance and wide-field visual function from the wearer's viewpoint. The lens surface construction is mathematically complex, even for lenses having a simple axial symmetry. Also, the oblique optical errors formed at the limits of a wearer's visual fixation field may be less desirable than those of more classical construction based on standard optical surfaces of quadratic form with or without surface aspheric corrections.

Terminology

There are several technical terms and descriptors used within the following discussion of the present invention that either have specific meaning herein, or that are unfamiliar terms within the field of non-corrective lens design. In the interests of clarity and understanding, we list those terms and their meanings as used herein below. Mathematical terms and meanings follow those found in *CRC Concise Encyclopedia of Mathematics*, by E. W. Weisstein, Chapman & Hall, New York 1999. Optical terms and principles follow those to found in *Optical Society of America Handbook of Optics*, Volume I, Part 1, M. Bass (Ed), Second Edition, McGraw Hill, New York 1995 or in *The Principles of Ophthalmic Lenses*, M. Jalie, Fourth Edition, London 1994.

The term "optical lens element" means, in this application where appropriate in the context of particular embodiments, a finished optical or spectacle lens, a lens blank that requires cutting edging and fitting to a frame assembly, or a light transmitting article formed so as to provide a left and a right lens and being suited to finishing as an integral optical element or shield for non-corrective eyewear.

The term "monocular field of view" means, in this application where appropriate in the context of particular embodiments, a portion of solid angle before a wearer in which the human eye is able to receive and distinguish images. It is generally considered to extend approximately 90° temporally, and up to 60° nasally, 70° inferiorly and 50° superiorly, depending on an individual's facial structure, the illuminance and the stimulus size, duration and color.

The term "binocular field of view" means, in this application where appropriate in the context of particular embodiments, the overlapping region of left and right monocular fields of view, divided centrally by the wearer's medial plane.

The term "version movement" means, in this application where appropriate in the context of particular embodiments, binocular pursuits within an object plane wherein both eyes move equally in the same direction.

The term "vergence movement" means, in this application where appropriate in the context of particular embodiments, binocular pursuits at different distances from the observer wherein both eyes move equally in opposite directions.

The term "visual fixation field" means, in this application where appropriate in the context of particular embodiments, a region on the lens surface defined by a set of points that are the intersection of the lens surface and the wearer's line of sight as he or she fixates on objects in a median plane. This visual field is typically associated with ocular rotations in the order 40 to 50°.

The term "peripheral field of vision" means, in this application where appropriate in the context of particular embodiments, a region on the lens surface defined by a set of points which are the intersection of the lens surface and rays of light entering the wearer's pupil as he or she fixates on objects generally in the direct line of sight. The eyes are typically static, exhibiting only small ocular rotations.

The term "quadratic standard forms" means, in this application where appropriate in the context of particular embodiments, a surface belonging to any of the 17 general standard-form quadratic surfaces and special cases thereof as set forth in the *CRC Concise Encyclopedia of Mathematics*, by E. W. Weisstein, Chapman & Hall, New York 1999, p. 1485.

The term "standard optical surfaces of quadratic form" means, in this application where appropriate in the context of particular embodiments, any biconvex or plano-convex surface being a section of a cone, cylinder, sphere, spheroid or conicoid belonging to the generic families of ellipsoids or of toroids formed by the rotation of generally conic arcs around an axis that is a surface normal or is parallel to and spaced from a surface tangent. The surface form will be continuous at least to the third derivative and have discernable symmetry with respect to at least one reference normal vector.

The term "axis of symmetry" means, in this application where appropriate in the context of particular embodiments, the normal vector relative to which the surface sheet has at least reflection symmetry and on which the centers of sagittal curvature of individual surface elements are located.

The term "vertex" means, in this application where appropriate in the context of particular embodiments, the point of intersection of a surface and its axis of symmetry. By the term "apex", we mean the forward-most point on a lens surface as worn.

The term "optical axis" means, in this application where appropriate in the context of particular embodiments, the axis on which the sagittal curvature centers of both surfaces is located. It is formed when the axes of symmetry are collinear. The surface sheet is usually defined in cylindrical polar coordinates (r, □, z) where the origin of coordinates is the surface vertex, the optical axis is the axis Oz and the radial distance r is measured within the surface tangential plane through the surface vertex, the "vertex plane". The directed distance z(r) from the vertex plane to the surface is known as the surface "sag". Preferably lenses according to the invention are located before a wearer so that the optical axis of the lens and the wearer's direct line of sight in distance vision are essentially coincident.

The term "optical center" means, in this application where appropriate in the context of particular embodiments, the point where the optical axis intersects the lens front surface. It may be determined in practice as a location where the lens has zero optical prism, while the orientation of the optical axis may be found by identifying the normal vector to a surface tangential plane at that location.

The term "sagittal curvature center" means, in this application where appropriate in the context of particular embodiments, the center of rotational curvature defined by the surface slope in any meridian. It is located to the concave side of the surface at a distance from the vertex given by $$R = z + \frac{r}{z'} \text{ where } z' \equiv \frac{\partial z}{\partial r}$$

The term "standard optical reference surface" means, in this application where appropriate in the context of particular embodiments, a quadratic surface, including aspheric correction terms if any, such a surface being characterized by tangential and sagittal surface curvatures changing monotonically without local maxima or minima away from the axis of symmetry.

The term "significant deviation from standard optical reference surface" means, in this application where appropriate in the context of particular embodiments, a surface having quadratic and higher order components, including aspheric correction terms if any, the overall surface being characterized in that at least the tangential curvature or mean curvature exhibits a maximum value at an oblique position along at least one meridian.

The term "significant deviation in surface curvature from a standard optical surface of quadratic form" means, in this application where appropriate in the context of particular embodiments, that the tangential and/or sagittal curvatures of individual surface elements show at first increasing difference for elements away from the axis of symmetry, and thereafter a declining difference more distant from the axis of symmetry.

The term "significant deviation in surface astigmatism from a standard optical surface" means, in this application where appropriate in the context of particular embodiments, that the tangential and sagittal surface curvatures deviate sufficiently to introduce major optical astigmatic distortions to the lens surface.

The term "static prism" means, in this application where appropriate in the context of particular embodiments, the component of prism that is perceived when sampling rays that enter the wearer's pupil as he or she fixates on objects in the straight ahead viewing position and where the eye is static. This prism is typically associated with peripheral visual perception.

The term "rotational prism" means, in this application where appropriate in the context of particular embodiments, the component of prism that is perceived when sampling rays along the wearer's line of sight as he or she rotates the eye. This prism is typically related to ocular rotations in the order 40 to 50 degrees.

The term "sagittal depth" means, in this application where appropriate in the context of particular embodiments, the distance between the surface tangential plane at the front vertex of the lens and the temporal-most edge point of the front surface. By the term "difference in sagittal depth", we mean the difference between the sagittal depths at the temporal-most edge point of the front surface and at the nasal-most edge point of the front surface.

"Mean Through Power" is the average of the through power in one principal meridian along a given line of sight and the through power in the other principal meridian along that line of sight. "Mean Power Error" (MPE) is the arithmetic mean value of the actual errors in lens through powers in the principal meridians along a given line of sight, compared with the desired refractive correction. "RMS Power Error" (RMSPE) is the root mean squared error of actual lens through powers in the principal meridians along a given line of sight, compared with the desired refractive corrections. The term "substantially zero mean through power" means, in this application where appropriate in the context of particular embodiments, that the mean through power is in the range $-0.50D$ to $+0.125D$, preferably $-0.30D$ to $+0.05D$, more preferably within $\pm0.09D$, most preferably within $\pm0.05D$ in the visual fixation field of the wearer.

The term "surface Q-value" means, in this application where appropriate in the context of particular embodiments, a measure of the degree to which a curve or a surface may be described as quadratic. It is determined for a curve from the first and second derivatives along the curve length. For a surface, it is determined from the tangential and sagittal curvatures or radii of curvature.

The terms "eccentricity" and "shape factor" mean, in this application where appropriate in the context of particular embodiments, the standard measures of the degree of departure of a conic section from a perfect circular section.

The term "surface curve" in accordance with a preferred embodiment of the present invention means, in this application where appropriate in the context of particular embodiments, a planar curve that has; an axis of symmetry; relatively low curvature at the central portion and relatively higher curvature at the lateral ends; a local maximum of curvature at an intermediate position between the central portion and the lateral ends, and is further characterized in that the normal vectors to the curve at its opposed regions of greatest tangential curvature are inclined angularly with respect to each other.

The term "osculating surfaces" means, in this application where appropriate in the context of particular embodiments, a pair of surfaces that are co-tangential with each other at a closed curve of intersection between them. The surfaces have equal sagittal curvature at their intersection.

SUMMARY OF THE DISCLOSURE AND OBJECTS

Today, the vast majority of corrective and non-corrective lenses are created by a pair of surfaces having quadratic form, their geometry being derived in some way from figures of revolution or translation of circles or conic sections. There is very little experience in the art of single vision lens design with surfaces that deviate substantially across the visual fixation field of the wearer from the quadratic standard forms. So far as such experience exists, there is a lack of global design methodology through which to create the desired surface forms. Accordingly, it would be a significant advance in the art if non-corrective eyewear of the wrap-around type could be provided with surfaces that deviate substantially across the lens aperture from the quadratic standard forms and allow for a wide range of selected styling for both horizontal wrap (around the brows) and vertical rake to maximize wearer appeal. It would be a further significant advance in the art if the lenses could match the optical properties of quadratic form lenses over the full visual field from central to peripheral vision, if desired.

It is another object of the present invention to overcome, or at least alleviate, the errors experienced in the oblique visual fixation field and also in the peripheral field of vision with prior art non-standard surfaces. It is a further object of the invention to provide superior optical performance, as measured by specific merit functions; to simplify the mathematical construction of the surfaces; and to facilitate surface adjustments necessary to provide such improved oblique optical properties.

Visualization of Surface Curves

The surfaces of prior art non-corrective lenses are usually convex shapes created by revolution of a conic section, or a close approximation thereto, about an axis that is either a symmetry axis of the conic or is orthogonal to it. For cylindrical, conic and toroidal lens forms, the axis of rotation is positioned vertically with respect to a wearer. For lenses whose surfaces are ellipsoids, paraboloids, hyperboloids and spheroids, the axis of rotation may be horizontal or it may be parallel to the wearer's direct line of sight as worn. Conic sections are readily visualized, being the range of shapes formed by intersection of a right circular cone and a plane.

Surfaces of interest to the current invention are generated by curves that do not belong to any of the classes described above. Except for a few special instances, they are not classified by strict mathematical form. However, their general features may be visualized readily. Shown in FIG. 2B is a perspective view of a cylindrical dome that is circular in a mid-section basal plane of symmetry and has a mid region of substantially flat vertical section. A plane that is inclined to the basal plane intersects the dome along a curve of intersection that is strongly influenced by the vertical curvature of the dome and the height of intersection. Such curves have an axis of symmetry 3–3' and shapes as depicted in FIG. 2B, curve set (a). They are necessarily non-quadratic with characteristically different shape from the ellipses that would be found for oblique intersections of a right circular cylinder, shown in FIG. 2B curve set (c) for example. Such curves and others of similar character, rather than conic sections, are used to generate lens surfaces according to embodiments of the present invention.

Optical surfaces that depart from regular form are described by Taylor series expansion of surface heights relative to the vertex plane in terms of radial distance from the vertex so that, aspheres are treated by convention as a sphere that matches the surface curvature at the vertex and a deviation therefrom and non-conic aspheres are treated as a conic that matches at the vertex and a deviation therefrom. See for example, *Optical Society of America Handbook of Optics*, Volume I, Part 1, M. Bass (Ed), Second Edition, McGraw Hill, New York 1995 p. 1.39. This assumes that the deviations are small and that the curve of surface heights occurring along a meridian of the surface is generally circular or generally conic. Such character of the surface curve may be tested by analysis of both the variation of the physical curve and the variation of the curve evolute, the curve evolute being the locus of tangential curvature centers for elements along the physical curve.

The evolute of a circle is a point at the unique center of curvature. An ellipse following the equation $$\frac{x^2}{a^2} + \frac{(y-b)^2}{b^2} = 1$$

has an evolute that is the Lamé curve $$(ax)^{2/3} + (b(y-b))^{2/3} = c^{4/3} \text{ where } c \equiv \sqrt{a^2 - b^2} \equiv ae \text{ and}$$

$$p \equiv \left(\frac{a}{b}\right)^2,$$

called a "hypocycloid". An ellipse with shape factor p=4 (eccentricity e=0.87) and its evolute are shown as curves (c) and (cc) in FIG. 2B. Note that the hypocycloid has four cusps and is symmetrical with respect to both the minor and major axes of the ellipse.

The evolute of any curve may be determined by analysis of the locus of the tangential curvature centers, whose coordinates for the running point (x, y) are (X, Y) where;

$$X = x - \{1 + (y')^2\} y'/y'' \text{ and } Y = y + \{1 + (y')^2\}/y''.$$

Thus we find that curve (a) in FIG. 2B has the evolute shown as (aa). If part of the curve is merged with its osculating circle, as for curve (b) in FIG. 2B, its evolute takes the form of curve (bb). This is an irregular hypocycloid with an indented vertex on the minor axis of the surface curve, corresponding to a lateral region in which the curve is closely circular. The pair of horizontally disposed cusps corresponds to locations where the tangential curvature is a maximum, as they do for the ellipse. This occurs without the formation of a vertex, as is required for an ellipse, because the curve slope remains finite in the region of highest curvature and the normal vectors there are inclined to the minor axis rather than being orthogonal thereto (that is, $\phi < \pi/2$). See FIGS. 2C and 2D.

One surface embodiment of the present invention described in Table 4C below has an extended region wherein a representative surface curve is approximately conic with an outer region of maximum tangential curvature. The surface curve and its evolute are shown in FIG. 2C(b). The evolute shape, curve 1 in FIG. 2C(c), fits very closely in an inner region to the evolute of an ellipse, curve 2 in FIG. 2C(c), where a=34.5 mm, b=9.25 mm. This indicates that the surface curve is generally elliptical from its center to the tangential curvature maxima, the shape factor being p=13.9 and the eccentricity being e=0.963. The ellipse so derived and the physical curve match closely in that aperture. See FIG. 2C(a).

Such high eccentricity values for the inner parts of the surface curve follow from the design approach of changing the curvature slowly around the vertex and impose a rapid rate of bending laterally. This is not linked specifically to the vertex curvature itself. A highly eccentric ellipse has a>>b and may be likened to an extended circular arc with a sudden and shallow region of lateral bending. A different surface according to an embodiment of the present invention, described in Table 3A below, is constructed with a pair of polynomial coefficients of order 2 and 4. It has very sudden onset of lateral bending with implied eccentricity e=0.9997 (or p=1530) according to the dimensions a=10.95 mm and b=0.28 mm. Its characteristics are shown in FIG. 2D. The use of such highly eccentric central curves is not practical unless some procedure is employed to prevent the surface curve from turning inwards at a small distance from the frontal plane. Our method causes the curve to spiral outward from the ellipse in the region of the lateral ends.

Thus, in one aspect of an embodiment of the present invention, there is provided a lens having an inner and outer convex surface with a thickness therebetween, wherein a cross-section along at least a horizontal meridian of at least one of said surfaces has a curved form so that the cross-sectional curve;

has a central portion and lateral ends spaced therefrom, with an axis of symmetry;
the curvature increases from the central portion toward the lateral ends, and;
there is a maximum value of curvature intermediate between the central portion and the lateral ends.

In a more preferred aspect;
the shape of the curve is approximately elliptical in a central region, and;
the curve spirals outward from the ellipse in the region of the lateral ends.

In a still more preferred aspect,
the evolute in a central region of the curve corresponds approximately to that of an ellipse with eccentricity greater than about e=0.95 (shape factor about p=10);
the evolute of the curve has a pair of horizontally displaced cusps that correspond to a region of greatest tangential curvature, the normal vectors from the curve to the said cusps being inclined at an angle other than 90° to the minor axis of the curve, and;
the evolute of the curve near the lateral ends thereof, being characterized by a branch extending from the horizontally displaced cusps toward the minor axis on the concave side of the curve.

Preferably, the normal vectors to the curve at the opposed locations of highest tangential curvature are inclined to the axis of symmetry at an angle less than $\phi=75$ degrees, more preferably at an angle less than 60 degrees, and most preferably less than 45 degrees. In a further preferred aspect, the evolute in a central region of the curve corresponds approximately to that of an ellipse with eccentricity of about e=0.96 (shape factor of about p=14), or greater.

Additional Aspects of Disclosed Embodiments

A convex lens surface according to an embodiment of the present invention may be created from symmetric arcs of the general type described above by rotation about their own axis of symmetry, or by rotation about a coplanar axis orthogonal to the symmetry axis of the curve and located rearward of the surface element. In an alternative arrangement, the horizontal meridian of the lens surface may be a surface curve according to an embodiment of the present invention and the vertical curve may have any suitable form.

In a second aspect of an embodiment of the present invention there is provided an optical lens element including
- a first surface having an axis of symmetry; and
- a second surface of complementary curvature having an axis of symmetry;
- at least one surface exhibiting significant deviation in surface curvature and surface astigmatism from a standard optical reference surface of quadratic form;
- the deviation in surface astigmatism commencing locally around a vertex on the lens aperture, extending generally across the entire surface and forming an annular region of maximum surface astigmatism on the lens surface, and;
- the first and second surfaces in combination defining an optical center, an optical axis and an optical zone exhibiting substantially zero mean through power.

Preferably, lens surfaces according to the current embodiment of the present invention will be designed so that the surface tangential and sagittal curvatures converge laterally so defining an umbilic ring on the surface within or near the peripheral region of the lens aperture. More preferably, the surface tangential power will be higher generally than the sagittal curvature across the lens aperture and the lens surface will be oblate. The mean curvature of the lens surfaces may change by 1.0D, preferably by 3.0D, in a visual field angle of 40°, more preferably by 5.0D in a visual field angle of 50° and most preferably by 6.0D in a visual field angle of 50°.

Preferably, there will be an oblique region of maximum astigmatism located within or marginal to the wearer's visual fixation field. More preferably, the surface astigmatism will decline toward zero in the peripheral regions of the lens aperture. The astigmatism on the lens surfaces may change by 1.0D, preferably by 3.0D, within a visual field angle of 40°, more preferably by 5.0D within a visual field angle of 50° and most preferably by 6.0D within a visual field angle of 50°. Because of the convergence of tangential and sagittal surface curvatures toward an umbilic ring near the periphery of the lens aperture, the surface astigmatism will decline in the peripheral regions of the lens aperture. Preferably, the surface astigmatism will be less than 3.0D at a visual field angle of 75°, more preferably less than 2.0D at field angles greater than 75° and most preferably less than 1.0D.

Preferably lenses according to the current embodiment of the present invention will exhibit at least 10 mm sagittal depth, more preferably 15 mm, most preferably 20 mm at a radial distance of 40 mm. Preferably, lenses according to the invention enclose the entire visual fixation field of a wearer, more preferably subtending a visual field angle of at least 60° relative to the center of rotation of the eye, most preferably in the range 70 to 75°.

Accordingly in a third aspect of an embodiment of the present invention there is provided an optical lens including
- a first surface having an axis of symmetry; and
- a second surface of complementary curvature having an axis of symmetry;
- at least one surface exhibiting significant deviation in surface curvature and surface astigmatism from a standard optical reference surface of quadratic form;
- the deviation in surface astigmatism commencing locally around a vertex on the lens aperture, extending generally across the entire surface through a maximum located obliquely on the lens surface and forming an outer zone of low surface astigmatism in the lens periphery around which the lens surface is approximately umbilic, and;
- the first and second surfaces in combination defining an optical axis and an optical zone exhibiting substantially zero mean through power.

It will be understood that the optical lens according to the present invention permits the production of non-corrective optical lenses with a surface or surfaces of quite radical shape relative to standard ophthalmic lenses, but still providing a lens body for which the mean through power is relatively constant within normal ophthalmic standards from the optical axis obliquely to the margin of the visual fixation field. The deviating surfaces may exhibit significant optical distortions, e.g. high levels of surface astigmatism over substantial portions of the lens aperture. However, the refractive mean power, RMS power and astigmatic errors remain small within normal ophthalmic standards from the optical axis obliquely to the margin of the visual fixation field.

We have found when optimizing the optical properties of non-corrective lenses bounded by surfaces of the form described herein, that the lens thickness shows no sign of tapering in an aperture corresponding approximately to the visual fixation field as worn, or larger. This occurs without the development of negative refractive power error or exaggerated prismatic error as is anticipated for quadratic surfaces. See for example Houston et al. (U.S. Pat. Nos. 5,648,832 5,689,323 and 6,010,218) and Conway (U.S. Pat. No. 5,555,038). Indeed the optical errors exhibited across a visual field of angle 50° by such lenses can be lower than for true piano spherical lenses having equivalent sagittal depth at the lateral edge. The lens thickness typically has a shallow minimum value at the optical axis that grows slightly in the oblique field and is sustained to the edge of the visual fixation field or beyond, thereafter tapering in the peripheral regions of the lens.

In a further aspect of the lenses of an embodiment of the present invention, there is provided a pair of non-corrective lenses in a frame or structure of wrap-around type capable of positioning the lenses accurately before a wearer so that the direct lines of sight coincide substantially with the corresponding optical axes of the lenses, the lenses conforming to the shape of the face and enclosing at least the field of forward vision by virtue of their physical shape and sagittal depth wherein each lens is characterized as follows:
- a first lens surface has an axis of symmetry; and
- a second lens surface has complementary curvature and axis of symmetry;
- at least one surface exhibits significant deviation in surface height from a standard optical reference surface of quadratic form;
- the deviation in surface height commences locally around a vertex on the lens aperture, extending generally across the entire surface;
- the deviated surface exhibits an oblique region of high astigmatism and optionally an outer zone of low surface astigmatism in the periphery around which regions of surface are approximately umbilic;
- the first and second surfaces in combination define an optical axis and an optical zone in which the lens thickness is substantially constant (sustained without taper) across an aperture corresponding approximately to the visual fixation field as worn;

there are no significant refractive or prismatic errors at the direct line of sight as worn, and;

the oblique refractive power errors remain small and symmetrical upon ocular rotation across the visual fixation field and into the peripheral field of vision.

Preferably, the oblique refractive power and prismatic errors vary symmetrically in at least a pair of orthogonal meridians of the visual fixation field.

Preferably the lens mean through power at the direct line of sight will be in the range −0.25 to +0.125D, more preferably in the range ±0.09D and most preferably in the range ±0.05D. Preferably, the magnitudes of refractive and prismatic errors at the direct line of sight will be at least as small as 0.125D, more preferably less than 0.09D and most preferably less than 0.05D.

Optical errors typically increase in the oblique field and have different levels of acceptability to a wearer according to their location within the visual field. Preferably, the mean through power in the oblique field will be in the range −0.50 to +0.125D, more preferably in the range −0.30 to +0.05D in an aperture corresponding approximately to the visual fixation field, and most preferably in the range −0.125 to +0.05D within the said aperture. The magnitudes of oblique refractive errors are preferably less than 0.60D, more preferably less than 0.25D in an aperture corresponding approximately to the visual fixation field, still more preferably less than 0.125D within the said aperture, and most preferably less than 0.05D within the said aperture.

Preferably, the average angular rate of increase in magnitude of both the rotational and static contributions to optical prism will be at least as low as 40 mD/Deg of visual field angle, preferably lower than 25 mD/Deg, more preferably at least as low as 12.5 mD/Deg across an aperture corresponding substantially to the visual fixation field, and most preferably as low as 20 mD/Deg within an angular field of 30° around the direct line of sight. Still more preferably, the average rate of change in magnitude of static optical prism within the field of peripheral vision outward from a field angle of about 50° to about 80° will remain at least as low as 80 mD/Deg, even more preferably less than 40 mD/Deg and most preferably less than 25 mD/Deg.

These and other objects and features will be apparent from this application including the accompanying drawings. One or more objects and advantages (but not necessarily all) may be achieved by the various aspects and embodiments of the present invention as herein described.

BRIEF DESCRIPTION OF THE DRAWINGS

FIG. 2A: Shows frontal perspective view of lenses according to an embodiment of the present invention (views being from above, directly in front and below). These lenses provide necessary face-fitting geometry while maintaining the optical axis and direct line of sight collinear as worn.

FIG. 2B: Depicts a cylindrical dome and its oblique intersection with an inclined plane, creating an intersection curve with axis of symmetry 3–3'. A family of such intersection curves created by changing the inclination of the plane is shown as curve set (a), while the evolute of the highlighted curve is shown as the curve (aa). A closed curve (b) formed by merging part of curve (a) with its osculating circle has the evolute (bb). A nested family of ellipses is shown for comparison as curve set (c), while an ellipse of shape factor p=4 and its evolute are shown as the curves (cc).

FIG. 2C: Depicts the properties of a cross-section through a meridian of a surface according to an embodiment of the present invention and described in Table 4C. The surface curve and its evolute are shown as figure part (b), while figure part (c) shows the evolute curve (1) and the evolute of an ellipse (2) fitted to match the curve (1) in a central region of the surface curve. The physical curve (full line) is compared with the deduced ellipse (dashed line) in the figure part (a).

FIG. 2D: Depicts the properties of a cross-section through a meridian of a surface according to an embodiment of the present invention and described in Table 3A. The surface curve and its evolute are shown as figure part (b), while figure part (c) shows the evolute curve (1) and the evolute of an ellipse (2) fitted to match the curve (1) in a central region of the surface curve. The physical curve (full line) is compared with the deduced ellipse (dashed line) in the figure part (a).

FIG. 3A: Shows an elliptic unitary lens of vertex curvature 3.78D and eccentricity e=0.866 (shape factor p=4.0). The refractive properties are not symmetrical for ocular rotation either side of the direct line of sight.

FIG. 3B: Shows a near-parabolic unitary lens form with high order coefficients to create a temporal bend. The refractive properties are not symmetrical upon ocular rotation either side of the direct line of sight and the curve evolute (1) is unlike that of any regular form curve. The closest ellipse evolute (2) has a shape factor p=4.0 but is an unsatisfactory match.

FIGS. 4A and 4B Depict prior art design spherical non-corrective dual lens eyewear:

FIG. 4A: Shows a spherical piano lens of 9D base curve with optical axis and direct line of sight collinear.

FIG. 4B: Shows a spherical piano lens of 8D base curve with axis offset in the plane of analysis by 15 mm to achieve wrap/rake according to the method of Houston et al. The refractive properties are not symmetrical for ocular rotation either side of the direct line of sight.

DETAILED DESCRIPTION OF PREFERRED EMBODIMENTS

Figure 1A:
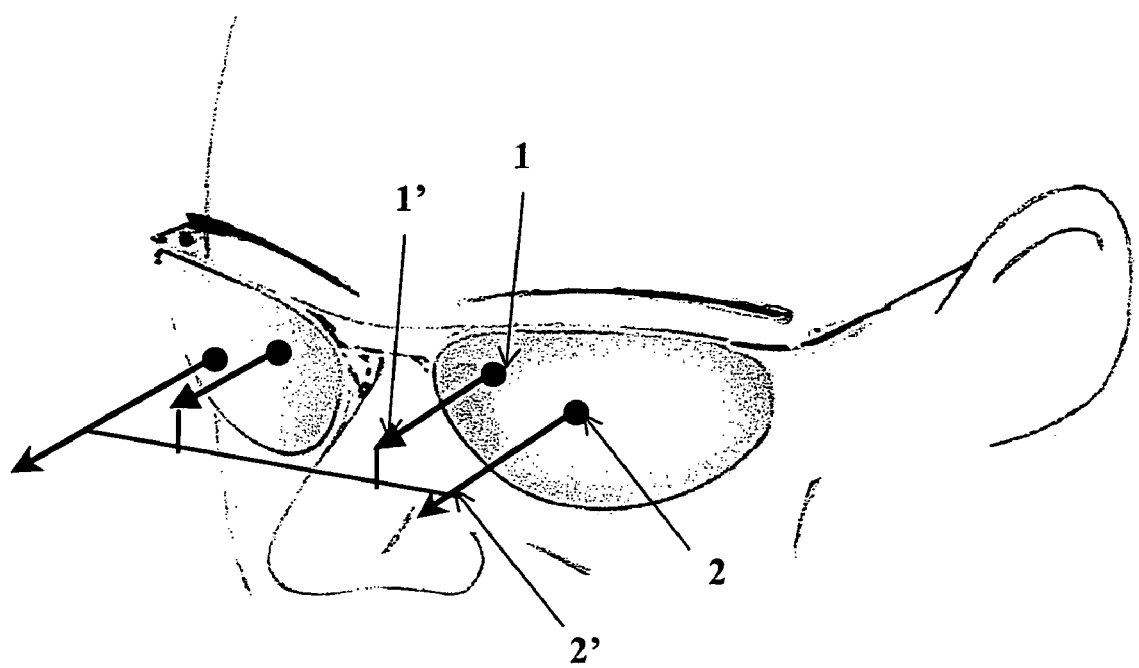
FIG. 1A Depicts a pair of prior art wrap around eyeglasses where the cosmetic appeal is achieved by displacing the optical axis 1–1' of the lens nasally and superiorly with respect to the wearer's direct line of sight 2–2' as worn.

For lenses of embodiments of the present invention, the first and second surfaces are continuous at least to the third derivative and exhibit no visible discontinuity, and more particularly no optical discontinuity. Preferably, the lens surfaces are co-varying surfaces such that the optical zone exhibits substantially zero mean through power. Lenses according to embodiments of the present invention are to be placed before the wearer with their optical axes substantially coincident with the direct lines of sight of each eye. A characteristic of the lenses is an optical zone in which the lens thickness varies smoothly, though not necessarily linearly, across an aperture equating the wearer's visual fixation field from its center to edge achieving relatively greater thickness in intermediate regions and being sustained across an aperture corresponding approximately to the visual fixation field as worn, thereafter tapering to relatively lesser thickness at its lateral extremities, and in which there is no tendency for unwanted negative refractive power.

Definition of the Lens Surfaces

Lens surfaces are designed frequently in accordance with specified attributes in their shape, such as a geometrical form that wraps the wearer's face, or attributes of slope that define the smoothness of the conformation to a wearer's face and that define also the nature of optical reflections visible both to the wearer and to observers. Accordingly, a mathematical procedure is required through which to define the physical form of surfaces having the specific curvature attributes elaborated above. General high and mixed order closed surfaces relevant to these designs are ovals of revolution or ovoids, as described in the *CRC Concise Encyclopedia of Mathematics*, by E. W. Weisstein, Chapman & Hall, New York 1999, p. 1293. Except for a few special instances, they are not classified by strict mathematical form, and may be achieved through a number of mathematical approaches, as we demonstrate below.

A standard ophthalmic surface of quadratic form is most frequently a surface created as a figure of revolution of a conic section. The mathematics of such conic sections are, of course, well understood and described for example by Jalie in his standard text *The Principles of Ophthalmic Lenses*, M. Jalie, Fourth Edition, London 1994, Chapter 21. One feature that unites all surfaces of this form is the relationship between first and second derivatives of surface height z(r), namely $$R^2 = z''\left(\frac{r}{z'}\right)^3 = \frac{r_S^3}{r_T} \text{ or } R^2 = \frac{K_T(r)}{[K_S(r)]^3}$$

where R is the vertex radius of curvature; $r_T$ and $r_S$ are the tangential and sagittal radii of curvature, $K_T(r)$ and $K_S(r)$ are the tangential and sagittal curvatures. Thus, the "implied vertex radius" R(r) calculated from the derivatives of a sectional curve at any point will remain constant along any section of a surface if the surface is quadratic. If the surface is not quadratic, the implied vertex radius will increase or decrease according to whether the surface is prolate or oblate. We term the ratio of the implied vertex radius to the true vertex radius the surface "Q-value", Q(x)=R(x)/R(0).

Accordingly in another aspect of the present invention there is provided an optical lens including a first surface having an axis of symmetry; and a second surface of complementary curvature having an axis of symmetry;

at least one surface exhibiting significant deviation in surface height from a standard optical reference surface of quadratic form;

the deviation in surface height commencing locally on the lens aperture, extending generally across the entire surface;

the deviated surface so formed being a surface inscribed between an inner osculating surface of standard optical form and an outer osculating surface of standard optical form having a vertex radius different from the first;

the tangential and sagittal radii varying across the deviated surface so that $Q(r) = r_S^3/r_T R(0)^2$ is non-constant, being unity at the vertex and changing by at least 0.25 away from the axis of symmetry where $r_T$ and $r_S$ are the tangential and sagittal radii of curvature, respectively, and R(0) is the vertex radius of curvature;

the corresponding tangential and sagittal curvatures $K_T$ and $K_S$ varying across the deviated surface so that $$Q(r) \equiv K_T(r) * [K_S(0)]^2 / [K_S(r)]^3$$

is non-constant, being unity at the vertex and changing by at least 0.25 away from the axis of symmetry where $K_S(0)$ is the vertex sagittal curvature;

the deviated surface optionally exhibiting an outer zone of low surface astigmatism in the periphery within which the surface is approximately umbilic, and;

the first and second surfaces in combination defining an optical axis and an optical zone exhibiting substantially zero mean through power.

Preferably, the inner osculating surface is a conicoid of revolution with respect to the optical axis and the vertex of the deviated surface is umbilic, being a sphere point. The inner osculating surface may be toric. Preferably the toric surface will be circular in all meridians. More preferably the inner and outer osculating surfaces have the same rotational symmetry with respect to a common axis.

Preferably, the surface "Q-value" will be approximately constant in a central region of the lens aperture around the direct line of sight as worn and decline away therefrom, being less than 0.75 in the peripheral visual field at field angles ~60° for lenses, more preferably less than 0.75 within the visual fixation field at field angles ~40°. Most preferably, there will be a stable minimum of "Q-value" at an umbilic region in the margin of the wearer's visual fixation field and/or into the zone of peripheral vision.

The deviated surface will exhibit substantial oblique surface astigmatism, increasing from the vertex, undergoing a maximum at an intermediate field angle, and declining toward the approximately umbilic peripheral region. Preferably the chosen lens aperture will locate the region of maximum surface astigmatism in the margin of the wearer's visual fixation field. More preferably, the chosen lens aperture will locate the approximately umbilic region close to the lens edge in the wearer's peripheral field of vision.

A suitable rotationally symmetric oblate surface that is substantially different from a quadratic surface will satisfy the relationship $$z(r) = \sum_{n \geq 2}^{m} A_n r^n \text{ where } \overline{z''\left(\frac{r}{z'}\right)^3} \ll \left(\frac{1}{2A_2}\right)^2.$$

The condition stipulates that the form of the polynomial will be dominated by coefficients $A_n$ where $n \geq 3$ and these will change in a sequence unlike that for a conicoid. The numerical exponents n are integers defining the "numeric order" of the surface components. It is sufficient in designing the front surfaces of lenses according to embodiments of the present invention to work with coefficients having numeric order 2 to 8, placing most weight on those in the range 3 to 5. It is convenient on occasions to express the surface in the form $$z(r) = C(r) + \sum_{n \geq 3}^{m} A_n r^n$$

$$\text{where } C(r) = \frac{R}{p}\left[1 - \sqrt{1 - p\frac{r^2}{R^2}}\right]$$

The first term specifies a complete quadratic surface. It may be a conicoid of revolution having vertex radius R and shape coefficient p, whence the polynomial describes only the deviation from a conicoid. In this case a central sphere is defined by shape factor p=1, a paraboloid by p=0, and a hyperboloid by p<0. Other values of p define ellipsoids. Alternatively, the surface may be toroidal or generally ellipsoidal. A weighting function may be applied if necessary to achieve specific design objectives.

Accordingly in a further aspect of preferred embodiments of the present invention there is provided an optical lens including a first surface having an axis of symmetry; and a second surface of complementary curvature having an axis of symmetry;

at least the front surface exhibiting significant deviation in surface height from a standard optical reference surface of quadratic form;

the deviation in surface height commencing locally on the lens aperture, extending generally across the entire surface;

the deviated front surface so formed being a surface defined by the addition of the surface heights of a polynomial to the reference surface, the numeric order of the coefficients being in the range from 2 to 8;

the deviated surface exhibiting an oblique region of high astigmatism and optionally an outer zone of low surface astigmatism in the periphery around which the surface is approximately umbilic, and;

the first and second surfaces in combination defining an optical axis and an optical zone exhibiting substantially zero mean through power.

In an alternative approach according to embodiments of the present invention, a pair of quadratic surfaces $C_1(r)$ and $C_2(r)$ of different curvatures $B_1$ and $B_2$ are combined by use of a suitable weighting function $M(r)$ to give a final rotationally symmetric surface having the form, $$z(r) = M(r) * C_1(r) + (1 - M(r)) * C_2(r).$$

Any suitable weighting function may be used, as for example using the hyperbolic secant;

$$M(r) = a * \text{sech}(r/b).$$

This surface merges with its outer osculating surface in the lateral regions and with the inner osculating surface at its crown. The surface "Q value" is unity at the crown and declines smoothly off axis toward a constant value laterally that corresponds to the ratio of vertex curvatures, $B_1/B_2$, in the two conicoidal regions. Surface astigmatism grows rapidly away from the crown and subsequently declines smoothly to low values in the outer region where the surface may be umbilic. This behavior is governed by the weighting function, which must decline smoothly from unity on either side of the origin of coordinates. In the present representation, the parameter b controls the general rate of change of the surface while the parameter a sets the central value. If the weighting function has a central value less than unity, the vertex region will have intermediate curvature between the two defining surfaces and a relatively broader umbilic crown.

Accordingly in a different aspect of preferred embodiments of the present invention there is provided an optical lens including a first surface having an axis of symmetry; and a second surface of complementary curvature having an axis of symmetry;

at least one surface exhibiting significant deviation in surface height from a standard optical reference surface of quadratic form;

the deviation in surface height commencing locally on the lens aperture, extending generally across the entire surface;

the deviated surface so formed being a surface that merges the surface heights of the reference surface with those of the second surface by means of a suitable weighting function;

the deviated surface design is smooth at least to its third derivative;

the deviated surface exhibiting an oblique region of high astigmatism and optionally an outer zone of low surface astigmatism in the periphery around which the surface is approximately umbilic, and;

the first and second surfaces in combination defining an optical axis and an optical zone exhibiting substantially zero mean through power.

The oblique optical properties of a lens are determined by undertaking ray trace analysis of the lens, either with reference to the center of rotation of the eye, as worn, or with reference to the center of the pupil stop in forward gaze. The oblique errors found for simple quadratic surfaces arise because of the changing angles of incidence between elements of oblique surface and chief rays directed away from the optical axis at angles greater than 20° or so. In departing from such simple surfaces, the complexity of rapidly changing surface curvatures in the oblique field has been added. However, the surface forms according to embodiments of the present invention may actually simplify the trigonometry of the optical system. In particular it has been disclosed that the surface forms described above usually have the effect of limiting the off-axis angles of incidence. The chief ray from the center of rotation of the eye to an oblique element of a preferred surface according to embodiments of the present invention makes an internal angle of incidence that rises in a central aperture more rapidly than would apply for the standard optical reference surface. It then saturates to remain at approximately constant values for higher visual field angles. Chief rays referred to the center of the pupil stop behave similarly.

Surfaces according to embodiments of the present invention may be specified, not by the surface heights themselves, but by selecting an appropriate functional form for the variation of internal angle of incidence. An analysis of the basic geometric relationships yields the following differential equation relating the internal angle of refraction d(r), the surface height z(r) and the surface slope z'(r);

$$r - z'(r)(L - z(r)) = \sin[d(r)]\sqrt{r^2 + (L - z(r))^2(1 + [z'(r)]^2)}$$

where L is the distance from surface vertex to the reference center of the analysis. This equation is readily soluble with modern mathematics programs, given a suitable model function for d(r) and one boundary condition, such as the physical location of the vertex. A model function that we have found useful is $$\sin d(r) = \sin \gamma \ast (1 - \exp(-nr^2/L^2))^{1/2},$$

which specifies that the angles are exactly constant, d=γ, throughout the oblique field. Surfaces determined in this way are torispheric domes; the outer surface regions do not merge into a spherical region, but exhibit an umbilic ring around which the surface astigmatism is low and slowly changing.

Accordingly in a still different aspect of embodiments of the present invention there is provided an optical lens including a first surface having an axis of symmetry; and a second surface of complementary curvature having an axis of symmetry;

at least one surface exhibiting significant deviation in surface height from a standard optical reference surface of quadratic form;

the deviation in surface height commencing locally on the lens aperture, extending generally across the entire surface;

the deviated surface so formed being angled to a chief ray from the center of rotation of the eye so that the angle of incidence rises with ocular rotation in a first paraxial region and subsequently remains approximately constant or declines slowly across the oblique field to the lateral limit;

the deviated surface exhibiting an oblique region of high astigmatism and optionally an outer zone of low surface astigmatism in the periphery around which the surface is approximately umbilic, and;

the first and second surfaces in combination defining an optical axis and an optical zone exhibiting substantially zero mean through power.

Preferably, the angle of incidence made by a chief ray from the center of rotation of the eye to oblique surface regions will remain essentially constant at a value of 30° or less, more preferably less than 20° and most preferably less than 15°. Preferably, the angle of incidence made by a chief ray from the center of the pupil stop to oblique surface regions will remain essentially constant at a value of 45° or less, more preferably less than 35° and most preferably less than 30°.

Optimization of Lens Properties

It is thus evident that quite detailed requirements in surface shape and slope must be satisfied in order to produce a highly desirable ophthalmic lens article. Such is an objective of the present invention. When a designer approaches the task of creating the front and back surfaces for a lens, the aesthetic form of at least the front surface, the reliability of manufacture of both surfaces, and the optical criteria defining a "good" lens are all at question. Non-corrective lenses according to embodiments of the present invention have constant thickness or increasing thickness across an aperture surrounding the vertex, the lens being relatively thinner at or near the optical axis. The choice of design parameters allows control of both the thickness variation and the size of the aperture in which it is sustained at or above the lens center thickness value, without imposing refractive and prismatic errors at the direct line of sight, the latter being aligned with the optical axis as worn. This effect bears an added major influence on the optimization procedures available to a lens designer.

Computational methods that assist surface correction of (say) a lens back surface with a predefined front surface involve the use of merit functions that quantify the relationship between the properties achieved and target performance objectives. Such merit functions are based typically on the refractive errors observed, these being the mean power error MPE, the RMS power error RMSPE (also termed the RMS blur) and the astigmatic or cylinder error, wherein $$RMSPE = \sqrt{[MPE]^2 + \frac{1}{4}[Cyl\ Error]^2}.$$

The following merit functions are frequently selected to optimize a lens in a range of ocular rotations θ:

$$M_2 = \sum_\theta ([RMS\ Blur]^2)_\theta$$

$$M_2 = \sum_\theta ([MPE]^2 + [Cyl\ Error]^2)_\theta$$

$$M_3 = \sum_\theta \left(\frac{1}{16}[MPE]^2 + [Cyl\ Error]^2\right)_\theta$$

$$M_4 = \sum_\theta \left([MPE]^2 + \frac{1}{16}[Cyl\ Error]^2\right)_\theta,$$

the choice depending on the weighting between power and astigmatism in the strategy. In this case it is appropriate to introduce other merit functions to measure for example the optical prism of a lens and rates of change of properties such as blur and prism, for example;

$$M_{\alpha,\beta} = \sum_\theta (\alpha[RMSBlur]^2 + \beta[[Static\ Prism]]^2)_\theta, \text{ or}$$

$$M_{a,b} = \sum_\theta \left(\alpha[RMSBlur]^2 + b\left[\frac{\partial(Static\ Prism)}{\partial\theta}\right]^2\right)_\theta.$$

Such merit functions are applied over both the visual fixation and the peripheral fields. However, for each ray direction (ocular rotation) there is a non-negative weight that controls the relative contribution of the RMS Blur (a) and Static Prism (b) in each different field. Typically, the Static Prism is controlled in the outer angular ranges to achieve desirable and stable optics with the more conventional RMS Blur section of the merit function applied to the inner field.

In a still further aspect of embodiments of the present invention, there is provided a pair of non-corrective lenses in a frame or structure of wrap-around type capable of positioning the lenses accurately before a wearer so that the direct lines of sight coincide substantially with the corresponding optical axes of the lenses, the lenses conforming to the shape of the face and enclosing substantially the forward and peripheral visual fields by virtue of their physical shape and sagittal depth wherein each lens is characterized as follows:

a first lens surface has an axis of symmetry; and
a second lens surface has complementary curvature and axis of symmetry;
at least one surface exhibits significant deviation in surface height from a standard optical reference surface of quadratic form;
the deviation in surface height commences locally at an apex on the lens aperture, extending generally across the entire surface;
the deviated surface exhibits an oblique region of high astigmatism and optionally an outer zone of low surface astigmatism in the periphery around which the surface is approximately umbilic;
the first and second surfaces in combination define an optical axis and an optical zone in which the lens thickness is sustained without taper across the full lens aperture enclosing the visual field toward the peripheral limits as worn;
there are no significant refractive or prismatic errors at the direct line of sight as worn;
the oblique refractive power errors remain small and below a set limiting value within a large portion of the visual fixation field beyond which they rise smoothly to a stable maximum value, at the edge of the visual fixation field and the near peripheral field of vision, that is defined by the clinically established troublesome blur threshold;
the magnitude of the static contribution to optical prism increases smoothly with increased visual field angle across an aperture approximating the visual fixation field, the trend exhibiting an inflexion so that the prism magnitude assumes a steady value substantially without change across the peripheral field of vision, and;
the magnitude of rotational contribution to optical prism increases slowly from zero at the direct line of sight with ocular rotation across the visual fixation field.

Preferably the oblique refractive power and prismatic errors vary symmetrically in at least one meridian of the visual fixation field, preferably in at least a pair of orthogonal meridians of the visual fixation field.

Preferably, the RMS power error and astigmatic error are both: less than 0.15D in a paraxial field of angular width about ±25°; less than 0.30D in about half the area of the visual fixation field; less than 0.4D over most of the visual fixation field, and; at least as low as 0.75D, preferably less than 0.5D, at the outer limit of the visual fixation field corresponding to ocular rotations of about 40° or greater. Preferably the average angular rate of growth in magnitude of the rotational prism component is as small as 25 mD/Deg, more preferably of order 12.5 mD/Deg across the visual fixation field, and the average angular rate of growth in magnitude of the static prism component is as small as 60 mD/Deg, more preferably of order 30 mD/Deg from direct line of sight to the outer peripheral limits. Alternatively, the prism may be minimized such that the average angular rate of growth in magnitude of both rotational and static prism components is about 40 mD/Deg of visual field angle or less across an aperture corresponding substantially to the visual fixation field.

The present invention will now be described more fully with reference to the accompanying figures and examples. It should be understood, however, that the description following is illustrative only and should not be taken in any way as a restriction on the generality of the invention described above.

EXAMPLE 1

(Prior Art)

Non-Corrective Elliptical Lens

Tackles describes in U.S. Pat. No. 5,774,201, non-corrective lens forms suitable for unitary or dual lens eyewear having substantially elliptical cross-sections in a horizontal plane and a variety of forms vertically. The preferred horizontal arcs are ellipses with eccentricity in the range 0.10 to 0.85 and they extend between one apex of the major axis and the opposed apex, around the minor axis vertex. Accordingly, (1) the medial portion of the horizontal arc of the lenses has lower curvature than the remainder of the arc (2) the lateral ends have gradually tightening curvature relative to the medial portion, and (3) the curvature change from medial to lateral regions horizontally is smooth, being a stated advantage of the configuration.

Tackles allows specifically that the length of the major axis of the ellipse may vary along the length of the arcuate section, provided that the cross-section conforms substantially to an ellipse. Although the profile of the cross-section is allowed to deviate somewhat from an ellipse, it must retain the beneficial characteristics described. One such characteristic is the monotonic change of curvature with the medial portion of the lens having less curvature than the end portions. The second is the ability to offset the optical axis of the lens significantly from the direct line of sight as worn without inducing optical error, particularly optical prism, at the direct line of sight. Lens surface curves according to embodiments of the present invention provide neither of these latter features. Specifically, they show a maximum of tangential surface curvature intermediate between the central region and the lateral ends of a meridian (i.e., in the medial portion of the lens), and they are not suited to substantial offset of the direct line of sight from the optical axis.

Figure 3A:
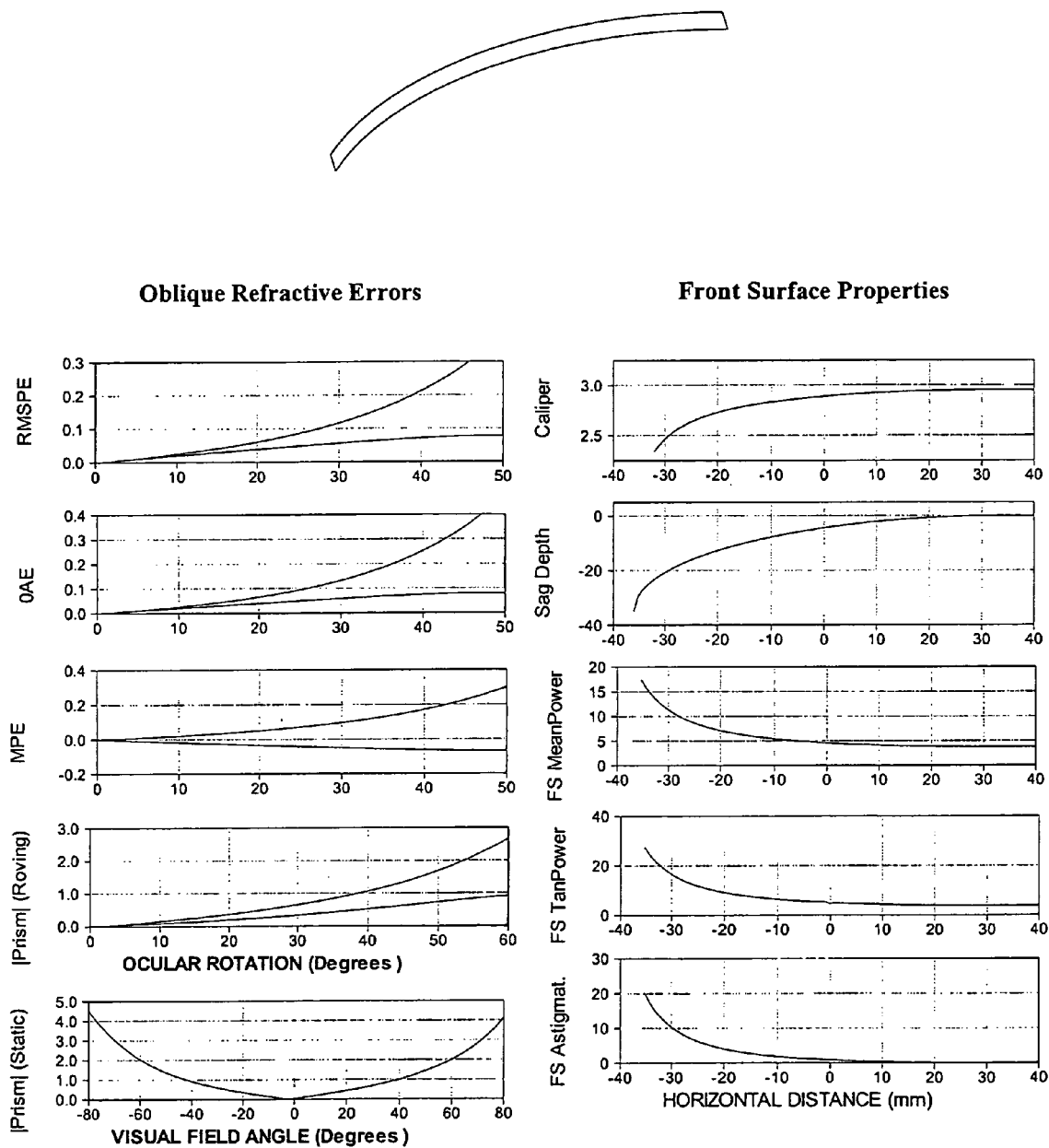
FIGS. 3A and 3B Describe prior art unitary lenses described by Davis and Waido.

A non-corrective ellipsoidal lens is described in U.S. Pat. No. 5,604,547 (Davis and Waido) and its properties are depicted in FIG. 3A. This lens has front surface eccentricity e=0.866 (shape factor p=4.0) and is located so that the optical axis is at the Cyclopean axis within the wearer's medial plane. The direct lines of sight are decentered by 34 mm, the front surface semi-major axis has length 70 mm and the prolate rim of the surface occurs 36 mm laterally of the direct line of sight. Note firstly that the front surface tangential power increases smoothly toward the prolate rim. The front surface astigmatism is small at the direct line of sight and also increases smoothly toward the prolate rim. Note secondly that the lens thickness tapers smoothly from a maximum at the optical axis, as do the less eccentric elliptical lenses claimed by Tackles. Finally, the refractive properties and prism magnitudes show no significant error at the direct line of sight. There are relatively greater oblique errors laterally than nasally, creating significant left/right eye binocular disparity for version movements.

Figure 2A:
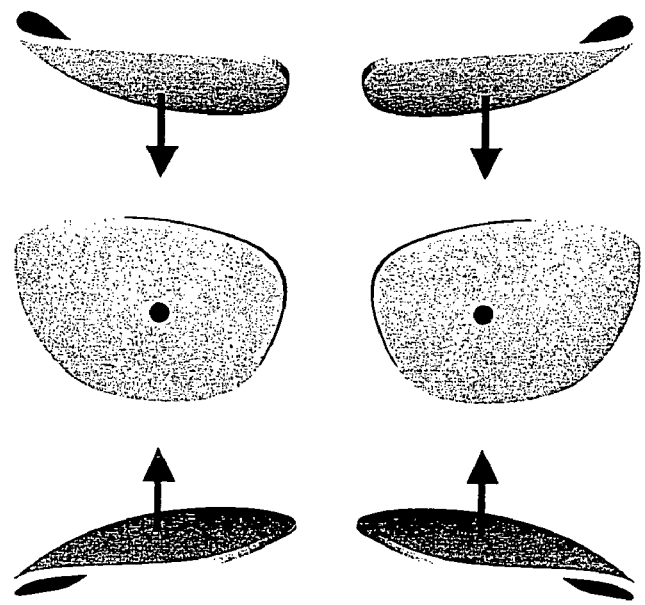
FIGS. 2A–2D
Figure 2B:
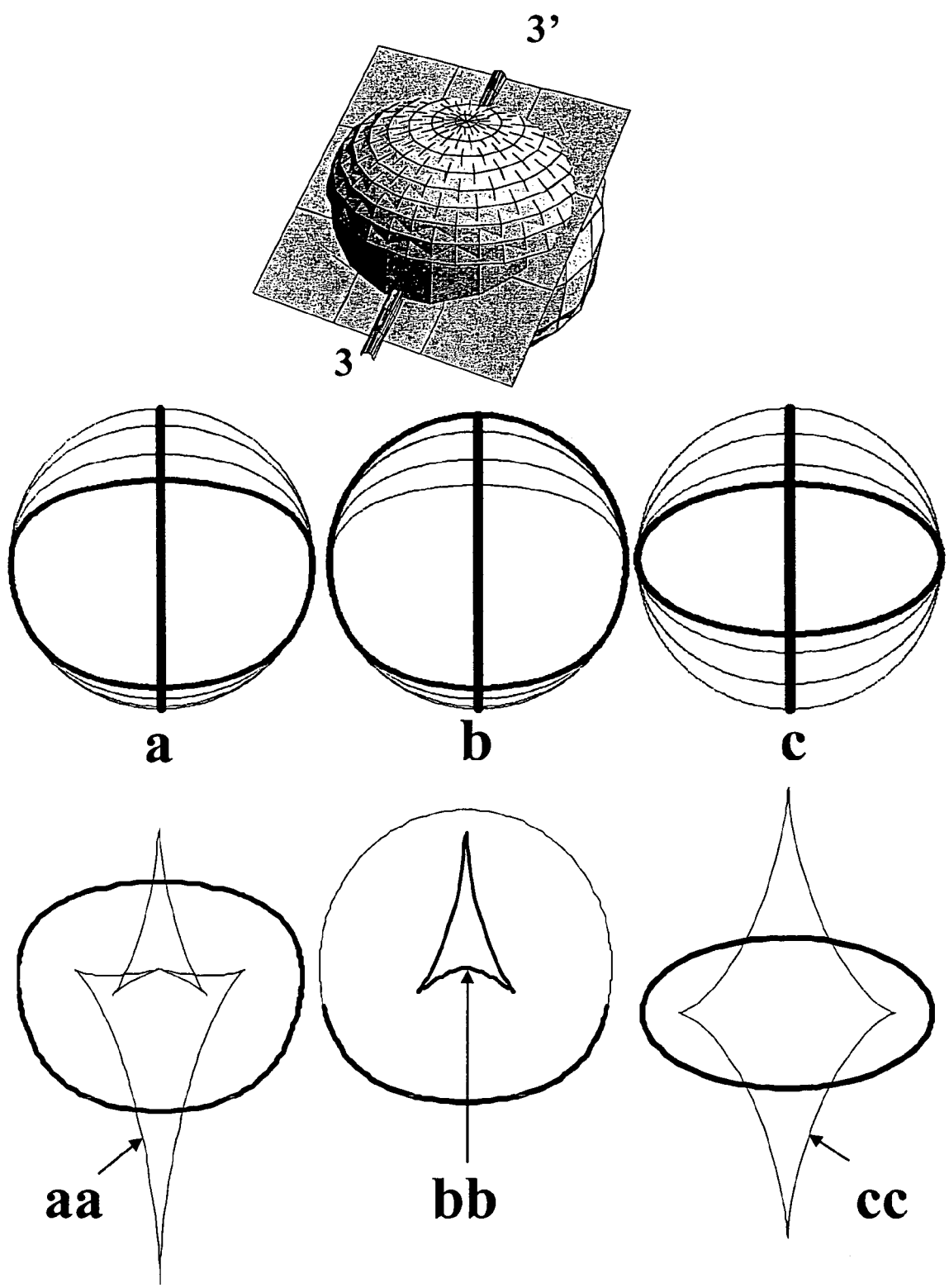

The evolute of the front surface ellipse is shown in FIG. 2B part (bb). As discussed above, the normal vectors from the surface to the horizontally displaced cusps of the ellipse evolute correspond to a vertex of the curve and are directed orthogonally with respect to the ellipse minor axis. The angle $\phi$ cannot differ significantly from 90 degrees.

EXAMPLE 2

(Prior Art)

Aspheric Sunglass

In U.S. Pat. No. 5,604,547, Davis and Waido describe non-corrective sunglass or eye protector polycarbonate lenses of the unitary wrap around style comprising a pair of surfaces forming lenses of "substantially uniform" thickness throughout, each surface being a figure of revolution generated by conic sections. The axis of rotation is the optical axis of the lens. It is placed mid-way between the wearer's direct lines of sight as worn, corresponding to the Cyclopean axis within the wearer's medial plane. Davis and Waido disclose in particular (Claim 18) a method of bending the peripheral limit of a unitary shield beyond the wearer's forward field of binocular vision (that is, at visual field angles beyond 40 o or 50 o from the wearer's direct line of sight), by combining front and back surfaces having central regions of curvature between 1.0 and 6.0D with other polynomial terms having exponents between 10 and 30, according to the sag equation $$z = Ar^2 + Br^C$$

where A and B are coefficients, C is an even integer exponent and controls the degree of wrap. Radial distance r is measured from the optical axis, or wearer's Cyclopean axis.

Figure 3B:
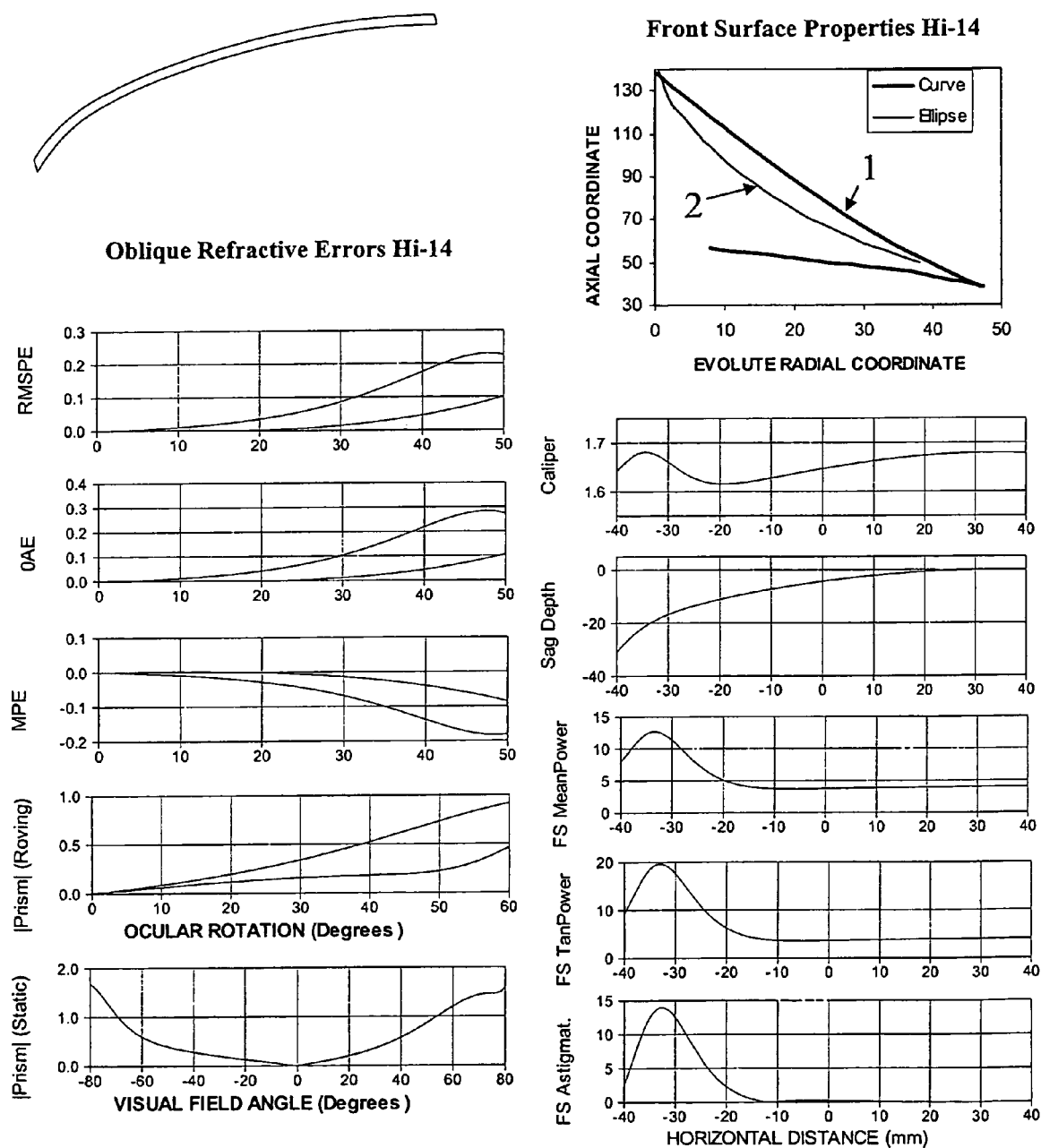

Each of the lens designs of Table 2A have been created in order to help understand their properties. Horizontal cross-sections of the lenses depict a steady central curvature associated with the quadratic terms of the sag equation and a somewhat abrupt bend temporally, as shown in FIG. 3B. In general, the high order (term provides the desired side wrap depth and has no significant influence on the optical properties of the forward viewing portion of the lens element. The greatest level of such intrusion is exhibited by the design of lens Hi-14#2. All of the lenses taper smoothly from the optical axis across the visual field laterally of the direct line of sight (see Table 2A).

TABLE 2A

Lens design coefficients from Davis and Waido, U.S. Pat. No. 5,604,547 and the lens thickness values at the optical center $t_O$ and at the direct lines of sight $t_E$.

| Code | Surface | A | B | C | $t_O$ (mm) | $t_E$(mm) |
|---|---|---|---|---|---|---|
| Hi-50 | Front | 3.773585 E−03 | 5.643593 E−93 | 50 | 2.0 | 1.94 |
|  | Back | 3.794748 E−03 | 2.083825 E−92 |  |  |  |
| Hi-30 | Front | 2.830189 E−03 | 4.822104 E−55 | 30 | 1.7 | 1.67 |
|  | Back | 2.840287 E−03 | 8.559449 E−55 |  |  |  |
| Hi-14 #1 | Front | 5.660377 E−03 | 1.257946 E−26 | 14 | 1.7 | 1.59 |
|  | Back | 5.700915 E−03 | 1.683942 E−26 |  |  |  |
| Hi-14 #2 | Front | 3.773585 E−03 | 7.088609 E−26 | 14 | 1.7 | 1.65 |
|  | Back | 3.791559 E−03 | 9.195496 E−26 |  |  |  |

TABLE 2B

Front surface properties of the lens Hi-14 #2 as a function of horizontal distance and visual field angle toward the temples from the direct line of sight.

| x (mm) | θ (Deg) | ½($K_S + K_T$) (D) | $\|K_S - K_T\|$ (D) | $K_T$ (D) | Φ(x) (Deg) | R(x)/R(0) |
|---|---|---|---|---|---|---|
| 35.0 | 49.4 | 4.0 | 0.0 | 4.00 | 0.43 | 1.00 |
| 30.0 | 45.1 | 4.0 | 0.0 | 3.99 | 1.73 | 1.00 |
| 25.0 | 40.1 | 4.0 | 0.0 | 3.97 | 3.89 | 1.00 |
| 20.0 | 34.4 | 4.0 | 0.0 | 3.93 | 6.03 | 1.00 |
| 15.0 | 27.6 | 3.9 | 0.1 | 3.88 | 8.16 | 1.00 |
| 10.0 | 19.8 | 3.9 | 0.1 | 3.81 | 10.27 | 1.00 |
| 5.0 | 10.6 | 3.8 | 0.2 | 3.73 | 12.35 | 1.00 |
| 0.0 | 0.0 | 3.8 | 0.2 | 3.65 | 14.40 | 1.00 |
| −5.0 | −11.6 | 3.7 | 0.2 | 3.60 | 16.43 | 1.01 |
| −10.0 | −23.8 | 3.8 | 0.1 | 3.72 | 18.49 | 1.03 |
| −15.0 | −35.7 | 4.1 | 0.5 | 4.34 | 20.76 | 1.11 |
| −20.0 | −46.7 | 5.1 | 2.3 | 6.29 | 23.77 | 1.27 |
| −25.0 | −56.7 | 7.6 | 6.6 | 10.88 | 28.79 | 1.47 |
| −30.0 | −66.3 | 11.4 | 12.6 | 17.71 | 38.06 | 1.46 |
| −35.0 | −77.0 | 12.3 | 12.3 | 18.46 | 52.81 | 1.14 |
| −40.0 | −88.4 | 8.0 | 2.6 | 9.28 | 68.50 | 0.71 |

In the presentation of the results, the axis Oz (x=0) has been placed at the direct line of sight of the wearer's left eye and the optical axis nasally at the position x=+34 mm. Portions of the lens disposed temporally of the direct line of sight correspond to negative values of x. For the designs investigated, the front surface curvature remains essentially constant for a large portion of the visual field both nasally and temporally of the direct line of sight. The detailed variations of front surface properties are given in Table 2B and FIG. 3B. Both front and back surfaces are prolate and free of astigmatism in a central region so that the tangential curvature declines from the optical axis to a region corresponding to ocular rotation of about 35° temporally, beyond which the front surface tangential curvature $K_T$, mean curvature $\frac{1}{2}(K_S+K_T)$ and surface astigmatism increase smoothly from the outer temporal visual fixation field, undergoing a maximum value in the temporal bend at about 70° field angle, well outside the visual fixation field. The "surface Q value" Q=R(x)/R(0) remains greater than unity some 75° away from the direct line of sight.

The front surface curve evolute (1) changes under the influence of the high order bending coefficients and is approximately linear until the horizontally displaced cusp, the surface normal vector to which is inclined at about $\phi=50°$ to the optical axis. This evolute does not correspond to a standard form curve. The closest fit to an ellipse evolute is shown as curve (2) in FIG. 3B, corresponding to a=75 mm, b=39 mm, e=0.854 and p=3.70.

The caliper thickness of the lens Hi-14#2 is not constant, but tapers from 1.7 mm at the optical axis to 1.65 mm at the direct lines of sight, with some thickening at the lateral bend. The lens has refractive properties, power errors and prism that vary smoothly with ocular rotation but which differ between left and right eyes for version movements, as shown in FIG. 3B. Static prism also has left/right disparity. This is a typical disadvantage of decentered lens designs.

See for comparison, a spherical lens located with its optical axis and the direct line of sight as worn being collinear (FIG. 4A) and a similar lens translated nasally by 15 mm (the direct line of sight being angled at 103° to the front surface) according to the method of Houston et al outlined in U.S. Pat. Nos. 5,648,832 and 5,689,323 (FIG. 4B). The wrapped/raked spherical lens shows left/right eye disparity.

EXAMPLE 3

"Non-Quadratic" Polynomials

A basis of embodiments of the present invention is the ability to achieve desirable and controllable surface shapes by the use of generating curves that are substantial mathematical distortions of a circle, ellipse, or any standard quadratic curve. Applying a distorting function to a standard quadratic curve may create a desired curve. Alternatively, the curve may be defined directly by a functional or polynomial expression. Direct formulation of the surface generating curve(s) is frequently desirable. One such approach is given below.

A suitable rotationally symmetric oblate surface will satisfy the relationship $$z(r) = \sum_{n\geq 2}^{m} A_n r^n \text{ where } \overline{z''\left(\frac{r}{z'}\right)^3} \ll \left(\frac{1}{2A_2}\right)^2.$$

The condition stipulates that the form of the polynomial will be dominated by coefficients $A_n$ where $n \geq 3$ and these will change in a sequence unlike that for a conicoid.

We may apply various boundary conditions at the vertex r=0 and a lateral position r=ρ, in order to pre-dispose the surface form, such as;

| | |
|---|---|
| Define central Curvature | $z''(0) = A_2 = K_0$ |
| Define lateral sagittal depth: | $z(\rho) = \sum_{n\geq 2}^{m} A_n \rho^n = Z$ |
| Define lateral slope | $z'(\rho) = \sum_{n\geq 2}^{m} nA_n \rho^{n-1} = S$ |
| Lateral umbilic condition at edge | $K_S(\rho) = K_T(\rho) \gg K_0$ |
| Stability of lateral umbilic condition | $K'_S(\rho) = K'_T(\rho) = 0.$ |

TABLE 3A

Surface design coefficients and properties of a polynomial surface according to an embodiment of the present invention having a crown curvature of 1 D.

| Surface-A | $A_2$ 1.0000 E-03 | $a_4$ 0.6000 E-05 | $a_6$ 0.0 | $a_8$ 0.0 | | |
|---|---|---|---|---|---|---|
| X | z(x) | θ | $K_T$ | $\|K_T - K_S\|$ | Φ(x) | Q(x) |
| 0.0 | −0.0 | 0.0 | 1.1 | 0.0 | 0.00 | 1.00 |
| 2.5 | −0.0 | 5.0 | 1.3 | 0.2 | 0.31 | 0.99 |
| 5.0 | −0.0 | 10.0 | 2.0 | 0.6 | 0.75 | 0.93 |
| 7.5 | −0.1 | 14.8 | 3.2 | 1.4 | 1.44 | 0.80 |
| 10.0 | −0.2 | 19.4 | 4.9 | 2.5 | 2.52 | 0.66 |
| 12.5 | −0.3 | 23.9 | 7.0 | 3.9 | 4.11 | 0.53 |
| 15.0 | −0.5 | 28.2 | 9.5 | 5.6 | 6.33 | 0.42 |
| 17.5 | −0.9 | 32.3 | 12.3 | 7.4 | 9.29 | 0.34 |
| 20.0 | −1.4 | 36.4 | 15.1 | 9.1 | 13.06 | 0.28 |
| 22.5 | −2.0 | 40.4 | 17.6 | 10.5 | 17.66 | 0.23 |
| 25.0 | −3.0 | 44.4 | 19.4 | 11.1 | 23.03 | 0.20 |
| 27.5 | −4.2 | 48.5 | 20.0 | 10.7 | 28.99 | 0.17 |
| 30.0 | −5.8 | 52.8 | 19.2 | 9.0 | 35.30 | 0.14 |
| 32.5 | −7.8 | 57.4 | 17.3 | 6.4 | 41.64 | 0.12 |
| 35.0 | −10.2 | 62.4 | 14.6 | 3.4 | 47.70 | 0.11 |
| 37.5 | −13.3 | 67.9 | 11.7 | 0.4 | 53.28 | 0.10 |
| 40.0 | −17.0 | 73.9 | 9.0 | −2.2 | 58.25 | 0.08 |

Figures 5A, 5B:
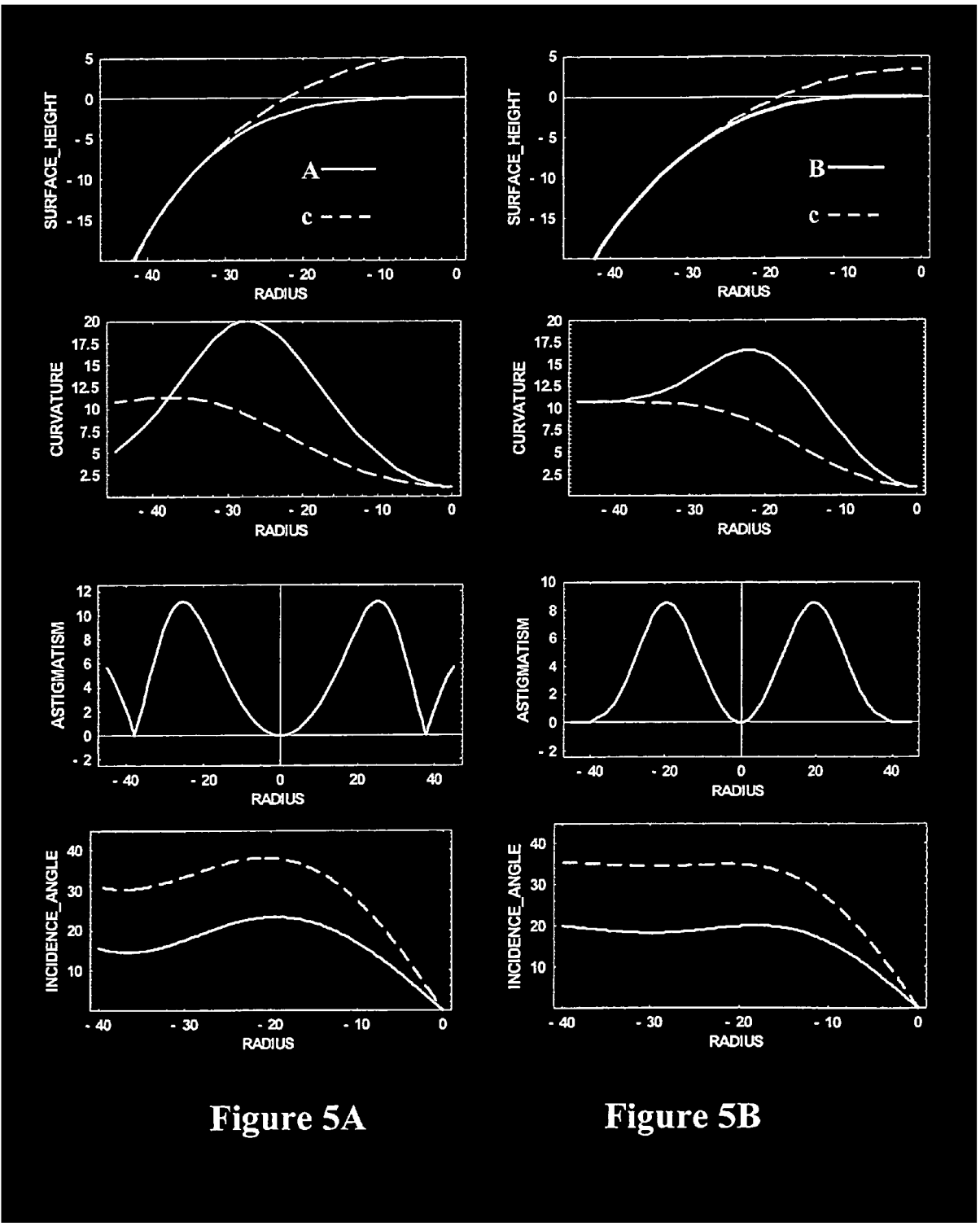
FIGS. 5A and 5B Show the properties of non-quadratic surfaces according to embodiments of the present invention having a spherical vertex point and a lateral umbilic ring (FIG. 5A) and one having a lateral umbilic band (FIG. 5B). Surface properties are summarized in Tables 3A and 3B.

The more such conditions are applied, the greater the number of coefficients that may be specified. Since, however, a suitable matching surface will need to provide a lens body meeting defined optical merit functions, more highly restricted surfaces can pose greater difficulty in lens optimization. In general, it is sufficient to limit the highest order of the front surface polynomial to m≈8. Two examples of surfaces constructed in this way according to an embodiment of the present invention, and their distinguishing properties are shown in Tables 3A and 3B, as well as FIGS. 5A and 5B.

TABLE 3B

Surface design coefficients and properties of a polynomial surface according to an embodiment of the present invention having a crown curvature of 1 D.

| Surface-B | $A_2$ 0.9434 E-03 | $a_4$ 1.0929 E-05 | $a_6$ -4.8776 E-09 | $a_8$ 1.1431 E-12 | | |
|---|---|---|---|---|---|---|
| X | z(x) | θ | $K_T$ | $|K_T - K_S|$ | Φ(x) | Q(x) |
| 0.0 | -0.0 | 0.0 | 1.0 | 0.0 | 0.0 | 1.00 |
| 2.5 | -0.0 | 5.0 | 1.4 | 0.3 | 0.3 | 0.98 |
| 5.0 | -0.0 | 10.0 | 2.7 | 1.1 | 0.8 | 0.83 |
| 7.5 | -0.1 | 14.8 | 4.7 | 2.4 | 1.8 | 0.64 |
| 10.0 | -0.2 | 19.5 | 7.2 | 4.0 | 3.4 | 0.48 |
| 12.5 | -0.4 | 24.0 | 9.9 | 5.7 | 5.7 | 0.36 |
| 15.0 | -0.7 | 28.4 | 12.6 | 7.2 | 8.8 | 0.28 |
| 17.5 | -1.2 | 32.6 | 14.9 | 8.2 | 12.6 | 0.23 |
| 20.0 | -1.8 | 36.9 | 16.2 | 8.5 | 17.0 | 0.19 |
| 22.5 | -2.7 | 41.1 | 16.6 | 7.9 | 21.7 | 0.16 |
| 25.0 | -3.8 | 45.4 | 16.0 | 6.6 | 26.6 | 0.14 |
| 27.5 | -5.2 | 49.8 | 14.9 | 4.8 | 31.4 | 0.12 |
| 30.0 | -6.9 | 54.2 | 13.5 | 3.1 | 36.0 | 0.11 |
| 32.5 | -8.9 | 58.9 | 12.3 | 1.7 | 40.4 | 0.10 |
| 35.0 | -11.2 | 63.7 | 11.5 | 0.8 | 44.8 | 0.10 |
| 37.5 | -13.8 | 68.7 | 11.1 | 0.4 | 49.2 | 0.10 |
| 40.0 | -17.0 | 74.0 | 10.7 | 0.0 | 54.0 | 0.09 |

Figure 2C:
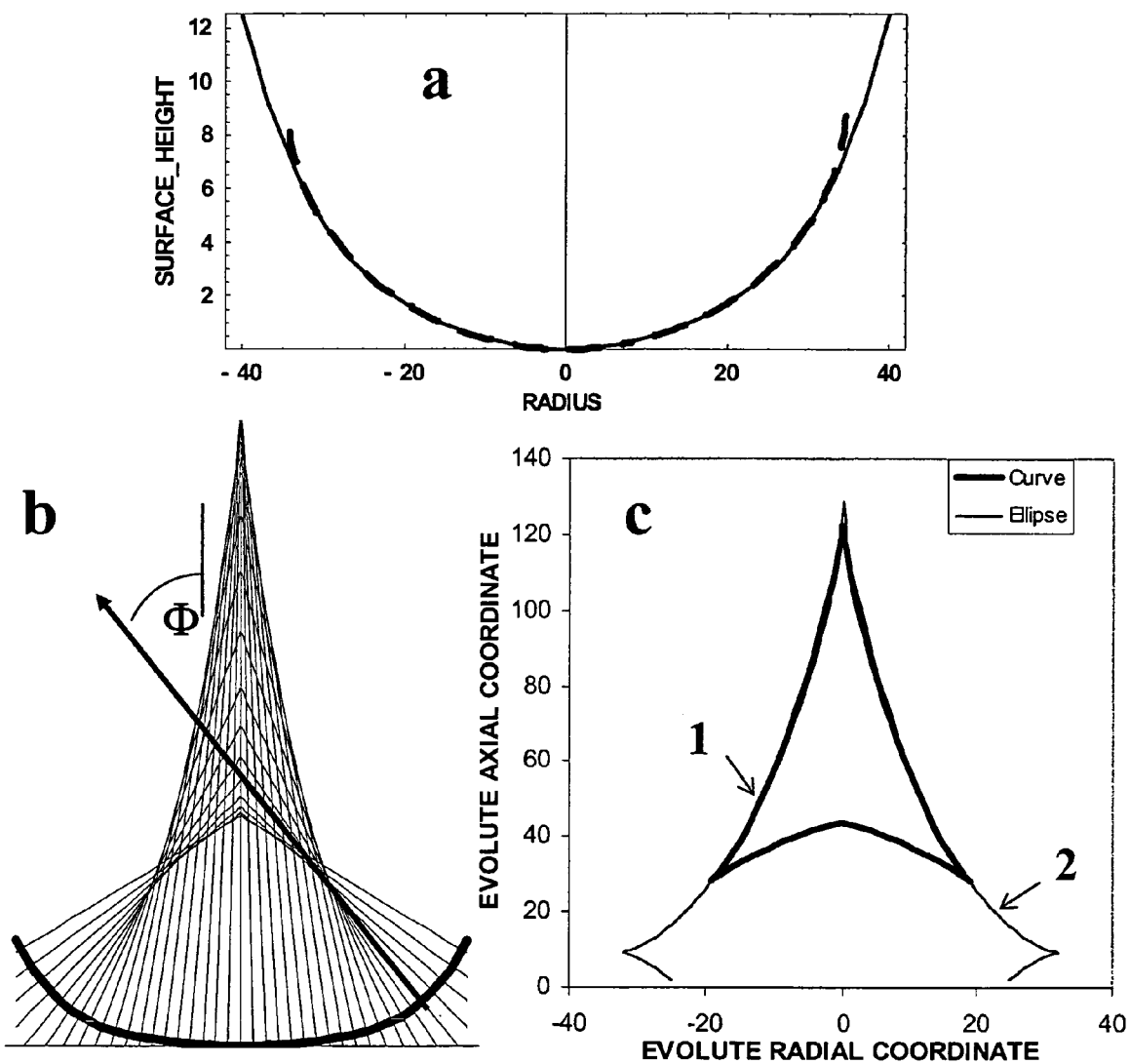
Figure 2D:
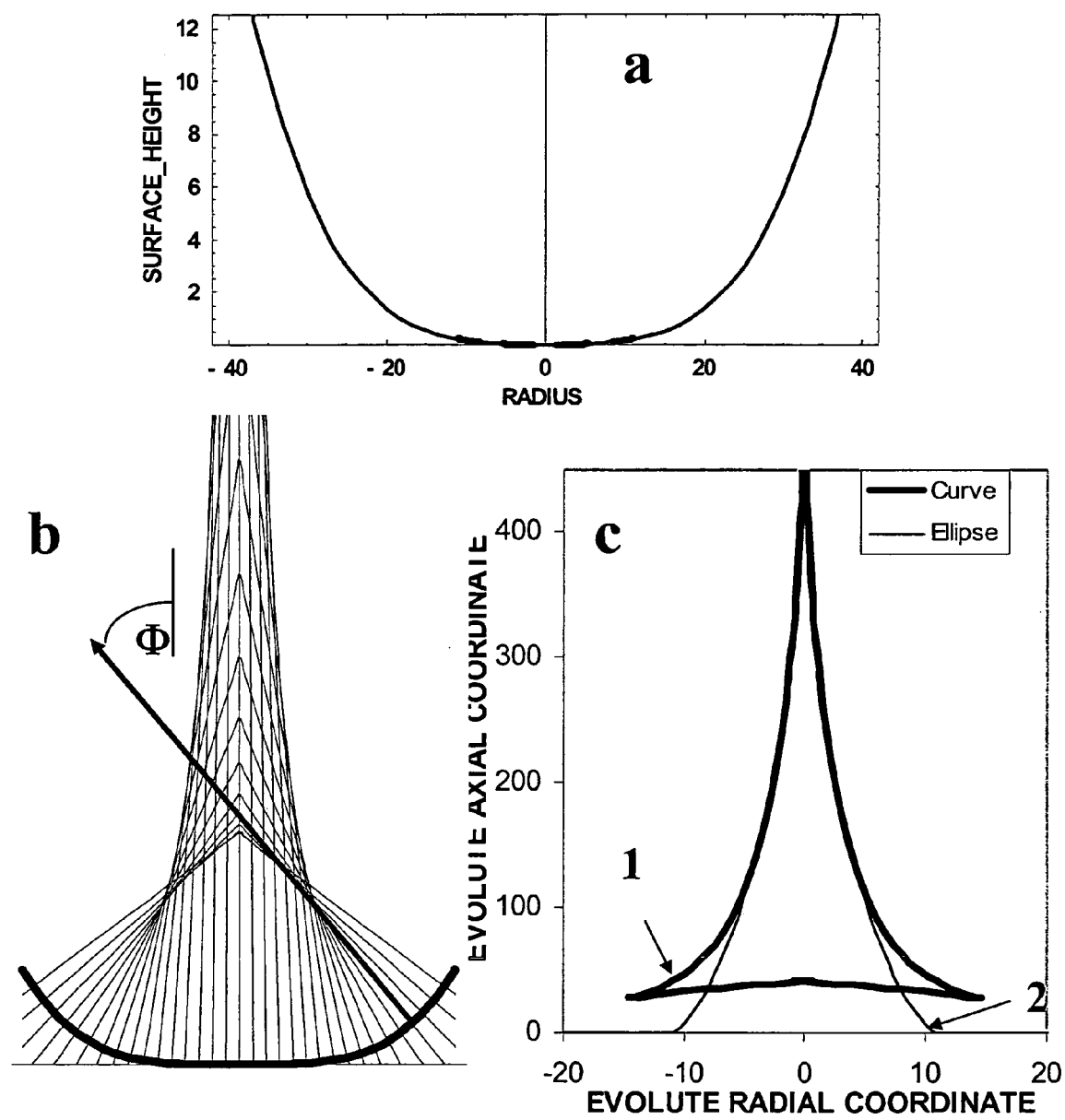

Both surfaces have an umbilic vertex, a crown curvature of 1D and an umbilic ring located at about r=±38 mm, corresponding to a visual field angle of about 68°. Such an angle cannot be reached by ocular rotation and, consequently, the umbilic regions are located in the peripheral field of vision for a wearer. The surfaces are noticeably flat at the crown and trend toward their osculating spheres laterally. Surface-A, shown in FIG. 5A, makes a simple intersection with the osculating sphere (curve c) and, as a result, exhibits an umbilic ring on the lateral surface. The evolute curve corresponding to a radial section of the surface has been discussed above in connection with FIG. 2D. Normal vectors from the curve to the horizontally displaced cusp of the curve evolute are inclined at about φ=30° to the symmetry axis. Surface-B, shown in FIG. 5B, merges with the osculating sphere and exhibits an extensive umbilic band at the lateral limit. Normal vectors to the surface at the locations of greatest tangential curvature are inclined at an angle of about φ=22° to the symmetry axis. Both surfaces show a maximum in surface astigmatism associated with the maximum of tangential curvature in the forward visual fixation field of a wearer. Clearly the surface astigmatism vanishes at the umbilic regions of the surfaces. In each case, the "surface Q-value" is substantially less than unity over most of the surfaces.

TABLE 3C

Surface design coefficients and properties of a prior art ellipsoidal surface.

| Surface-C | A 45.02 | B 29.78 | e 0.75 | | | |
|---|---|---|---|---|---|---|
| X | z(x) | θ | $K_T$ | $|K_T - K_S|$ | Φ(x) | Q(x) |
| 0.0 | -0.0 | 0.0 | 7.8 | 0.0 | 0.0 | 1.0 |
| 2.5 | -0.0 | 5.0 | 7.8 | 0.0 | 2.1 | 1.0 |
| 5.0 | -0.2 | 10.0 | 7.8 | 0.1 | 4.2 | 1.0 |
| 7.5 | -0.4 | 15.0 | 7.9 | 0.1 | 6.4 | 1.0 |
| 10.0 | -0.7 | 19.8 | 8.0 | 0.2 | 8.6 | 1.0 |
| 12.5 | -1.2 | 24.6 | 8.1 | 0.4 | 10.8 | 1.0 |
| 15.0 | -1.7 | 29.2 | 8.3 | 0.5 | 13.2 | 1.0 |
| 17.5 | -2.3 | 33.8 | 8.5 | 0.8 | 15.6 | 1.0 |
| 20.0 | -3.1 | 38.2 | 8.8 | 1.0 | 18.2 | 1.0 |
| 22.5 | -4.0 | 42.5 | 9.1 | 1.4 | 20.9 | 1.0 |
| 25.0 | -5.0 | 46.8 | 9.5 | 1.8 | 23.8 | 1.0 |
| 27.5 | -6.2 | 51.0 | 9.9 | 2.3 | 27.0 | 1.0 |
| 30.0 | -7.6 | 55.1 | 10.5 | 3.0 | 30.6 | 1.0 |
| 32.5 | -9.2 | 59.3 | 11.2 | 3.8 | 34.6 | 1.0 |
| 35.0 | -11.1 | 63.5 | 12.1 | 4.9 | 39.3 | 1.0 |
| 37.5 | -13.3 | 67.9 | 13.2 | 6.4 | 44.9 | 1.0 |
| 40.0 | -16.1 | 72.8 | 14.6 | 8.3 | 52.0 | 1.0 |
| 42.5 | -20.0 | 78.6 | 16.6 | 11.1 | 62.2 | 1.0 |
| 45.0 | -28.9 | 90.5 | 19.3 | 15.1 | 87.5 | 1.0 |

Table 3C provides for comparison the properties of an ellipse of eccentricity 0.75 that has equivalent sagittal depth at a radial distance of 37.5 mm. The surface according to embodiments of the present invention has the following distinguishing features:

It has increasing tangential curvature from the central region toward the lateral edges, whereas the ellipses only bend significantly at the lateral edges;

There is substantial surface astigmatism away from the central region toward the lateral edges, whereas ellipsoidal surfaces show escalating astigmatism toward the lateral edges;

There is a maximum of tangential curvature at a location intermediate between the central region and the lateral edges, not observed with ellipses;

There is a maximum of surface astigmatism at a location intermediate between the central region and the lateral edges, not observed with ellipses;

There is a region of low astigmatism laterally and an associated umbilic condition, not observed with ellipses;

The surface Q-value is significantly less than unity away from the central region, whereas it is unchanged for ellipsoidal surfaces, and;

The normals to the surface at locations of greatest tangential curvature are inclined at angles φ to the optical axis that may be significantly less than 90°, whereas they are orthogonal to the symmetry axis for ellipses.

If a similar comparison is made with the prior art lens of Example 2 (Table 2B and FIG. 3B) a surface according to embodiments of the present invention has the following distinguishing features:

It is symmetric with respect to the direct line of sight whereas the direct line of sight is not a normal to the surface of the prior art lens;

It shows substantial growth of tangential and mean surface curvatures and of surface astigmatism close to, and in all directions from, the direct line of sight, whereas the prior art lens has such features only in lateral regions at visual field angles outside the wearer's visual fixation field;

It has a lens surface Q-value which is low compared to unity away from the central region, whereas the Q-value is unchanged for significant portions of the prior art lens, and It is oblate at the symmetry axis and away therefrom, whereas the prior art lens of Example 2 is prolate across the majority of the lens aperture.

EXAMPLE 4

"Non-Quadratic" Surface Functions

In an alternative approach according to the current invention, we combine a pair of spheres of different curvatures $B_1=530/\rho_1$ and $B_2=530/\rho_2$ by use of a suitable weighting function $W(r)$ to give a final rotationally symmetric surface having the form, $$z(r) = W(r)^* \left(\rho_1 - \sqrt{\rho_1^2 - r^2}\right) + (1 - W(r))^* \left(\rho_2 - \sqrt{\rho_2^2 - r^2}\right).$$

Any suitable weighting function may be used, as for example using the hyperbolic secant;

$$W(r) = a^*(Sech(r/b))^*.$$

Figure 6A:
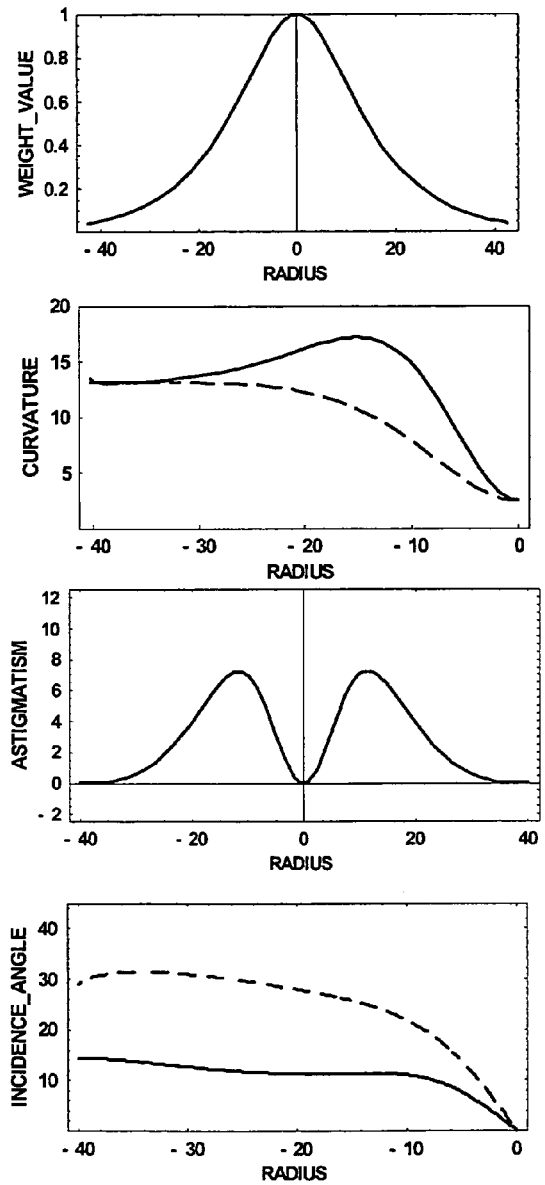
FIGS. 6A and 6B Depict the properties of two surfaces formed mathematically as a weighted combination of a pair of spheres having different curvatures. Both are umbilic in an outer region and have sphere points at the vertex. Their properties are summarized in Tables 4A and 4B.
Figure 6B:
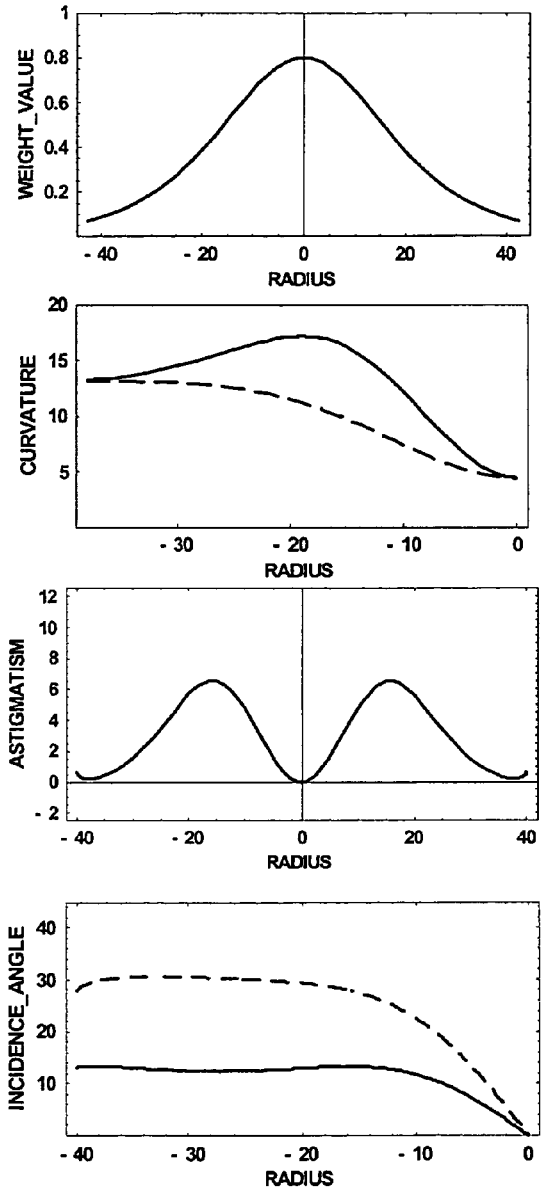

The two examples of such surfaces are shown in FIGS. 6A and 6B and in Tables 4A and 4B.

Surface-D is described in FIG. 6A. It merges with its osculating sphere in the lateral regions and with the low curvature sphere at its crown under the weighting function depicted as the curve "Weight Value". The surface Q value is unity at the crown and declines smoothly off axis toward a constant value Q=0.2, corresponding to the ratio of curvatures of the two spherical regions, $B_1/B_2$. Surface astigmatism and surface tangential curvature grow rapidly away from the crown, undergoing maxima and subsequently declining smoothly toward the outer umbilic region. The rate of these changes is governed by the hyperbolic secant function, which declines smoothly from unity on either side of the origin of coordinates. Increasing the value assigned to the parameter b causes the rate of decline to slow and displaces the outer umbilic region; the curvatures of the umbilic regions are set directly by the choice of reference spheres, while; increasing the value assigned to n sharpens the central peak of the weighting function and increases the maximum surface astigmatism encountered. The normals to the surface at its regions of greatest tangential curvature are inclined to the symmetry axis at an angle of about 20°.

TABLE 4A

Surface design coefficients and properties of a surface function according to an embodiment of the present invention having a crown curvature of 2.5 D.

| Surface-D | A | b | N | $B_1$ (D) 2.50 | | $B_2$ (D) 12.25 |
|---|---|---|---|---|---|---|
| | 1.0 | 11.0 | 1.0 | | | |
| x | z(x) | θ | $K_T$ | $|K_T - K_S|$ | Φ(x) | Q(x) |
| 0.0 | −0.0 | 0.0 | 2.5 | 0.0 | 0.0 | 1.00 |
| 2.5 | −0.0 | 5.0 | 3.9 | 1.0 | 0.8 | 0.96 |
| 5.0 | −0.1 | 10.0 | 7.5 | 3.2 | 2.3 | 0.77 |
| 7.5 | −0.2 | 14.9 | 11.7 | 5.6 | 4.9 | 0.57 |
| 10.0 | −0.5 | 19.7 | 14.9 | 7.0 | 8.6 | 0.43 |
| 12.5 | −1.0 | 24.4 | 16.7 | 7.2 | 13.0 | 0.35 |
| 15.0 | −1.7 | 29.2 | 17.2 | 6.4 | 17.7 | 0.29 |
| 17.5 | −2.6 | 34.1 | 16.9 | 5.2 | 22.6 | 0.26 |
| 20.0 | −3.8 | 39.0 | 16.2 | 3.9 | 27.6 | 0.23 |
| 22.5 | −5.2 | 44.0 | 15.4 | 2.7 | 32.5 | 0.22 |
| 25.0 | −7.0 | 49.3 | 14.7 | 1.8 | 37.5 | 0.21 |
| 27.5 | −9.1 | 54.8 | 14.1 | 1.1 | 42.6 | 0.20 |
| 30.0 | −11.6 | 60.6 | 13.7 | 0.6 | 47.9 | 0.20 |
| 32.5 | −14.7 | 66.9 | 13.4 | 0.3 | 53.7 | 0.19 |
| 35.0 | −18.5 | 74.1 | 13.2 | 0.1 | 60.3 | 0.19 |
| 37.5 | −23.8 | 82.8 | 13.1 | 0.1 | 68.6 | 0.19 |
| 40.0 | −33.6 | 97.3 | 13.2 | 0.1 | 83.1 | 0.19 |

If the parameter a is set to a value less than unity, a component of the osculating sphere is introduced at the crown, so that the local curvature is increased to a value approximately equal to the fractional admixture $a^*B_1+(1-a)^*B_2$. This results in a broader umbilic region at the surface crown, as shown for example in FIG. 6B corresponding to Surface-E. As a result of the choices of the other parameters b and n, this surface trends more slowly to merge with the osculating sphere and the lateral umbilic commences near the periphery of what would be a practical lens surface. The general features of the surface are otherwise similar to those of Surface-D. The normals to the surface at its regions of greatest tangential curvature are inclined to the symmetry axis at an angle of about 25°.

TABLE 4B

Surface design coefficients and properties of a surface function according to an embodiment of the present invention having a crown curvature of 4.4 D.

| Surface-E | A | B | n | $B_1$ (D) | $B_2$ (D) |
|---|---|---|---|---|---|
| | 0.8 | 20.0 | 1.7 | 2.50 | 12.25 |
| x | z(x) | θ | $K_T$ | $|K_T - K_S|$ | Φ(x) | Q(x) |
| 0.0 | −0.0 | 0.0 | 4.4 | 0.0 | 0.0 | 1.00 |
| 2.5 | −0.0 | 5.0 | 5.1 | 0.4 | 1.3 | 0.99 |
| 5.0 | −0.1 | 10.0 | 6.9 | 1.6 | 2.9 | 0.96 |
| 7.5 | −0.3 | 14.9 | 9.4 | 3.2 | 5.0 | 0.88 |
| 10.0 | −0.6 | 19.7 | 12.1 | 4.7 | 8.0 | 0.78 |
| 12.5 | −1.0 | 24.4 | 14.5 | 5.9 | 11.6 | 0.68 |
| 15.0 | −1.6 | 29.2 | 16.2 | 6.5 | 15.9 | 0.59 |
| 17.5 | −2.4 | 33.9 | 17.0 | 6.4 | 20.7 | 0.53 |
| 20.0 | −3.5 | 38.7 | 17.1 | 5.6 | 25.7 | 0.47 |
| 22.5 | −4.9 | 43.6 | 16.7 | 4.6 | 30.9 | 0.43 |
| 25.0 | −6.5 | 48.7 | 16.0 | 3.4 | 36.2 | 0.40 |
| 27.5 | −8.5 | 54.0 | 15.2 | 2.4 | 41.6 | 0.38 |
| 30.0 | −11.0 | 59.7 | 14.5 | 1.5 | 47.2 | 0.36 |
| 32.5 | −14.0 | 65.9 | 13.9 | 0.9 | 53.2 | 0.35 |
| 35.0 | −17.8 | 73.0 | 13.5 | 0.4 | 60.0 | 0.34 |
| 37.5 | −22.9 | 81.6 | 13.3 | 0.2 | 68.3 | 0.34 |
| 40.0 | −32.7 | 95.9 | 13.8 | 0.6 | 82.9 | 0.35 |

European design standards, for example CEN 1836 "Sunglasses & Sunglass Filters for General Use", require the mean spherical power to fall in the range 0.00±0.09D within a region of 10 mm radius. Accordingly it is of interest to create surfaces that themselves have a broad and stable crown of similar dimension. "Surface-F" designed with a suitably modified weighting function is described in Table 4C. This surface preserves the fundamental behavior of surfaces, having maxima of tangential curvature and surface astigmatism intermediate between the central portion and the lateral ends. Note however, that the surface Q-value dwells near unity for an extended region corresponding to the central crown. As discussed in connection with FIG. 2C, the central region of the crown is elliptical with eccentricity e=0.963 (shape factor p=13.9), however the normals to the surface at its regions of greatest tangential curvature are inclined to the symmetry axis at an angle of about 30°.

TABLE 4C

Surface design coefficients and properties of a surface function according to an embodiment of the present invention having a crown curvature of 4.3 D.

| Surface-F | M(r) = $1/(1 + n \|r\|^p)$ | | n | p | $B_1$ (D) | $B_2$ (D) |
|---|---|---|---|---|---|---|
| | | | 2.5E−09 | 5.32 | 4.32 | 10.51 |
| x | z(x) | θ | $K_T$ | $|K_T - K_S|$ | Φ(x) | Q(x) |
| 0.0 | −0.0 | 0.0 | 4.3 | 0.0 | 0.00 | 1.00 |
| 2.5 | −0.0 | 5.0 | 4.3 | 0.0 | 1.17 | 1.00 |

TABLE 4C-continued

Surface design coefficients and properties of a surface function according to an embodiment of the present invention having a crown curvature of 4.3 D.

| Surface-F | $M(r) =$ $1/(1 + n \|r\|^p)$ | | n 2.5E-09 | p 5.32 | $B_1$ (D) 4.32 | $B_2$ (D) 10.51 |
|---|---|---|---|---|---|---|
| x | z(x) | θ | $K_T$ | $\|K_T - K_S\|$ | Φ(x) | Q(x) |
| 5.0 | −0.1 | 10.0 | 4.3 | 0.0 | 2.34 | 1.00 |
| 7.5 | −0.2 | 14.9 | 4.3 | 0.0 | 3.51 | 1.00 |
| 10.0 | −0.4 | 19.6 | 4.4 | 0.1 | 4.69 | 1.00 |
| 12.5 | −0.6 | 24.2 | 4.6 | 0.2 | 5.91 | 1.01 |
| 15.0 | −0.9 | 28.5 | 5.0 | 0.6 | 7.20 | 1.04 |
| 17.5 | −1.3 | 32.7 | 5.8 | 1.2 | 8.66 | 1.07 |
| 20.0 | −1.7 | 36.7 | 7.3 | 2.5 | 10.43 | 1.11 |
| 22.5 | −2.2 | 40.6 | 9.6 | 4.4 | 12.73 | 1.13 |
| 25.0 | −2.8 | 44.3 | 12.7 | 6.9 | 15.82 | 1.11 |
| 27.5 | −3.6 | 47.9 | 16.2 | 9.6 | 19.91 | 1.03 |
| 30.0 | −4.7 | 51.5 | 19.1 | 11.6 | 25.10 | 0.92 |
| 32.5 | −6.0 | 55.3 | 20.3 | 11.8 | 31.19 | 0.79 |
| 35.0 | −7.7 | 59.3 | 19.3 | 10.0 | 37.73 | 0.67 |
| 37.5 | −9.9 | 63.6 | 16.8 | 7.0 | 44.23 | 0.57 |
| 40.0 | −12.6 | 68.3 | 14.1 | 3.9 | 50.39 | 0.50 |

FIGS. 5A, 5B, 6A, & 6B include graphs of angle of incidence as a function of radial distance on the lens. Two angles are plotted, that shown by the full line curves is the internal angle of incidence to the appropriate curve when referred to the center of rotation of the eye, placed at a back vertex distance of 27 mm. The other angle is the internal angle of incidence to the pupil stop for a static eye in forward gaze, the pupil stop being 11 mm forward of the center of rotation. Note in particular that these angles have approximately constant values in the oblique field. The surfaces have approximately constant inclination with respect to the two optical reference points.

Surfaces D and E have extreme sagittal reach, extending to visual field angles greater than 90° (Tables 4A & 4B). Tackles and also Houston et al refer to the optical benefits that accrue when the internal angle of incidence of an oblique medial ray is limited by the lens configuration, specifically by the use of elliptical form and tapering lens wall thickness. Therefore we compare a surface according to an embodiment of the present invention, Surface-E, with a spherical surface and with an elliptical surface of eccentricity e=0.75 arranged to have a common vertex and an intersection point at (±35.0, −17.8) in the lateral field.

Figure 7:
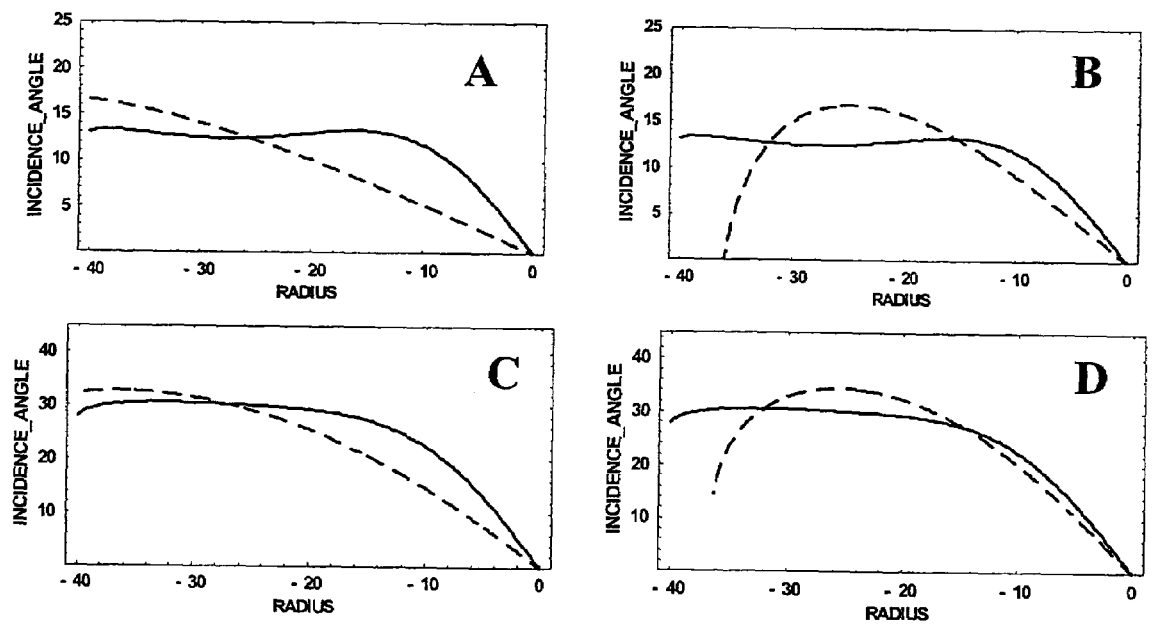
FIG. 7 Compares the internal angle of incidence characteristic of the surface of Table 4B referred to the center of rotation of a wearer's eye with that of a sphere of equal surface height at radius 35 mm (FIG. 7A) and with an ellipsoid equivalent sagittal depth and having eccentricity e=0.75 (FIG. 7B). The properties determined with reference to the wearer's pupil stop in forward gaze are shown as FIGS. 7C and 7D.

The curves of FIG. 7 (A and B) depict the internal angles of incidence of a chief ray in a formal ray trace analysis for a rotating eye, the full curve corresponding to Surface-E and the dotted curves being an equivalent sphere (FIG. 7A) and the equivalent ellipsoid (FIG. 7B). The curves of FIG. 7 (C and D) depict the internal angles of incidence of a chief ray in a formal ray trace analysis for a static eye, the full curve corresponding to Surface-E and the dotted curves being an equivalent sphere (FIG. 7C) and an equivalent ellipsoid (FIG. 7D). In both ray trace configurations, the spherical surface shows steady increase of the internal angle of incidence throughout the oblique regions of the lens. For the highly eccentric ellipsoid, the oblique growth of internal angle of incidence is stemmed by the changing surface curvature to exhibit a region of constant inclination outside of which there is rapid change. An extended region of constant inclination to the corresponding chief rays characterizes surfaces designed according to the current invention. There are relatively low and stable values of the internal angle of incidence everywhere outside the paraxial field, thereby assisting the achievement of stable peripheral optics in actual lens design. This is an advantage over the elliptical form.

This feature presents a further method of constructing lens surfaces according to a preferred embodiment of the invention. Just as the functional form of the surface z(r) defines the variation of internal angles of incidence at the center of rotation of the eye or the pupil stop, on the one hand, the converse applies. Specification of a functional form for the variation of internal angle of incidence defines the physical surface. An analysis of the basic geometric relationships yields the following differential equation relating the internal angle of refraction d(r), the surface height z(r) and the surface slope z'(r);

$$r - z'(r)(L - z(r)) = \sin[d(r)]\sqrt{r^2 + (L - z(r))^2(1 + [z'(r)]^2)}$$

where L is the distance from surface vertex to the reference center of the analysis. This equation is readily soluble with modern mathematics programs, given a suitable model function for d(r) and one boundary condition, such as the physical location of the vertex. A model function that we have found useful is $$\sin d(r) = \sin \gamma^* (1 - \exp(-nr^2/L^2))^{1/2},$$

that defines behavior like that of FIG. 7, wherein the angles are exactly constant, d=γ, throughout the oblique field. Surfaces determined in this way are torispheric domes. Their properties are very similar to the Surface-E except that the outer surface regions do not merge into a spherical region, but exhibit an umbilic ring around which the surface astigmatism is low and slowly changing.

EXAMPLE 5

Symmetrical Non-Corrective Lenses

The lens surfaces according to a preferred embodiment of the present invention have dome-like shapes with steep lateral walls and a relatively flatter region at the axis of symmetry. We may formulate each surface of a lens as for example a conicoid C(r) with a radius of curvature $\rho_1$ and a shape factor $p_1$, with an associated weighting function to provide smooth control of the surface across a lens aperture. Thus, an overall lens surface according to this example of an embodiment of the present invention has the following mathematical construction;

$$z(r) = C(r) * \text{Sech}(r/q) + \sum_{n \geq 3}^{m} A_n r^n, \text{ where}$$

$$C(r) = \frac{\rho_1}{p_1}\left(1 - \sqrt{1 - p_1 * r^2/\rho_1^2}\right).$$

A set of lenses has been designed with front surfaces having the parameter sets shown in Table 5. The lens material is polycarbonate. The lenses have back vertex power of 0.00D.S. and 1.5 mm center thickness. Optical properties determined by ray trace referred to a back vertex distance of 27.0 mm are shown in FIGS. 8 and 9. Mean power error MPE, oblique astigmatic error OAE, RMS power error RMSPE and optical prism magnitude |Prism| (Roving) are shown for ocular rotation in the visual fixation field. Static optical prism magnitude |Prism| (Static) is determined with reference to a wearer's pupil stop in forward gaze. Lens caliper thickness and sagittal depth are shown as a function of radial position relative to the axis of symmetry of the lens element. The properties of a spherical non-corrective lens with equivalent sagittal depth at the lens edge (r=40 mm) and correct axial alignment are shown for comparison in FIG. 4A, and those of a similar spherical lens with axis offset to achieve wrap are shown in FIG. 4B.

TABLE 5

Front surface coefficients used to design the lenses of FIGS. 8 and 9.

| | $B_1$ (D) | p | q | $A_4$ | $t_0$ (mm) |
|---|---|---|---|---|---|
| Form 5A | 0.0 | 0.0 | 0.0 | 6.000 E−06 | 1.5 |
| Form 5B | 1.75 | 0.01 | 30.25 | 6.000 E−06 | 1.5 |
| Form 5C | 3.50 | 2.0 | 25.0 | 6.000 E−06 | 1.5 |
| Form 5D | 3.50 | 2.0 | 22.6 | 6.000 E−06 | 1.5 |
| Form 5E | 5.00 | 1.0 | 19.65 | 6.000 E−06 | 1.5 |

The back surfaces corresponding to a given front surface are defined in paraxial regions by the defined back vertex power. It is necessary to apply secondary aspheric corrections at least to the back surface to control the oblique optics across the visual fixation field and, if appropriate, from near the edge of the visual fixation field into the peripheral field. In doing so, one needs to have a clear priority in judging the merit of the lens according to particular wearer needs. Varying criteria may apply to the inner and outer design fields.

Figure 8A:
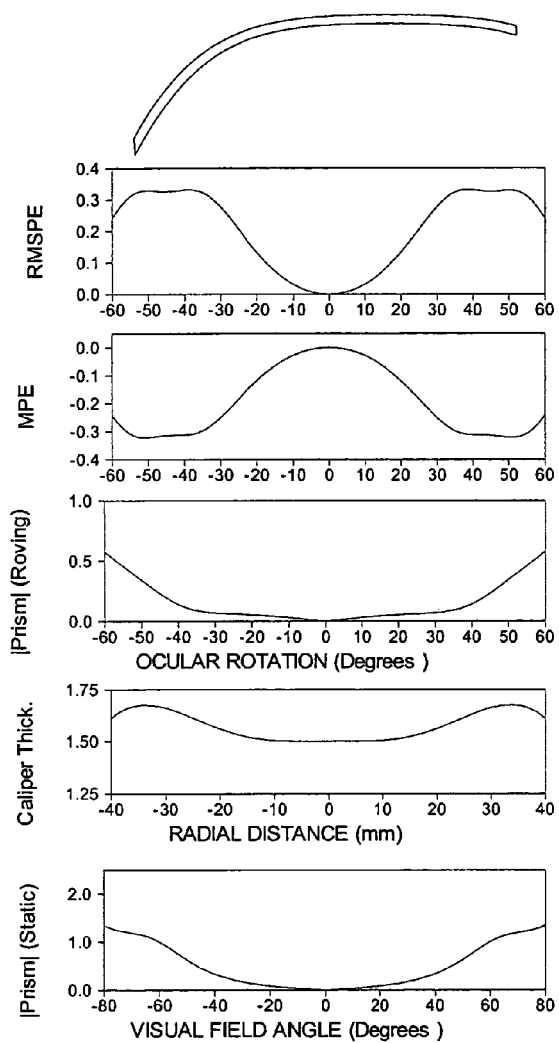
FIGS. 8A and 8B Show the optical properties of a pair of $4^{th}$ order rotationally symmetric non-corrective lenses with crown curvatures of 1.75 and 3.5D at the axis of symmetry. The front surface parameter sets are given in Table 5 (Form-5B and Form-5C).
Figure 8B:
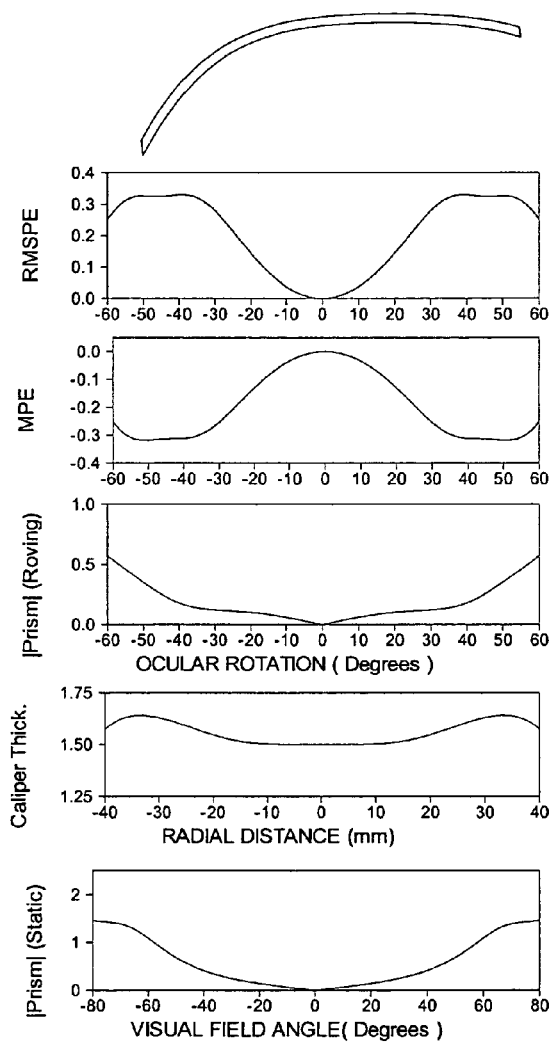
Figure 9A:
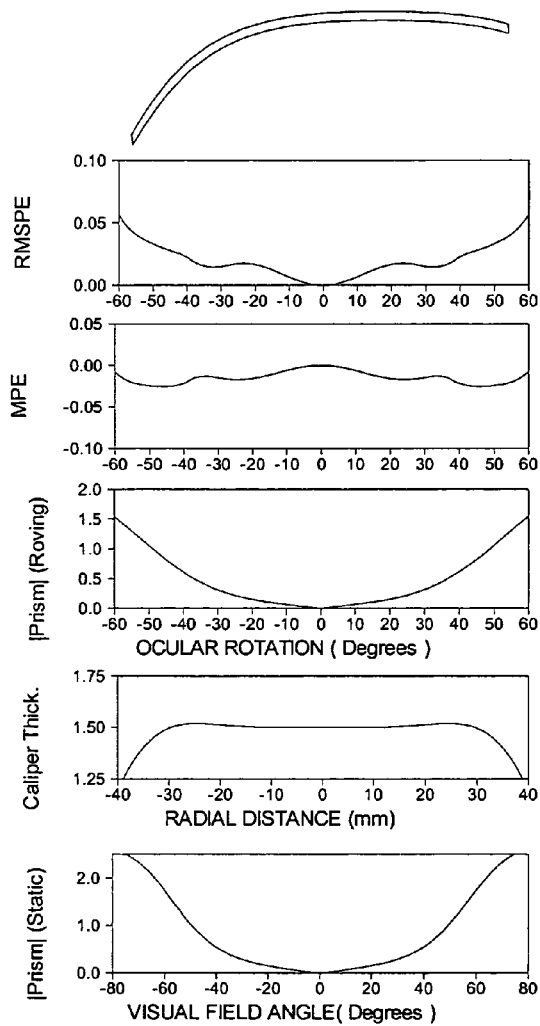
FIGS. 9A and 9B Show the optical properties of a pair of $4^{th}$ order rotationally symmetric non-corrective lenses with crown curvatures of 3.5 and 5.0D at the axis of symmetry. The front surface parameter sets are given in Table 5 (Form-5D and Form-5E).
Figure 9B:
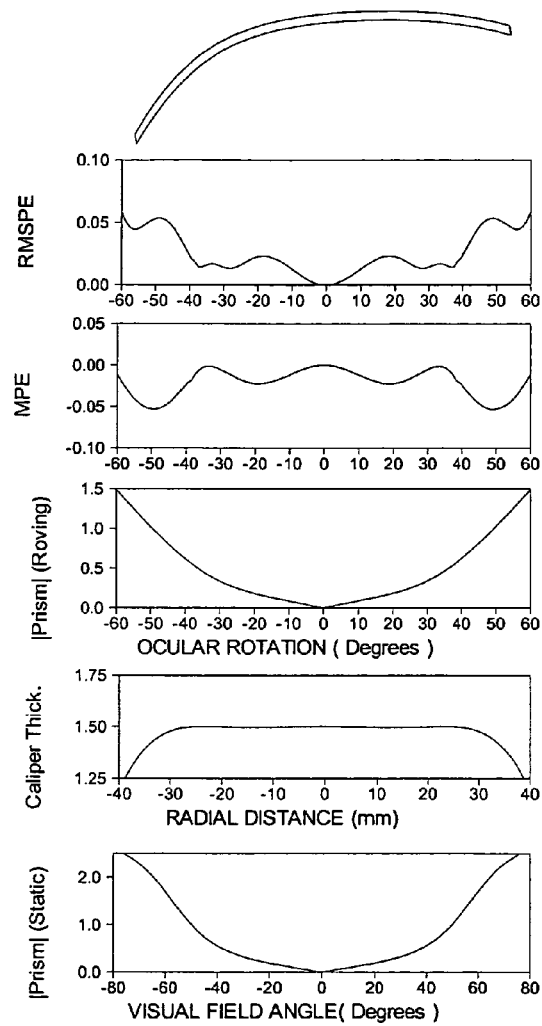

Different procedures have been applied in constructing the surfaces of the lenses in FIGS. 8A and 8B, than were used for the lenses in FIGS. 9A and 9B. The lenses of FIG. 8A and 8B correspond to front surfaces Form-5B and Form-5C with crown curvatures 1.75 and 3.5D respectively, designed with the intent of minimizing the optical prism magnitude experienced on ocular rotation (±40°) within the visual fixation field. Prism magnitude and its rate of change in the central parts of the visual fixation field is characteristically low because of low curvature of the lens surfaces in the central region and the progressive growth of negative mean power error toward the edges of the visual fixation field. Such negative refractive power error is regarded as acceptable if it is limited to a range that may be accommodated instinctively by an average wearer and should not exceed −0.35D, preferably be no more than 0.25D. The outer regions of the lens aperture have been designed to avoid increasing undesirable negative mean power error that would otherwise occur in the peripheral field. Accordingly, the trend of mean power error or RMS power error is noticeably different there, and the magnitude of optical prism experienced with ocular rotation is seen to rise quickly once this outer design region is encountered. The change in design emphasis is evident in the trends shown in optical properties.

We have achieved in particular very low rates of change in prism magnitude across the central field of the lens. The magnitudes of optical prism show increasing paraxial change with increasing crown curvature, but remain low within the visual fixation field. In comparison, the prior art spherical lenses described in FIGS. 4A and 4B have lower refractive errors but higher optical prism (both static and rotating eye contributions) across a wide visual field. The wrapped prior art lens of FIG. 4B has left/right eye disparity that does not occur with lenses according to preferred embodiments of the present invention. Note also that the wall thickness of the prior art lenses tapers everywhere from the optical center. A particular feature of the lenses in FIGS. 8A and 8B is their thickening outward of the vertex region toward the edges, a property found in preferred embodiments of the present invention.

The second pair of lens designs of this Example has the features shown in FIGS. 9A and 9B and are based on front surfaces Form-5D and Form-5E. These have low rates of change of prism magnitude paraxially. However, the primary feature is the relatively low oblique refractive errors encountered across the visual fixation field, optical prism being allowed to increase there. This objective was maintained for optimizing the surface beyond about 35° visual field angle, achieving mean power errors or RMS mean power errors that are always small with respect to the comparative sphere, and avoiding any errors that cannot be accommodated instinctively. There are no marked changes in the trend of optical properties since the same design criteria apply across the aperture of the lens.

These designs provide low oblique mean power error MPE or oblique RMS mean power error RMSPE on ocular rotation (±40°) in the visual fixation field compared to a prior art sphere and the magnitudes of optical prism remain lower than for an equivalent spherical piano lens over much of the aperture. Note again the generally constant caliper thickness of the lens elements prior to relatively local tapering near the lens edges.

EXAMPLE 6

Asymmetric Non-Corrective Lenses

Non-corrective eyewear for sun or other protective purposes frequently has different curvature in the horizontal direction than in the vertical direction. Such asymmetry of the surface form is introduced typically by invoking a suitable asymmetric quadratic surface form. See for example U.S. Pat. Nos. 1,741,536 4,741,611 4,867,550 and 5,825, 455. A suitable method according to an embodiment of the present invention is to describe the lens surface as follows;

$$z(r) = C(\kappa) * \text{Sech}(\kappa/q) + \sum_{n \geq 3}^{m} A_n r^n, \text{ where}$$

$$C(\kappa) = \frac{\rho_1}{p_1}\left(1 - \sqrt{1 - p_1 * \kappa^2 / \rho_1^2}\right) \text{ and } \kappa^2 = x^2 + \tau y^2.$$

Figure 10:
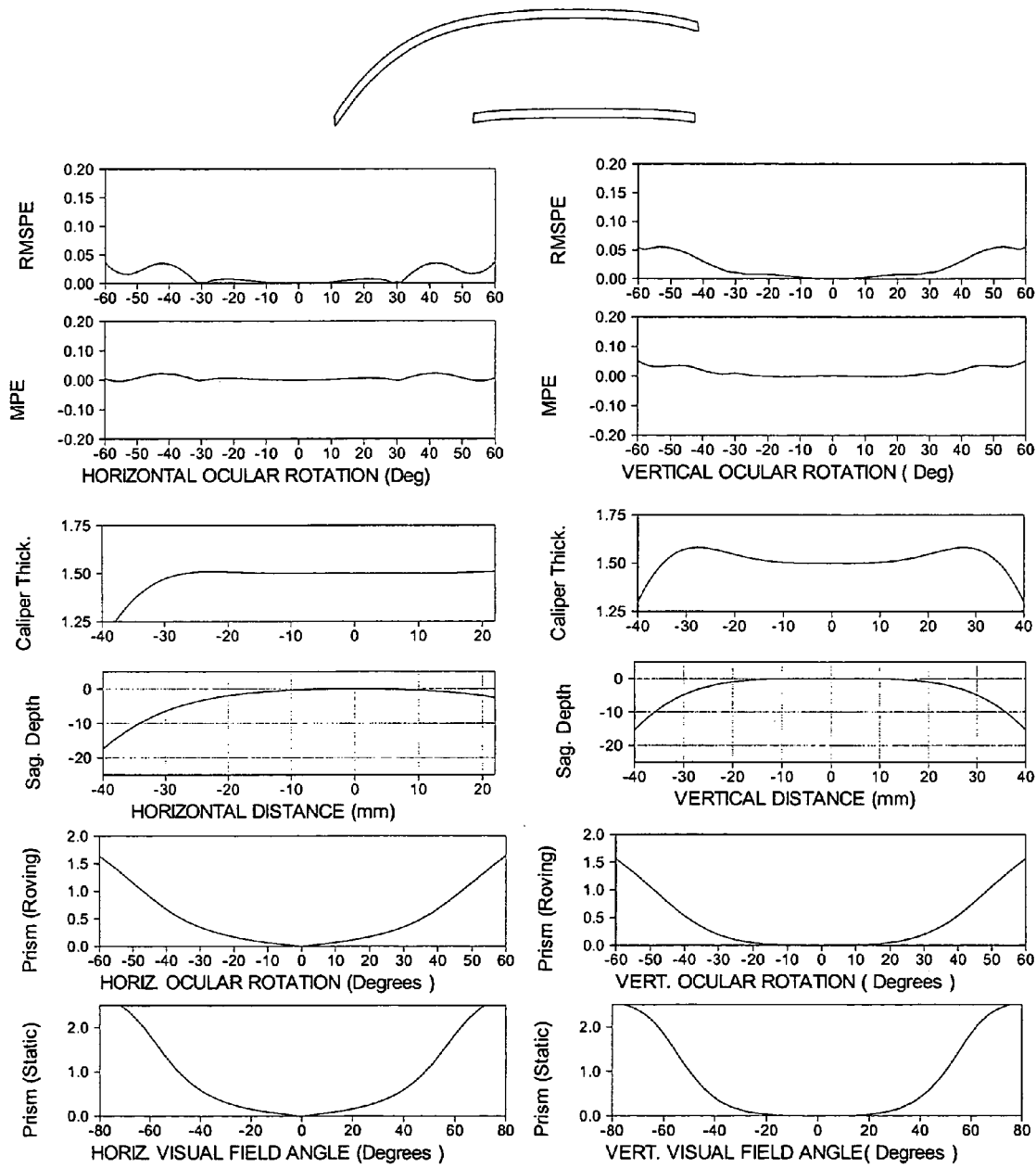
FIG. 10 Shows the optical properties of a $4^{th}$ order non-corrective lens having a toroidal vertex of curvature 3.5D horizontally and 0.0D vertically.
Figure 11:
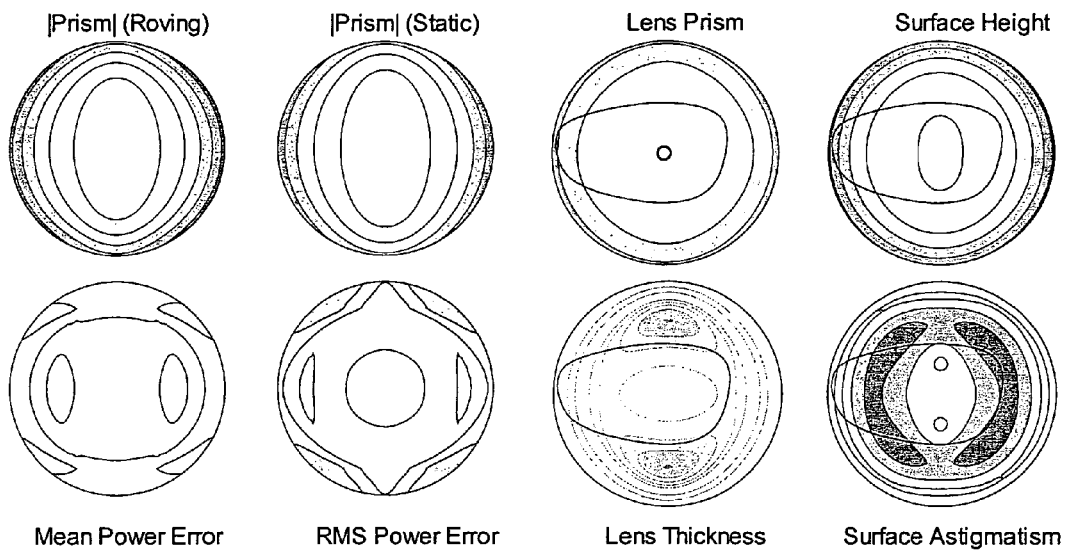
FIG. 11 Shows contour maps of optical properties for the lens of FIG. 10 in a monocular rotation range of 40° and contour maps of lens physical properties within a 40 mm aperture on the lens. Contours are spaced as follows: visual prism, steps of 0.25D; refractive power, steps of 0.025D around a field of ±0.005D; lens prism, increments of 1D; surface height, steps of 5 mm around a field of −0.25 mm; lens thickness, steps of +0.025 mm relative to center, and surface astigmatism, steps of 4D around a 1.5D field.

This induces required asymmetry between horizontal and vertical shape according to the value set for the parameter τ. A lens having curvature 3.5D horizontally and 0.0D vertically at the vertex was produced by using the parameter set Form-5C and applying τ=0. The resultant properties vary along the horizontal and vertical meridians as shown in FIG. 10. Contour maps shown in FIG. 11 give visual properties in a field of 40° ocular rotation and lens properties in a 40 mm aperture. Visual prism is mapped in 0.25D steps and refractive errors mapped in 0.025D steps around a central range of ±0.005D. Lens prism is mapped in increments of 1.0D. Surface height is mapped in 5 mm steps around a central field within 0.25 mm of the apex. Lens thickness is mapped in an inner field equal to the central value in positive increments of +0.025 mm and outside that in steps of −0.02 mm. Front surface astigmatism is in steps of 4.0D around a 1.0D zone.

Typical frame aperture shapes tend to capture only a relatively short length of lens in its vertical section and it may be desirable to accentuate the vertical curve. Accordingly we have designed a lens using the parameter set of Form-5C and applying τ=0. The vertex of this lens has curvature 3.5D horizontally and 7.0D vertically. Its characteristics are described in FIGS. 2A, 12 and 13. Note the relatively low oblique refractive errors and their symmetry with respect to ocular rotation.

Figure 12:
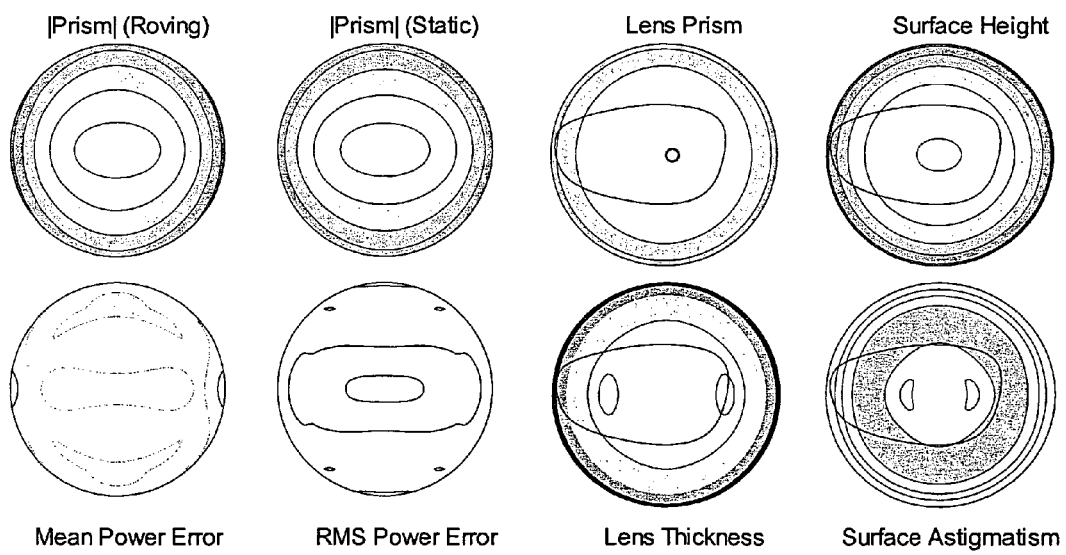
FIG. 12 Shows contour maps of optical properties for the lens of FIG. 13 in a monocular rotation range of 40° and contour maps of lens physical properties within a 40 mm aperture on the lens. Contours are spaced as follows: visual prism, steps of 0.25D; refractive power, steps of 0.025D around a field of ±0.005D; lens prism, increments of 1D; surface height, steps of 5 mm around a field of −0.25 mm; lens thickness, steps of +0.025 mm relative to center, and surface astigmatism, steps of 4D around a 1.25D field.
Figure 13:
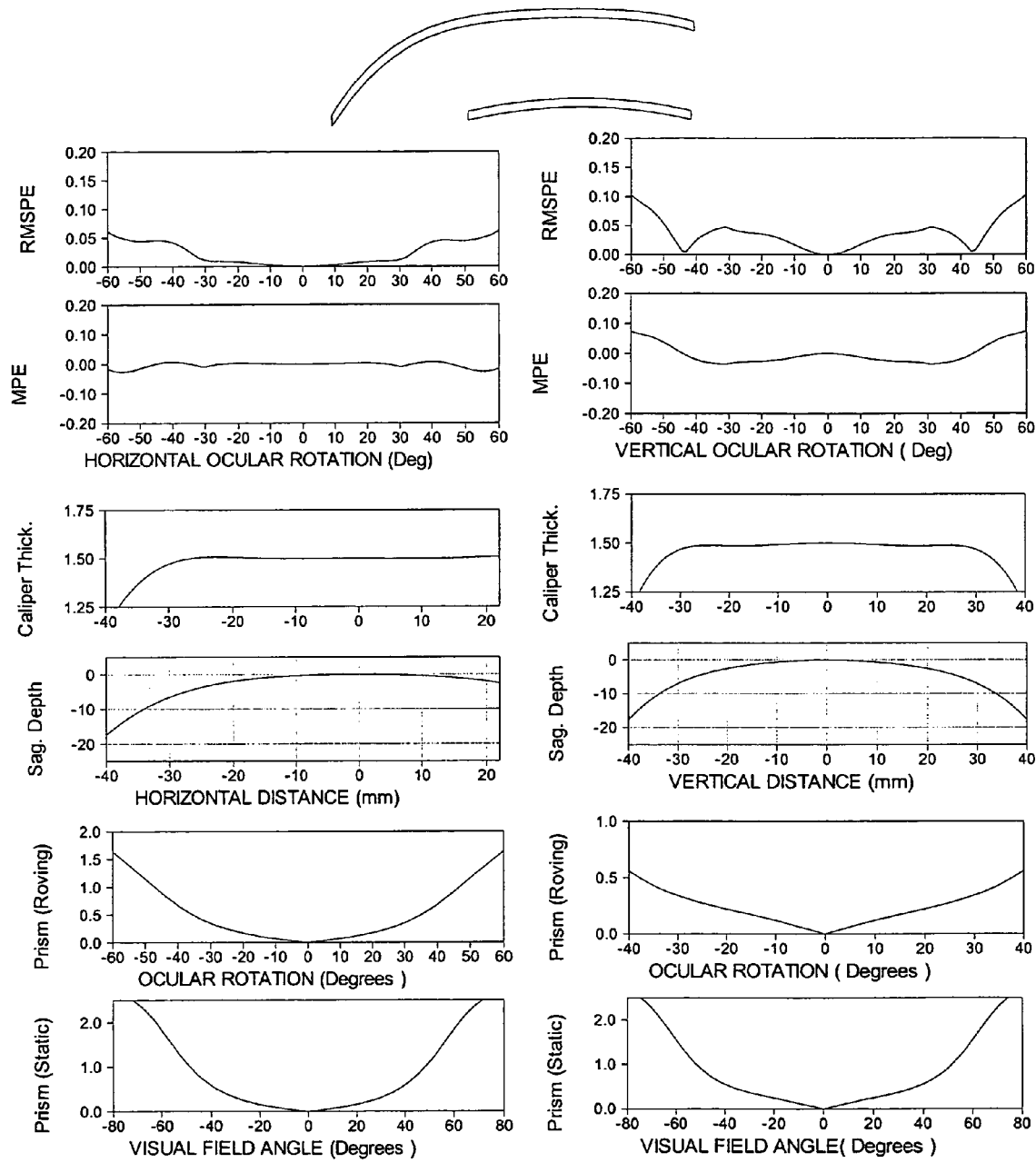
FIG. 13 Shows the optical properties of a $4^{th}$ order non-corrective lens having a toroidal vertex of curvature 3.5D horizontally and 7.0D vertically.

These symmetry changes have a major effect on the surface astigmatism characteristic, as shown by the contour plots in FIGS. 11 and 12. Although the lens overall has zero refractive astigmatic error at the optical axis, the surfaces do not have sphere points at the axis but are, instead, toric. For the lens of the present examples, the former sphere points on each surface separate into a pair of umbilic points located on the axis of lower curvature. Instead of an outer umbilic ring, there is an outer ring of low surface astigmatism, which includes four umbilic arcs intersecting both meridians. These arcs become more contiguous as the mean surface curvature increases.

EXAMPLE 7

Optically Correct Lenses

Houston and co-workers (U.S. Pat. Nos. 5,648,832 5,689,323 and 6,010,218) have elaborated the need for lens elements for unitary and dual lens wrap around sports and sun protective eyewear to be "optically correct". In a first aspect, they indicate that an optically correct lens must taper from center to edge, stating; "Preferably, the thickness of the lens tapers smoothly, though not necessarily linearly, from the maximum thickness . . . to a relatively lesser thickness at the lateral edge". In a second aspect, they emphasize optical quality at the direct line of sight for a lens worn in a wrapped and raked configuration; "that term as used in the present description, refers to a lens which demonstrates relatively low distortion as measured by one or more of the following values in the as-worn orientation: prismatic distortion, refractive power and astigmatism". Target performance at the direct line of sight is for errors at least as low as $\frac{1}{4}$ D, preferably less than $\frac{1}{8}$ D, more preferably less than $\frac{1}{16}$ D and most preferably as low as $\frac{1}{32}$ D, for both prismatic and refractive errors.

Historically, non-corrective lenses were manufactured with the same curvature on front and back surfaces, or with fixed caliper thickness across the lens aperture. Modern lenses are typically manufactured from polycarbonate at a center thickness to 1.5 mm or so, and in order to have sufficient sagittal depth to achieve the wrap and rake needed for dual lens sports and sun eyewear, they have base curvature of order 8 or 9D. If such lenses are equally curved front and back, they taper strongly from center to edge and have positive back vertex power of order +0.095D. If they have constant thickness, they are low minus lenses with back vertex power of order −0.17D. Neither type of lens meets high performance lens standards. For example CEN 1836 "Sunglasses & Sunglass Filters for General Use" requires the mean spherical power to fall in the range 0.00±0.09D over a lens aperture of 10 mm radius. Accordingly the thickness of the lens must taper from center to edge, but not so rapidly as a lens equally curved on front and back surface.

Tables 6A and 6B show the properties of three non-corrective lenses having 9.0D spherical front surfaces. The lens called "9.0D Sphere" has zero refractive power at the optical axis and tapering thickness defined by spherical surfaces. That called "9.0D Concentric Sphere" has constant thickness and is a negative lens. The lens called "9.0D Asphere" has zero refractive power at the optical axis and is corrected to maintain zero mean power across a wide visual field corresponding to vision from a back vertex distance of 27.0 mm. It tapers from center to edge slightly faster than the spherical piano. In Tables 7A and 7B, we show for comparison the properties of three lenses, embodiments of the present invention having similar sagittal depth at the lens edge to a 9D base sphere. These lenses have vertex curvatures 0.0, 3.5 and 5.0D as labeled, their optical properties being graphed in FIGS. 9A and 9B. Like every lens in the examples above, these lenses have caliper thickness that is substantially constant or slowly increasing away from the optical center across the full aperture of the visual fixation field. Their caliper thickness declines toward the lens edge; the caliper thickness falls below the center thickness for a zero curvature crown beyond 60° field angle, beyond 55° for 3.5D crown curvature and beyond 50° for 5.0D crown curvature. The optical center is not a point of maximum thickness.

According to the prior art quadratic surface design, lens embodiments of the present invention with relatively constant wall thickness should have negative mean power at the optical axis and increasing negative oblique mean power error in the lateral field. However, they do not show any tendency toward this behavior (Table 7). There are no optical errors at the optical axis (corresponding to the axis of rotation) and the oblique errors are generally less than, or of the same order as, those for the spherical piano at visual field angles to 50° or more. Thus such lens embodiments according to an embodiment of the present invention follow a definition of optical correctness that differs fundamentally from that understood in the prior art and articulated by Houston et al.

In a defining aspect of the lens embodiments of the present invention, there is provided a non-corrective lens element that conforms to a wearer's face when worn with the direct line of sight substantially coincident with the optical axis wherein:

the lens thickness is sustained without taper across an aperture corresponding approximately to the visual fixation field as worn;

there are no significant refractive or prismatic errors at the direct line of sight as worn, and;

the oblique refractive power errors remain small upon ocular rotation across the visual fixation field and into the peripheral field of vision.

TABLE 6A

Physical dimensions, caliper thickness front surface height (sagittal depth) and corresponding ocular rotation angle, as a function of radial distance for three non-corrective lenses having 9.0D spherical front surfaces: a spherical plano, an aspheric plano, and a lens having constant thickness.

| | 9.0D Sphere | | | 9.0D Asphere | | | 9.0D Concentric Sphere | | |
|---|---|---|---|---|---|---|---|---|---|
| Radius | Caliper | Height | Angle | Caliper | Height | Angle | Caliper | Height | Angle |
| 0.0 | 1.50 | 0.00 | 0.00 | 1.50 | 0.00 | 0.00 | 1.50 | 0.00 | 0.00 |
| 2.0 | 1.50 | 0.00 | 4.23 | 1.50 | 0.00 | 4.23 | 1.50 | 0.00 | 4.23 |
| 4.0 | 1.50 | −0.02 | 8.42 | 1.50 | −0.02 | 8.42 | 1.50 | −0.02 | 8.42 |

TABLE 6A-continued

Physical dimensions, caliper thickness front surface height (sagittal depth) and corresponding ocular rotation angle, as a function of radial distance for three non-corrective lenses having 9.0D spherical front surfaces: a spherical plano, an aspheric plano, and a lens having constant thickness.

| | 9.0D Sphere | | | 9.0D Asphere | | | 9.0D Concentric Sphere | | |
|---|---|---|---|---|---|---|---|---|---|
| Radius | Caliper | Height | Angle | Caliper | Height | Angle | Caliper | Height | Angle |
| 6.0 | 1.50 | −0.04 | 12.53 | 1.50 | −0.04 | 12.53 | 1.50 | −0.04 | 12.53 |
| 8.0 | 1.49 | −0.09 | 16.54 | 1.49 | −0.09 | 16.54 | 1.50 | −0.09 | 16.54 |
| 10.0 | 1.49 | −0.17 | 20.42 | 1.49 | −0.17 | 20.42 | 1.50 | −0.17 | 20.42 |
| 12.0 | 1.48 | −0.29 | 24.17 | 1.48 | −0.29 | 24.17 | 1.50 | −0.29 | 24.17 |
| 14.0 | 1.47 | −0.47 | 27.79 | 1.47 | −0.47 | 27.79 | 1.50 | −0.47 | 27.79 |
| 16.0 | 1.46 | −0.72 | 31.30 | 1.46 | −0.72 | 31.30 | 1.50 | −0.72 | 31.30 |
| 18.0 | 1.46 | −1.07 | 34.73 | 1.45 | −1.07 | 34.73 | 1.50 | −1.07 | 34.73 |
| 20.0 | 1.44 | −1.54 | 38.11 | 1.44 | −1.54 | 38.11 | 1.50 | −1.54 | 38.11 |
| 22.0 | 1.43 | −2.14 | 41.46 | 1.42 | −2.14 | 41.46 | 1.50 | −2.14 | 41.46 |
| 24.0 | 1.42 | −2.91 | 44.84 | 1.41 | −2.91 | 44.84 | 1.50 | −2.91 | 44.84 |
| 26.0 | 1.40 | −3.87 | 48.29 | 1.39 | −3.87 | 48.29 | 1.50 | −3.87 | 48.29 |
| 28.0 | 1.39 | −5.03 | 51.82 | 1.37 | −5.03 | 51.82 | 1.50 | −5.03 | 51.82 |
| 30.0 | 1.37 | −6.42 | 55.49 | 1.34 | −6.42 | 55.49 | 1.50 | −6.42 | 55.49 |
| 32.0 | 1.35 | −8.06 | 59.31 | 1.31 | −8.06 | 59.31 | 1.50 | −8.06 | 59.31 |
| 34.0 | 1.33 | −9.95 | 63.29 | 1.28 | −9.95 | 63.29 | 1.50 | −9.95 | 63.29 |
| 36.0 | 1.30 | −12.12 | 67.47 | 1.24 | −12.12 | 67.47 | 1.50 | −12.12 | 67.47 |
| 38.0 | 1.28 | −14.57 | 71.80 | 1.20 | −14.57 | 71.80 | 1.50 | −14.57 | 71.80 |
| 40.0 | 1.25 | −17.30 | 76.28 | 1.14 | −17.30 | 76.28 | 1.50 | −17.30 | 76.28 |

TABLE 6B

Optical properties as a function of ocular rotation angle for the lenses of Table 6A. The aspheric lens has been corrected to zero mean power.

| | 9.0D Sphere | | | 9.0D Asphere | | | 9.0D Concentric Sphere | | |
|---|---|---|---|---|---|---|---|---|---|
| Angle | MPE | OAE | Prism | MPE | OAE | Prism | MPE | OAE | Prism |
| 0.0 | 0.00 | 0.00 | 0.00 | 0.00 | 0.00 | 0.00 | −0.17 | 0.00 | 0.00 |
| 2.5 | 0.00 | 0.00 | 0.04 | 0.00 | 0.00 | 0.04 | −0.17 | 0.00 | 0.02 |
| 5.0 | 0.00 | 0.00 | 0.08 | 0.00 | 0.00 | 0.08 | −0.17 | 0.00 | 0.04 |
| 7.5 | 0.00 | 0.00 | 0.12 | 0.00 | 0.00 | 0.12 | −0.17 | 0.00 | 0.07 |
| 10.0 | 0.00 | 0.00 | 0.17 | 0.00 | 0.00 | 0.17 | −0.17 | 0.00 | 0.09 |
| 12.5 | −0.01 | 0.00 | 0.21 | 0.00 | 0.00 | 0.21 | −0.17 | 0.00 | 0.11 |
| 15.0 | −0.01 | 0.01 | 0.25 | 0.00 | 0.00 | 0.25 | −0.17 | 0.01 | 0.13 |
| 17.5 | −0.01 | 0.01 | 0.29 | 0.00 | 0.00 | 0.30 | −0.17 | 0.01 | 0.15 |
| 20.0 | −0.02 | 0.01 | 0.34 | 0.00 | 0.00 | 0.34 | −0.18 | 0.01 | 0.18 |
| 22.5 | −0.02 | 0.02 | 0.38 | 0.00 | 0.00 | 0.39 | −0.18 | 0.01 | 0.20 |
| 25.0 | −0.02 | 0.02 | 0.42 | 0.00 | 0.00 | 0.44 | −0.18 | 0.02 | 0.22 |
| 27.5 | −0.03 | 0.02 | 0.47 | 0.00 | 0.01 | 0.49 | −0.19 | 0.02 | 0.24 |
| 30.0 | −0.04 | 0.03 | 0.52 | 0.00 | 0.01 | 0.54 | −0.19 | 0.03 | 0.27 |
| 32.5 | −0.04 | 0.04 | 0.56 | 0.00 | 0.01 | 0.60 | −0.20 | 0.03 | 0.29 |
| 35.0 | −0.05 | 0.04 | 0.61 | 0.00 | 0.01 | 0.65 | −0.20 | 0.04 | 0.31 |
| 37.5 | −0.06 | 0.05 | 0.66 | 0.00 | 0.01 | 0.71 | −0.21 | 0.04 | 0.34 |
| 40.0 | −0.07 | 0.06 | 0.71 | 0.00 | 0.02 | 0.77 | −0.21 | 0.05 | 0.36 |
| 42.5 | −0.08 | 0.06 | 0.75 | 0.00 | 0.02 | 0.84 | −0.22 | 0.05 | 0.38 |
| 45.0 | −0.09 | 0.07 | 0.80 | 0.00 | 0.02 | 0.91 | −0.22 | 0.06 | 0.41 |
| 47.5 | −0.10 | 0.08 | 0.85 | 0.00 | 0.03 | 0.98 | −0.23 | 0.07 | 0.43 |
| 50.0 | −0.11 | 0.09 | 0.90 | 0.00 | 0.03 | 1.06 | −0.23 | 0.07 | 0.45 |
| 52.5 | −0.12 | 0.10 | 0.95 | 0.00 | 0.04 | 1.14 | −0.24 | 0.08 | 0.48 |
| 55.0 | −0.13 | 0.12 | 1.00 | 0.00 | 0.04 | 1.22 | −0.25 | 0.09 | 0.50 |
| 57.5 | −0.14 | 0.13 | 1.05 | 0.00 | 0.05 | 1.31 | −0.25 | 0.10 | 0.52 |
| 60.0 | −0.15 | 0.14 | 1.10 | 0.00 | 0.05 | 1.40 | −0.26 | 0.10 | 0.54 |

TABLE 7A

Physical dimensions as a function of radial distance for three non-corrective lenses according to embodiments of the present invention that have non-quadratic front surfaces and crown curvatures 0.0, 3.5D and 5.0D.

| | Form 5A: 0.0D | | | Form 5D: 3.5D | | | Form 5E: 5.0D | | |
|---|---|---|---|---|---|---|---|---|---|
| Radius | Caliper | Height | Angle | Caliper | Height | Angle | Caliper | Height | Angle |
| 0.0 | 1.50 | 0.00 | 0.00 | 1.50 | 0.00 | 0.00 | 1.50 | 0.00 | 0.00 |
| 2.0 | 1.50 | 0.00 | 4.23 | 1.50 | −0.01 | 4.23 | 1.50 | −0.02 | 4.23 |

TABLE 7A-continued

Physical dimensions as a function of radial distance for three non-corrective lenses according to embodiments of the present invention that have non-quadratic front surfaces and crown curvatures 0.0, 3.5D and 5.0D.

| | Form 5A: 0.0D | | | Form 5D: 3.5D | | | Form 5E: 5.0D | | |
|---|---|---|---|---|---|---|---|---|---|
| Radius | Caliper | Height | Angle | Caliper | Height | Angle | Caliper | Height | Angle |
| 4.0 | 1.50 | 0.00 | 8.42 | 1.50 | −0.05 | 8.43 | 1.50 | −0.08 | 8.44 |
| 6.0 | 1.50 | −0.01 | 12.52 | 1.50 | −0.12 | 12.57 | 1.50 | −0.17 | 12.59 |
| 8.0 | 1.50 | −0.02 | 16.50 | 1.50 | −0.22 | 16.62 | 1.50 | −0.30 | 16.66 |
| 10.0 | 1.50 | −0.06 | 20.34 | 1.50 | −0.36 | 20.55 | 1.50 | −0.48 | 20.64 |
| 12.0 | 1.51 | −0.12 | 24.03 | 1.50 | −0.54 | 24.37 | 1.50 | −0.70 | 24.49 |
| 14.0 | 1.51 | −0.23 | 27.58 | 1.50 | −0.77 | 28.06 | 1.50 | −0.97 | 28.24 |
| 16.0 | 1.52 | −0.39 | 30.98 | 1.50 | −1.07 | 31.64 | 1.50 | −1.29 | 31.86 |
| 18.0 | 1.53 | −0.63 | 34.28 | 1.51 | −1.44 | 35.11 | 1.50 | −1.69 | 35.38 |
| 20.0 | 1.54 | −0.96 | 37.48 | 1.51 | −1.90 | 38.50 | 1.50 | −2.18 | 38.81 |
| 22.0 | 1.56 | −1.41 | 40.64 | 1.52 | −2.47 | 41.84 | 1.50 | −2.77 | 42.19 |
| 24.0 | 1.57 | −1.99 | 43.77 | 1.52 | −3.18 | 45.16 | 1.50 | −3.48 | 45.53 |
| 26.0 | 1.58 | −2.74 | 46.93 | 1.52 | −4.05 | 48.50 | 1.50 | −4.35 | 48.89 |
| 28.0 | 1.58 | −3.69 | 50.16 | 1.51 | −5.10 | 51.90 | 1.49 | −5.40 | 52.29 |
| 30.0 | 1.57 | −4.86 | 53.51 | 1.50 | −6.36 | 55.41 | 1.48 | −6.66 | 55.80 |
| 32.0 | 1.55 | −6.29 | 57.02 | 1.47 | −7.88 | 59.07 | 1.45 | −8.16 | 59.44 |
| 34.0 | 1.51 | −8.02 | 60.76 | 1.43 | −9.68 | 62.93 | 1.42 | −9.94 | 63.29 |
| 36.0 | 1.46 | −10.08 | 64.75 | 1.37 | −11.80 | 67.03 | 1.36 | −12.04 | 67.36 |
| 38.0 | 1.38 | −12.51 | 69.05 | 1.29 | −14.28 | 71.42 | 1.29 | −14.51 | 71.72 |
| 40.0 | 1.28 | −15.36 | 73.69 | 1.19 | −17.18 | 76.11 | 1.19 | −17.37 | 76.38 |

TABLE 7B

Optical properties as a function of ocular rotation angle for the lenses of Table 7A.

| | Form 5A: 0.0D | | | Form 5D: 3.5D | | | Form 5E: 5.0D | | |
|---|---|---|---|---|---|---|---|---|---|
| Angle | MPE | OAE | Prism | MPE | OAE | Prism | MPE | OAE | Prism |
| 0.0 | 0.00 | 0.00 | 0.00 | 0.00 | 0.00 | 0.00 | 0.00 | 0.00 | 0.00 |
| 2.5 | 0.00 | 0.00 | 0.00 | 0.00 | 0.00 | 0.02 | 0.00 | 0.00 | 0.02 |
| 5.0 | 0.00 | 0.00 | 0.00 | 0.00 | 0.00 | 0.03 | 0.00 | 0.00 | 0.05 |
| 7.5 | 0.00 | 0.00 | 0.00 | 0.00 | 0.00 | 0.05 | −0.01 | 0.01 | 0.07 |
| 10.0 | 0.00 | 0.00 | 0.00 | −0.01 | 0.01 | 0.07 | −0.01 | 0.01 | 0.09 |
| 12.5 | 0.00 | 0.00 | 0.01 | −0.01 | 0.01 | 0.09 | −0.02 | 0.01 | 0.11 |
| 15.0 | 0.00 | 0.00 | 0.02 | −0.01 | 0.01 | 0.11 | −0.02 | 0.02 | 0.13 |
| 17.5 | −0.01 | 0.00 | 0.03 | −0.01 | 0.01 | 0.13 | −0.02 | 0.01 | 0.16 |
| 20.0 | −0.01 | 0.00 | 0.05 | −0.02 | 0.01 | 0.15 | −0.02 | 0.01 | 0.18 |
| 22.5 | −0.01 | 0.00 | 0.07 | −0.02 | 0.01 | 0.18 | −0.02 | 0.00 | 0.21 |
| 25.0 | −0.01 | 0.00 | 0.10 | −0.02 | 0.01 | 0.22 | −0.02 | 0.01 | 0.25 |
| 27.5 | 0.00 | 0.01 | 0.14 | −0.02 | 0.00 | 0.26 | −0.01 | 0.02 | 0.29 |
| 30.0 | 0.00 | 0.02 | 0.19 | −0.01 | 0.01 | 0.31 | −0.01 | 0.03 | 0.34 |
| 32.5 | 0.00 | 0.03 | 0.26 | −0.01 | 0.01 | 0.37 | 0.00 | 0.03 | 0.40 |
| 35.0 | 0.00 | 0.04 | 0.34 | −0.01 | 0.02 | 0.44 | 0.00 | 0.03 | 0.46 |
| 37.5 | 0.00 | 0.03 | 0.44 | −0.02 | 0.02 | 0.52 | −0.01 | 0.02 | 0.54 |
| 40.0 | 0.00 | 0.05 | 0.55 | −0.02 | 0.01 | 0.61 | −0.02 | 0.00 | 0.62 |
| 42.5 | 0.00 | 0.06 | 0.67 | −0.02 | 0.02 | 0.71 | −0.04 | 0.01 | 0.72 |
| 45.0 | 0.00 | 0.06 | 0.81 | −0.03 | 0.02 | 0.82 | −0.05 | 0.02 | 0.81 |
| 47.5 | 0.00 | 0.07 | 0.95 | −0.03 | 0.03 | 0.94 | −0.05 | 0.02 | 0.92 |
| 50.0 | −0.01 | 0.07 | 1.10 | −0.02 | 0.04 | 1.06 | −0.05 | 0.01 | 1.03 |
| 52.5 | −0.01 | 0.07 | 1.24 | −0.02 | 0.06 | 1.18 | −0.05 | 0.01 | 1.14 |
| 55.0 | −0.01 | 0.08 | 1.38 | −0.02 | 0.07 | 1.30 | −0.04 | 0.04 | 1.26 |
| 57.5 | 0.00 | 0.10 | 1.52 | −0.02 | 0.09 | 1.43 | −0.03 | 0.07 | 1.37 |
| 60.0 | 0.01 | 0.14 | 1.65 | −0.01 | 0.11 | 1.55 | −0.01 | 0.12 | 1.49 |

EXAMPLE 8

Optimization of Lens Properties

Computational methods that assist surface correction of a lens back surface with a pre-defined front surface involve the use of merit functions that quantify the relationship between the properties achieved and target performance objectives. Such merit functions are based typically on the refractive errors observed, these being the mean power MPE, astigmatic or cylinder error and the RMS power error RMSPE (also termed the RMS blur) wherein $$RMSPE = \sqrt{[MPE]^2 + \frac{1}{4}[Cyl\ Error]^2}.$$

Additional merit functions can also include the optical prism of a lens and rates of change of properties such as blur and prism, for example;

$$\text{Merit-1} = M_{\alpha,\beta} = \sum_\theta (\alpha[RMSBlur]^2 + \beta[|\text{Static Prism}|]^2)_\theta,$$

$$\text{Merit-2} = M_{a,b} = \sum_\theta \left(a[RMSBlur]^2 + b\left[\frac{\partial(\text{Static Prism})}{\partial\theta}\right]^2\right)_\theta$$

Figure 14A:
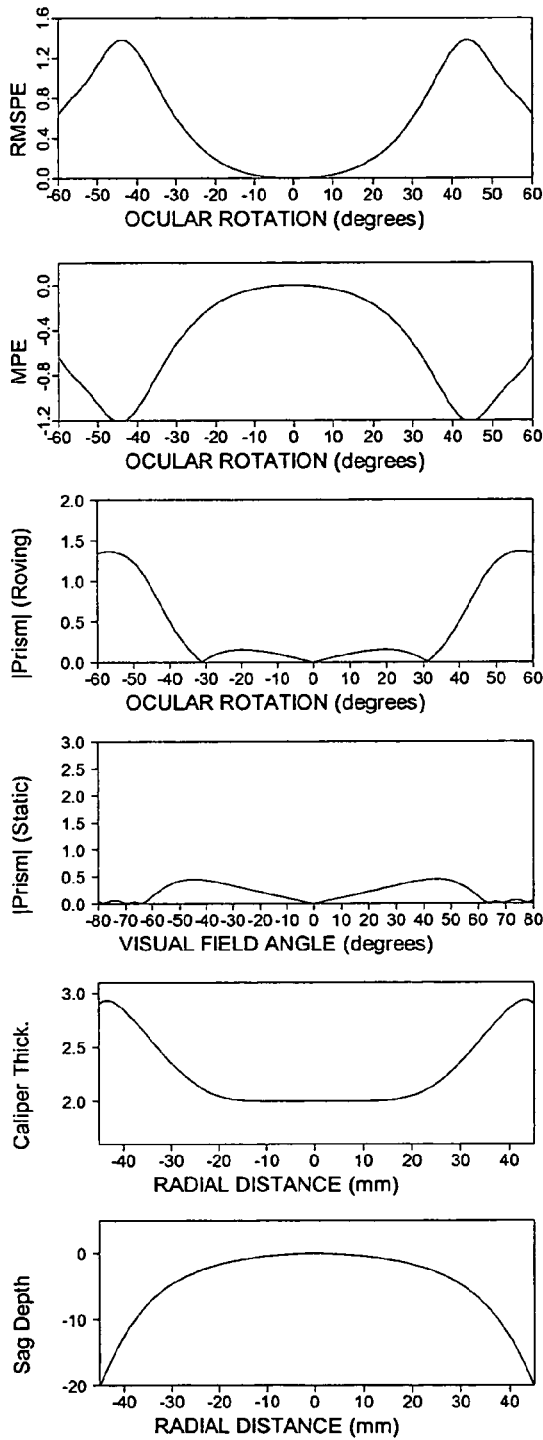
FIGS. 14A and 14B Show the optical properties of rotationally symmetric non-corrective lenses having the front surface described in Table 4C and optimized according to two different merit functions.
Figure 14B:
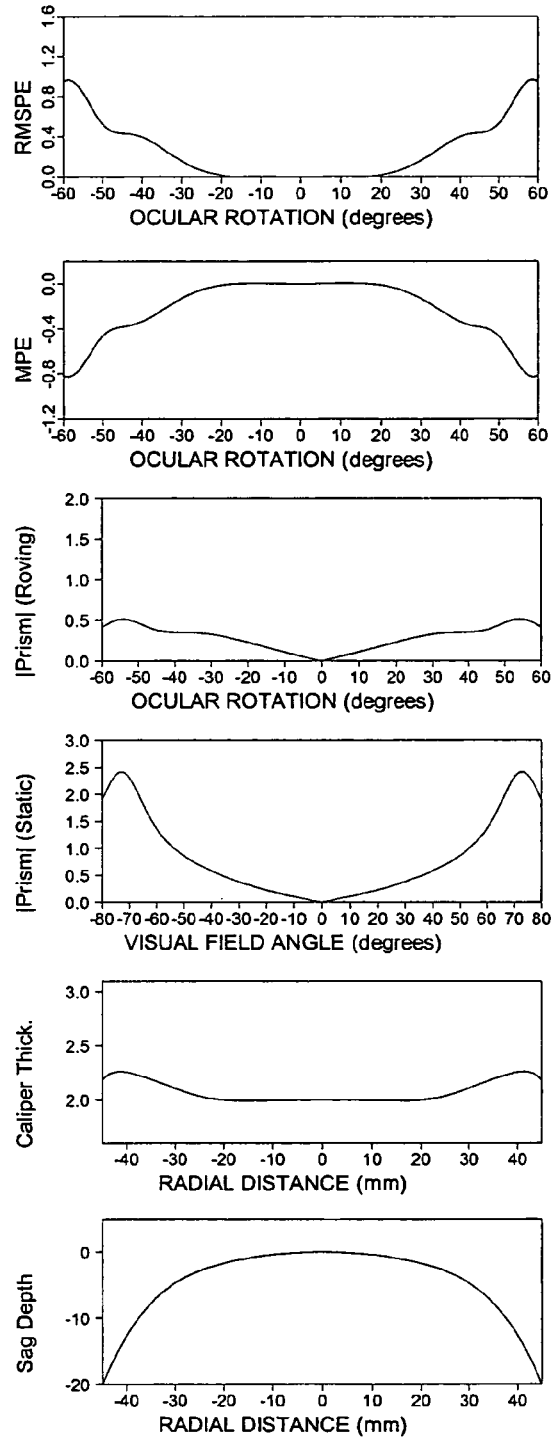

Two examples of lenses that employ such merit functions for optimization are shown in FIGS. 14A and 14B, respectively. The front surface is described by the combining of two spheres as in Example 4, but with weighting function $W(r)$ defined by $$W(r) = \frac{1}{1+nr^p}.$$

The front surface is that described in Table 4C. It has the parameter set

| Parameter | Value |
|---|---|
| N | 2.5e−9 |
| P | 5.32 |

-continued

| Parameter | Value |
|---|---|
| $\rho_1$ ($B_1$) | 122.55 mm |
|  | (4.32 D) |
| $\rho_2$ ($B_2$) | 50.45 mm |
|  | (10.51 D) |

The corresponding back surface is constructed by adding a tenth order polynomial to the front surface description to provide the necessary optical corrections and performance dependant on the chosen merit function. In another embodiment, n is in a range of $1 \times 10^{-12}$ to $1 \times 10^{-13}$ and p is in a range of 8 to 9.

The quantities RMS power error RMSPE and the magnitude of optical prism |Prism| (roving) are shown for ocular rotation angles in the visual fixation field. Also shown is the static optical prism magnitude |Prism| (Static) that is determined with reference to a wearer's pupil stop in forward gaze. The lens caliper thickness and sagittal depth of the front surface are shown as a function of radial position relative to the axis of symmetry of the lens.

Merit-1 (FIG. 14A) has achieved a significantly low value of static prism magnitude especially in the peripheral field. However, the RMS power error rises rapidly across the visual fixation field reaching high levels in the margin especially when compared for example to the prior art spherical lens of FIG. 4A. The optical properties of this lens are achieved with RMS blur optimization across the visual fixation field and the subsequent minimization of the magnitude of the static prism in the peripheral field from about a 60° visual field angle. The second merit function, Merit-2 (FIG. 14B), reveals much lower levels of RMS power error with values less than about 0.50D across the complete visual fixation field. Here again the RMS blur is optimized in the inner angular range, but now the rate of change of static prism is minimized from a visual angle of about 50°. A comparison of the RMS power error at a 40° ocular rotation reveals that the RMS power error is at least three times less than at the same point for Merit-1, while the static prism is only marginally greater at a 40° visual field angle compared with the same point for Merit-1. It is evident that the Merit-2 optimization merit function allows for a compromise between the magnitude of the RMS blur and the static prism across the complete visual field. Because the RMS power error has been chosen to be less in the outer field of Merit-2 the static optical prism has been allowed to increase there.

A comparison of the two optimized lenses also illustrates that Merit-2 allows for greater control of the lens thickness. There is no significant taper across the full lens aperture enclosing the visual fixation field toward the peripheral field, in line with the currently described invention. Unlike the lens of Merit-1, which can be seen to increase significantly near the margin of the visual fixation field into the peripheral field, the lens of Merit-2 increases only slightly in thickness near the edges of the lens before starting to decrease back towards the central value.

Similarly, a surface created by the merging of two non-spherical surfaces of vertex curvatures $B_1$ and $B_2$ can be used to construct a lens optimized according to a chosen merit function. The same weighting function W(r) described above is used to combine two non-spherical surfaces so that the final non-rotationally symmetric surface has the form, $$z(r, \lambda) = W(r)^* \left( \rho_1 - \sqrt{\rho_1^2 - \lambda^2} \right) + (1 - W(r))^* \left( \rho_2 - \sqrt{\rho_2^2 - \lambda^2} \right)$$

where $r = \sqrt{x^2 + y^2}$, and $\lambda = \sqrt{(ax)^2 + (by)^2}$.

The front surface has the parameter set,

| Parameter | Value |
|---|---|
| N | 2.5e-9 |
| P | 5.32 |
| A | 1 |
| B | 0.7 |
| $\rho_1$ ($B_1$) | 122.55 mm |
|  | (4.32 D) |
| $\rho_2$ ($B_2$) | 50.45 mm |
|  | (10.51 D) | where the curvature along a vertical cross section is now generally flatter than the curvature along a horizontal cross section.

Figure 15:
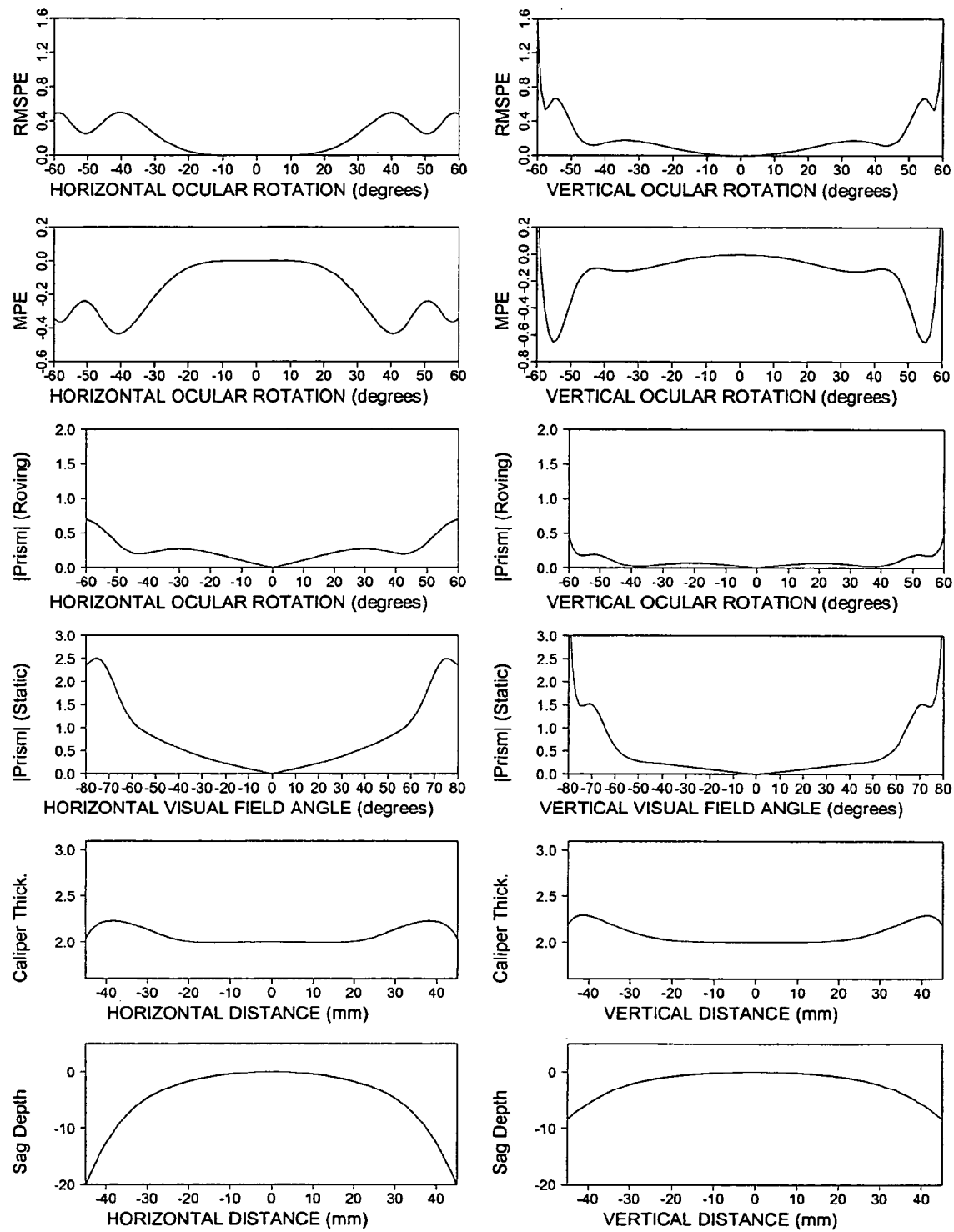
FIG. 15 Shows the optical properties of a non-corrective lens having a front surface formed by the mathematical combination of two ellipsoids having eccentricity e=0.71 in a plane normal to the optical axis.
Figure 16:
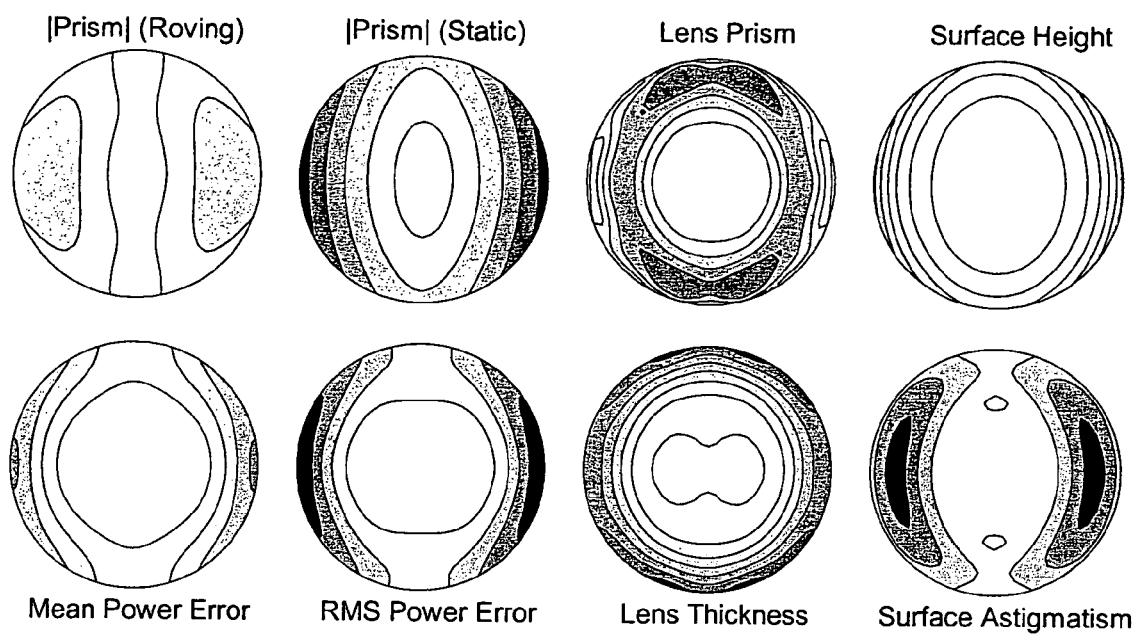
FIG. 16 Shows contour maps of optical properties for the lens of FIG. 15 in a monocular rotation range of 40° and contour maps of lens physical properties within a 40 mm aperture on the lens. Contours are spaced as follows: optical prism and refractive power, steps of 0.10D; lens prism, increments of 0.25D; surface height, steps of 2 mm; lens thickness, steps of +0.05 mm relative to center of 2 mm, and surface astigmatism, steps of 4D around a 1.0D field.

The asymmetrical lens so formed is optimized with regard to the Merit-2 function. The resultant optical, surface and lens properties vary along the horizontal and vertical meridians and are shown in FIGS. 15 and 16. The contour maps of FIG. 16 present the optical properties in a field of ±40° ocular rotation, with lens and surface properties in a 40 mm radial aperture. The optical prism and refractive errors are plotted in 0.1D steps. Front surface height is plotted in 2 mm intervals and lens prism in 0.25D intervals. Lens thickness is shown at intervals of 0.05 mm from the central value of 2.00 mm, and front surface astigmatism is in increments of 4D from a first contour of 1D.

The front surface is no longer umbilic at the geometric center of the lens and only two localized sphere points are seen along the vertical meridian. The curvature along a horizontal cross section increases from the central portion toward the lateral ends with a maximum value of curvature at some intermediate position, consistent with other preferred embodiments of the present invention. The lens does not have an outer umbilic region, but does exhibit oblique regions of greatest surface astigmatism. There are no refractive or prismatic errors at the direct line of sight while the oblique refractive errors are symmetrical on either side of the direct line of sight in both a horizontal and vertical direction. Also in accordance with an aspect of the present invention the lens thickness is sustained without taper across a significant portion of the visual fixation field.

Aspects and features of embodiments of the present invention have been discussed with reference to certain illustrative examples and embodiments. The invention to be protected is, however, defined by the following claims and is not to be regarded as limited by aspects or features not recited in the claims.

What is claimed is:

1. A non-powered optical lens element comprising:
   a first surface having an axis of symmetry; and
   a second surface of complementary curvature to the first surface and having an axis of symmetry;
   wherein at least one surface has a central portion and lateral ends spaced therefrom, said surface exhibiting significant deviation in surface curvature from a standard optical surface of quadratic form wherein the curvature increases from the central portion toward the lateral ends, and wherein there is a maximum value of curvature intermediate the central portion and the lateral ends; and wherein the deviated surface has tangential and sagittal radii varying across the deviated surface so that $$Q(r)=r_s^3/r_T R(0)^2$$

is non-constant, being unity at the vertex and changing by at least 0.25 away from the axis of symmetry, where $r_T$ and $r_S$ are the tangential and sagittal radii of curvature; and $R(0)$ is the vertex radius of curvature.

2. The non-powered optical lens element of claim 1 wherein there is a maximum value of mean curvature intermediate the central portion and the lateral ends.

3. The non-powered optical lens element of claim 1 wherein there is a maximum value of tangential curvature intermediate the central portion and the lateral ends.

4. The optical lens element of claim 1
wherein at least one surface exhibits significant deviation in surface astigmatism from a standard optical surface of quadratic form, and
wherein the deviation in surface astigmatism commences locally around a vertex in an aperture of the lens, extends radially across the entire surface and forms an annular region of maximum surface astigmatism on the lens surface.

5. The optical lens element of claim 4 wherein the deviation in surface astigmatism extends through a maximum located obliquely on the lens surface and forms an outer region of low surface astigmatism in the lens periphery around which the lens surface is approximately umbilic.

6. The lens element of claim 1 further comprising a second non-powered optical lens element of the type recited in claim 1, and means for positioning both lens elements on the wearer so that direct lines of sight of the wearer coincide substantially with the respective optical axes of the lens elements.

7. The lens elements of claim 6 wherein the lens elements conform to the shape of the wearer's face and enclose at least the field of forward vision of the wearer by virtue of their physical shape and sagittal depth.

8. The optical lens element of claim 1 wherein the first and second surfaces in combination define an optical axis and an optical zone in which the lens thickness is substantially constant across the aperture, which corresponds approximately to the visual fixation field as worn.

9. The optical lens element of claim 1
wherein the deviated surface so formed being a surface inscribed between an inner osculating surface of standard optical form and an outer osculating surface of standard optical form having a vertex radius different from the first;
the tangential and sagittal curvatures KT and Ks of the deviated surface vary across the deviated surface so that $$Q(r)=K_T(r)*[K_S(0)]^2/[K_S(r)]^3$$

is non-constant, being unity at the vertex and changing by at least 0.25 away from the axis of symmetry where $K_T(r)$ and $K_S(r)$ are the tangential and sagittal curvatures; and $K_S(0)$ is the vertex sagittal curvature.

10. The optical lens element of claim 9 wherein the inner osculating surface is a conicoid of revolution with respect to the optical axis, the vertex of the deviated surface is a sphere point and the inner and outer osculating surfaces have the same rotational symmetry with respect to a common axis.

11. The optical lens element of claim 1 wherein the first surface is the front surface of the lens element in the as-worn condition and wherein the front surface is a deviated surface describable as a surface formed by the addition of the surface heights of a polynomial to the reference surface, the numeric order of the coefficients being in the range from 2 to 8.

12. The optical lens element of claim 1 wherein the deviated surface is the front surface of the lens element and is describable as a surface that merges the surface height of the first reference surface with those of a second reference surface of quadratic form by means of a weighting function.

13. The lens element of claim 12 wherein the weighting function is such that the deviated surface merges with the first reference surface at a vertex of the lens element and merges with the second reference surface in the lateral regions of the lens element.

14. A method of providing a non-powered optical lens element comprising:
selecting first and second quadratic reference surfaces;
mathematically merging the first and second reference surfaces using a weighting function to provide a description of a front surface of the lens element such that the front surface is described by the first reference surface at the vertex of the lens element and gradually approaches the second reference surface with increasing distance from the vertex; and
forming a lens element with the front surface.

15. The method of claim 14 wherein a complimentary back surface of the lens element is described by adding a polynomial to the surface described as the front surface, and when the lens element is formed with said complimentary back surface.

16. The method of claim 15 wherein the said polynomial addition provided is based on a merit function for minimizing at least one of power error, astigmatic error, blur, prism, change in blur or change in prism.

17. The method of claim 16 wherein the merit function M is of the form $$M = \sum_\theta \left( a[RMSBlur]^2 + b\left[\frac{\partial(\text{Static Prism})}{\partial \theta}\right]^2 \right)_\theta$$

wherein a and b are non-negative weights that control the relative contribution of RMS Blur and Static Prism optimization in different regions of the visual field.

18. The method of claim 16 wherein RMS power error is minimized such that the RMS power is at least as low as 0.75D at the outer limit of the visual fixation field corresponding to ocular rotations of at least 40°.

19. The method of claim 16 wherein the astigmatic error is minimized such that the astigmatic error is at least as low as 0.75D at the outer limit of the visual fixation field corresponding to ocular rotations of at least 40°.

20. The method of claim 16 wherein prism is minimized such that the average angular rate of growth in magnitude of both rotational and static prism components is about 40 mD/Deg of visual field angle or less across an aperture corresponding substantially to the visual fixation field.

21. The method of claim 16 wherein the average angular rate of growth in magnitude of a static prism component is less than 60 mD/Deg from the direct line of sight to the outermost peripheral edge of the lens element.

22. The method of claim 14 where the first surface is a non-quadratic surface describable as a surface formed by merging two spheres of substantially different curvature in accordance with a weighting function whose value varies with distance from an optical axis defined by the centers of curvature of the spheres.

23. The method of claim 22 wherein surface heights z(r) from a vertex plane of the first surface are describable by the equation $$z(r) = W(r)^*\left(\rho_1 - \sqrt{\rho_1^2 - r^2}\right) + (1 - W(r))^*\left(\rho_2 - \sqrt{\rho_2^2 - r^2}\right)$$

where W(r) is the weighting function;
$\rho_1$ is a radius of the first sphere;
$\rho_2$ is a radius of the second sphere; and $$r = \sqrt{x^2 + y^2}.$$

24. The method of claim 23 wherein the weighting function, W(r) is of the form $$W(r) = \frac{1}{1 + nr^p}$$

where n and p are constants for the lens element.

25. The method of claim 24 wherein n is in a range of $1\times10^{-12}$ to $1\times10^{-13}$ and p is in a range of 8 to 9.

26. The method of claim 23 wherein the weighting function, W(r), is of the form $$W(r) = a^*[Sech(r/b)]^n$$

where n, a and b are constants for the lens element.

27. The method of claim 23 wherein
$\rho_1$ is in a range of 75.7 mm to 530.0 mm; and
$\rho_2$ is in a range of 40.8 mm to 58.9 mm.

28. The method of claim 27 wherein
$\rho_1$ is in a range of 75.7 mm to 265.0 mm.

29. An optical lens element having non-quadratic first and second surfaces wherein each of said surfaces are describable as being based on the merging of two mathematical surfaces sharing the same axis of symmetry, the merging occurring in accordance with a weighting function whose value varies with distance from the axis of symmetry.

30. The optical lens element of claim 29 wherein the two mathematical surfaces are two spherical functions having substantially different radii of curvature.

31. The optical lens element of claim 29 wherein the two mathematical surfaces are two non-spherical functions.

32. The optical lens element of claim 31 wherein the surface heights from the vertex plane of the first lens surface are describable by the equation $$z(r, \lambda) = W(r)^*\left(\rho_1 - \sqrt{\rho_1^2 - \lambda^2}\right) + (1 - W(r))^*\left(\rho_2 - \sqrt{\rho_2^2 - \lambda^2}\right)$$

$$W(r) = \frac{1}{1 + nr^p}$$

$\rho_1$ is a radius of the first mathematical surface;
$\rho_2$ is a radius of the second mathematical surface;

$$r = \sqrt{x^2 + y^2};$$

$$\lambda = \sqrt{(ax)^2 + (by)^2}; \text{ and}$$

a, b, n and p are constants of the lens element.

33. A non-powered optical lens element including
a rotationally symmetric first surface; and
a rotationally symmetric second surface having complementary curvature to the first surface,
wherein the first surface is a non-quadratic surface describable as a surface formed by merging two spheres of substantially different curvature in accordance with a weighting function whose value varies with distance from an optical axis defined by the centers of curvature of the spheres, and
wherein the first and second surfaces provide a substantially zero mean through power in the visual fixation field of a wearer.

34. The optical lens element of claim 33 wherein the lens element has a substantially constant wall thickness in the visual fixation field of the wearer.

35. The optical lens element of claim 33 wherein the rate of change of static prism is minimized from a visual field angle of about ±50°.

36. The optical lens element of claim 33 wherein the complementary back surface is describable as a surface formed by adding a polynomial to the front surface, said polynomial addition providing optical correction and performance based on a selected merit function.

37. The optical lens element of claim 36 wherein the merit function is based on minimizing at least one of power error, astigmatic error, blur, prism, change in blur or change in prism.

38. The optical lens element of claim 37 wherein the merit function includes a minimization of a combination of at least RMS blur and rate of change of static prism.

39. The optical lens element of claim 38 wherein the merit function M is of the form $$M = \sum_\theta \left( a[RMSBlur]^2 + b\left[\frac{\partial(\text{Static Prism})}{\partial \theta}\right]^2 \right)_\theta$$

wherein a and b are non-negative weights that control the relative contribution of RMS Blur and Static Prism optimization in different regions of the visual field.

40. The optical lens element of claim 37 wherein RMS power error is minimized such that the RMS power is at least as low as 0.75D at the outer limit of the visual fixation field corresponding to ocular rotations of at least 40°.

41. The optical lens element of claim 37 wherein the astigmatic error is minimized such that the astigmatic error is at least as low as 0.75D at the outer limit of the visual fixation field corresponding to ocular rotations of at least 40°.

42. The optical lens element of claim 37 wherein prism is minimized such that the average angular rate of growth in magnitude of both rotational and static prism components is about 40 mD/Deg of visual field angle or less across an aperture corresponding substantially to the visual fixation field.

43. The optical lens element of claim 37 wherein the average angular rate of growth in magnitude of a static prism component is less than 60 mD/Deg from the direct line of sight to the outermost peripheral edge of the lens element.

44. The optical lens element of claim 33 wherein the surface heights Z(r) from a vertex plane of the first surface is describable by the equation $$Z(r) = W(r)^*\left(\rho_1 - \sqrt{\rho_1^2 - r^2}\right) + (1 - W(r))^*\left(\rho_2 - \sqrt{\rho_2^2 - r^2}\right)$$

where W(r) is the weighting function;
$\rho_1$ is a radius of the first sphere;
$\rho_2$ is a radius of the second sphere; and $$r = \sqrt{x^2 + y^2}.$$

45. The optical lens element of claim 44 wherein the weighting function, W(r), is of the form $$W(r) = \frac{1}{1 + nr^P}$$

where n and p are constants for the lens element.

46. The optical lens element of claim 44 wherein the weighting function, W(r), is of the form $$W(r) = a^*[Sech(r/b)]^n$$

where n, a and b are constants for the lens element.

47. Eyewear having a pair of optical lens elements, each lens element having non-quadratic first and second surfaces and a sagittal depth of at least 10 mm, wherein an optical axis of each lens element is substantially aligned with a respective direct line of sight of the wearer and wherein the eyewear is substantially free of binocular disparity in version and vergence movement.

48. The eyewear of claim 47 wherein the lens elements have substantially zero mean through power in the visual fixation field of the wearer.

49. The eyewear of claim 48 wherein the lens elements have a mean through power in the oblique field in the range of −0.50 to +0.125D.

50. A non-corrective lens element that conforms to a wearer's face when worn with the optical axis thereof aligned with a direct line of sight of the wearer,
wherein the lens element has non-quadratic first and second surfaces and a thickness;
wherein the lens element has a sagittal depth of at least 10 mm; and
wherein the thickness of the lens element is approximately constant across the visual fixation field of the lens element as worn.

51. The non-corrective lens element of claim 50 wherein there are substantially no optical errors at the optical axis.

52. The non-corrective lens element of claim 51 wherein the RMS power error is at least as low as 0.75D at the outer limit of the visual fixation field.

53. The non-corrective lens element of claim 51 wherein the astigmatic error is at least as low as 0.75D at the outer limit of the visual fixation field.

54. The non-corrective lens element of claim 51 wherein the average angular rate of growth in magnitude of both rotational and static prism components is about 40 mD/Deg of visual field angle or less across an aperture corresponding substantially to the visual fixation field.

55. The non-corrective lens element of claim 51 wherein the average angular rate of growth in magnitude of a static prism component is less than 60 mD/Deg from the direct line of sight to the outermost peripheral edge of the lens element.

56. The non-corrective lens element of claim 50 wherein the lens element thickens outside of the visual fixation field.

57. An optical lens element having an inner convex surface and an outer convex surface with a thickness therebetween,
wherein a cross-section along at least a horizontal meridian of at least one of said surfaces has a curved form so that the cross-sectional curve has a central portion and lateral ends spaced therefrom, with an axis of symmetry,
the cross-sectional curve being such that its curvature increases from the central portion toward the lateral ends, and;
there is a maximum value of curvature intermediate between the central portion and the lateral ends;
wherein the shape of the curve is approximately elliptical in a central region;
wherein the curve spirals outward from the ellipse in the region of the lateral ends; and
wherein an evolute in a central region of the curve corresponds approximately to that of an ellipse with eccentricity greater than about e=0.95.

58. The optical lens element of claim 57
wherein the evolute of the curve has a pair of horizontally displaced cusps that correspond to a region of greatest tangential curvature, the normal vectors from the curve to the said cusps being inclined at an angle other than 90° to the minor axis of the curve; and
wherein the evolute of the curve near the lateral ends thereof is characterized by a branch extending from the horizontally displaced cusps toward the minor axis on the concave side of the curve.

59. The optical lens element of claim 58 wherein the normal vectors to the curve at the opposed locations of highest tangential curvature are inclined to the axis of symmetry at an angle φ less than 75 degrees.

60. The optical lens element of claim 58 wherein the normal vectors to the curve at the opposed locations of highest tangential curvature are inclined to the axis of symmetry at an angle φ less than 60 degrees.

61. The optical lens element of claim 58 wherein the normal vectors to the curve at the opposed locations of highest tangential curvature are inclined to the axis of symmetry at an angle φ less than 45 degrees.

62. The optical lens element of claim 58 wherein the evolute in a central region of the curve corresponds approximately to that of an ellipse with eccentricity of about e=0.96.

* * * * *